US010693769B2

(12) United States Patent
Kommula et al.

(10) Patent No.: US 10,693,769 B2
(45) Date of Patent: Jun. 23, 2020

(54) METHODS AND APPARATUS TO PERFORM NETWORK FABRIC MIGRATION IN VIRTUALIZED SERVER SYSTEMS

(71) Applicant: VMWARE, INC., Palo Alto, CA (US)

(72) Inventors: Raja Kommula, Palo Alto, CA (US); Thayumanavan Sridhar, Palo Alto, CA (US); Santoshkumar Babalad, Bangalore (IN)

(73) Assignee: VMWARE, INC., Palo Alto, CA (US)

( * ) Notice: Subject to any disclaimer, the term of this patent is extended or adjusted under 35 U.S.C. 154(b) by 194 days.

(21) Appl. No.: 15/822,238

(22) Filed: Nov. 27, 2017

(65) Prior Publication Data
US 2019/0109783 A1   Apr. 11, 2019

(30) Foreign Application Priority Data

Oct. 10, 2017   (IN) .............................. 201741035986

(51) Int. Cl.
| | | |
|---|---|---|
| *H04L 12/721* | (2013.01) | |
| *H04L 12/947* | (2013.01) | |
| *H04L 12/26* | (2006.01) | |
| *H04L 12/24* | (2006.01) | |

(52) U.S. Cl.
CPC .......... *H04L 45/26* (2013.01); *H04L 41/0668* (2013.01); *H04L 41/0816* (2013.01); *H04L 43/12* (2013.01); *H04L 45/66* (2013.01); *H04L 49/25* (2013.01); *H04L 43/10* (2013.01)

(58) Field of Classification Search
None
See application file for complete search history.

(56) References Cited

U.S. PATENT DOCUMENTS

| | | | | |
|---|---|---|---|---|
| 8,601,133 B1* | 12/2013 | Rainovic | ............. | H04L 12/4633 709/227 |
| 9,258,267 B1* | 2/2016 | Rainovic | ............. | H04L 12/4633 |
| 2004/0049774 A1* | 3/2004 | Boyd | ................. | G06F 11/2005 719/312 |

(Continued)

*Primary Examiner* — Ayaz R Sheikh
*Assistant Examiner* — Faiyazkhan Ghafoerkhan
(74) *Attorney, Agent, or Firm* — Hanley, Flight & Zimmerman, LLC

(57) ABSTRACT

Methods, apparatus, systems, and articles of manufacture to perform network fabric migration in virtualized servers are disclosed and described. An example apparatus a layer detector to determine a first network fabric layer of a communication network by sending a first probe packet from a first network resource to a second network resource via a communication link and determine to migrate the first network fabric layer to a second network fabric layer based on whether the first network resource receives a reply probe packet from the second network resource in response to the first probe packet. The example apparatus further includes a layer migrator to when the first network resource receives the reply probe packet from the second network resource in response to the first probe packet, migrate the first network fabric layer to a second network fabric layer based on configuring a remediation path and migrate the remediation path from the first network fabric layer to the second network fabric layer when the first network fabric layer migrates to the second network fabric layer.

21 Claims, 24 Drawing Sheets

(56) References Cited

U.S. PATENT DOCUMENTS

| | | | |
|---|---|---|---|
| 2004/0252703 A1* | 12/2004 | Bullman | H04L 12/2856 370/395.52 |
| 2005/0089044 A1* | 4/2005 | Ciscon | H04L 29/06 370/395.21 |
| 2007/0156919 A1* | 7/2007 | Potti | G06F 8/656 709/238 |
| 2007/0233825 A1* | 10/2007 | Brownell | H04L 29/12009 709/220 |
| 2009/0049196 A1* | 2/2009 | Smith | H04L 63/08 709/245 |
| 2010/0235544 A1* | 9/2010 | Smith | H04L 63/08 709/246 |
| 2011/0119737 A1* | 5/2011 | Wen | H04L 63/0218 726/3 |
| 2012/0163164 A1* | 6/2012 | Terry | H04L 45/24 370/221 |
| 2013/0021918 A1* | 1/2013 | Fiorone | H04L 45/00 370/242 |
| 2013/0148491 A1* | 6/2013 | Jha | H04L 45/66 370/217 |
| 2015/0010002 A1* | 1/2015 | Duda | H04L 45/74 370/392 |
| 2015/0117266 A1* | 4/2015 | Lei | H04L 12/462 370/256 |
| 2016/0087885 A1* | 3/2016 | Tripathi | G06F 9/45558 370/389 |
| 2016/0087915 A1* | 3/2016 | Marr | H04L 41/145 709/226 |
| 2017/0013053 A1* | 1/2017 | Marr | H04L 67/42 |
| 2017/0048100 A1* | 2/2017 | Delinocci | H04L 41/065 |
| 2017/0070447 A1* | 3/2017 | Marr | H04L 41/145 |
| 2017/0134266 A1* | 5/2017 | Venkata | H04L 45/48 |
| 2017/0171056 A1* | 6/2017 | Dong | H04L 12/4641 |
| 2017/0302567 A1* | 10/2017 | Lan | G06F 11/0709 |
| 2017/0346674 A1* | 11/2017 | Delinocci | H04L 41/0654 |
| 2018/0309691 A1* | 10/2018 | Malhotra | H04L 47/34 |
| 2019/0026175 A1* | 1/2019 | Shelke | H04L 41/145 |

* cited by examiner

```
foreach link between L_i and S_i
        foreach workload W_i
                foreach VLAN V_i in W_i
                        send an ARP request on V_i from L_i to S_i on link L_i → S_i
                        if ARP does not arrive on S_i
                                return not an L2 fabric
                endfor
        endfor
endfor
foreach link between switch S_1 and S_2
        foreach workload W_i
                foreach VLAN V_i in W_i
                        send an ARP request on V_i from S_1 to S_2 on link S_1 → S_2
                        if ARP does not arrive on S_2
                                return not an L2 fabric
                endfor
        endfor
endfor return L2 fabric
```

FIG. 21A

```
foreach link between switch L_i and S_i
        if link L_i → S_i is not L_i
                return not an L3 fabric
        Send an ICMP Echo from L_i to S_i on link L_i → S_i
                If ICMP Echo-Reply does not arrive on L_i
                        return not an L3 fabric
        foreach workload W_i
                foreach VLAN in W_i
                        if VXLAN tunnel or multicast configuration is invalid
                                return not an L3 fabric
                endfor
        endfor
endfor
if there is a link between switch S_1 and S_2
        return not an L3 fabric return L3 fabric
```

FIG. 21B

METHODS AND APPARATUS TO PERFORM NETWORK FABRIC MIGRATION IN VIRTUALIZED SERVER SYSTEMS

RELATED APPLICATIONS

Benefit is claimed under 35 U.S.C. 119(a)-(d) to Foreign Application Serial No. 201741035986 filed in India entitled "METHODS AND APPARATUS TO PERFORM NETWORK FABRIC MIGRATION IN VIRTUALIZED SERVER SYSTEMS", on Oct. 10, 2017, by VMware, Inc., which is herein incorporated in its entirety by reference for all purposes

FIELD OF THE DISCLOSURE

This disclosure relates generally to cloud computing and, more particularly, to methods and apparatus to perform network fabric migration in virtualized server systems.

BACKGROUND

Virtualizing computer systems provides benefits such as the ability to execute multiple computer systems on a single hardware computer, replicating computer systems, moving computer systems among multiple hardware computers, and so forth. "Infrastructure-as-a-Service" (also commonly referred to as "IaaS") generally describes a suite of technologies provided by a service provider as an integrated solution to allow for elastic creation of a virtualized, networked, and pooled computing platform (sometimes referred to as a "cloud computing platform"). Enterprises may use IaaS as a business-internal organizational cloud computing platform (sometimes referred to as a "private cloud") that gives an application developer access to infrastructure resources, such as virtualized servers, storage, and networking resources. By providing ready access to the hardware resources required to run an application, the cloud computing platform enables developers to build, deploy, and manage the lifecycle of a web application (or any other type of networked application) at a greater scale and at a faster pace than ever before.

Cloud computing environments may be composed of many processing units (e.g., servers, computing resources, etc.). The processing units may be installed in standardized frames, known as racks, which provide efficient use of floor space by allowing the processing units to be stacked vertically. The racks may additionally include other components of a cloud computing environment such as storage devices, networking devices (e.g., routers, switches, etc.), etc.

BRIEF DESCRIPTION OF THE DRAWINGS

FIGS. 21A and 21B illustrate example source code representative of example computer readable instructions that may be executed to implement the example fabric migrator of FIGS. 2-11 that may be used to implement the examples disclosed herein.

DETAILED DESCRIPTION

Figure 1:
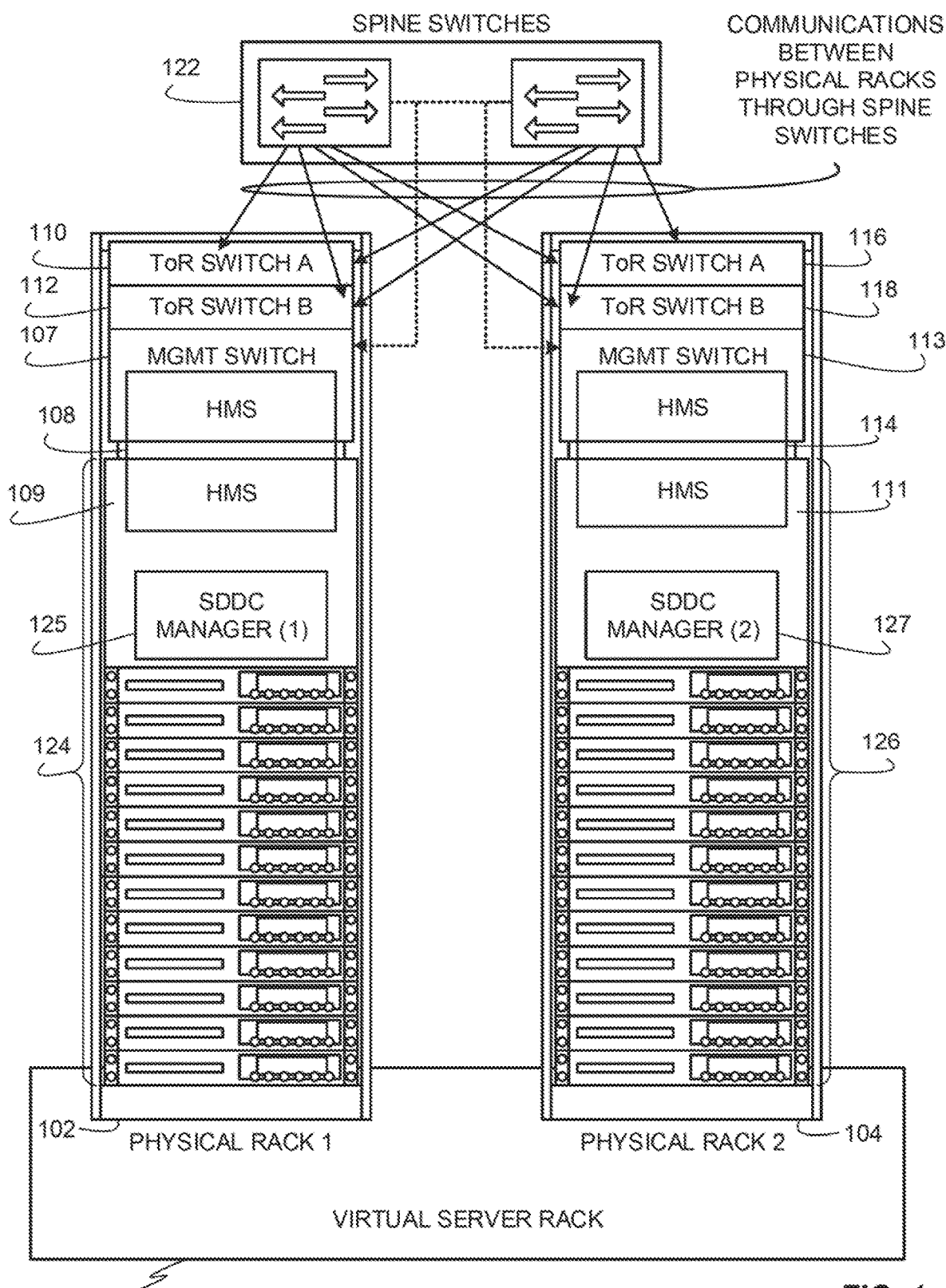
FIG. 1 illustrates example physical racks in an example virtual server rack deployment.

Cloud computing is based on the deployment of many physical resources across a network, virtualizing the physical resources into virtual resources, and provisioning the virtual resources in software defined data centers (SDDCs) for use across cloud computing services and applications. Examples disclosed herein can be used to manage network resources in SDDCs to improve performance and efficiencies of network communications between different virtual and/or physical resources of the SDDCs.

Examples described herein can be used in connection with different types of SDDCs. In some examples, techniques described herein are useful for managing network resources that are provided in SDDCs based on Hyper-Converged Infrastructure (HCI). In some examples, HCI combines a virtualization platform such as a hypervisor, virtualized software-defined storage, and virtualized networking in an SDDC deployment. An SDDC manager can provide automation of workflows for lifecycle management and operations of a self-contained private cloud instance. Such an instance may span multiple racks of servers connected via a leaf-spine network topology and connects to the rest of the enterprise network for north-south connectivity via well-defined points of attachment. The leaf-spine network topology is a two-layer data center topology including leaf switches (e.g., switches to which servers, load balancers, edge routers, storage resources, etc., connect) and spine switches (e.g., switches to which leaf switches connect, etc.). In such a topology, the spine switches form a backbone of a network, where every leaf switch is interconnected with each and every spine switch.

Examples described herein can be used with one or more different types of virtualization environments. Three example types of virtualization environments are: full virtualization, paravirtualization, and operating system (OS) virtualization. Full virtualization, as used herein, is a virtualization environment in which hardware resources are managed by a hypervisor to provide virtual hardware resources to a virtual machine (VM). In a full virtualization environment, the VMs do not have access to the underlying hardware resources. In a typical full virtualization, a host OS with embedded hypervisor (e.g., a VMWARE® ESXI® hypervisor, etc.) is installed on the server hardware. VMs including virtual hardware resources are then deployed on the hypervisor. A guest OS is installed in the VM. The hypervisor manages the association between the hardware resources of the server hardware and the virtual resources allocated to the VMs (e.g., associating physical random-access memory (RAM) with virtual RAM, etc.). Typically, in full virtualization, the VM and the guest OS have no visibility and/or access to the hardware resources of the underlying server. Additionally, in full virtualization, a full guest OS is typically installed in the VM while a host OS is installed on the server hardware. Example virtualization environments include VMWARE® ESX® hypervisor, Microsoft HYPER-V® hypervisor, and Kernel Based Virtual Machine (KVM).

Paravirtualization, as used herein, is a virtualization environment in which hardware resources are managed by a hypervisor to provide virtual hardware resources to a VM, and guest OSs are also allowed to access some or all the underlying hardware resources of the server (e.g., without accessing an intermediate virtual hardware resource, etc.). In a typical paravirtualization system, a host OS (e.g., a Linux-based OS, etc.) is installed on the server hardware. A hypervisor (e.g., the XEN® hypervisor, etc.) executes on the host OS. VMs including virtual hardware resources are then deployed on the hypervisor. The hypervisor manages the association between the hardware resources of the server hardware and the virtual resources allocated to the VMs (e.g., associating RAM with virtual RAM, etc.). In paravirtualization, the guest OS installed in the VM is configured also to have direct access to some or all of the hardware resources of the server. For example, the guest OS can be precompiled with special drivers that allow the guest OS to access the hardware resources without passing through a virtual hardware layer. For example, a guest OS can be precompiled with drivers that allow the guest OS to access a sound card installed in the server hardware. Directly accessing the hardware (e.g., without accessing the virtual hardware resources of the VM, etc.) can be more efficient, can allow for performance of operations that are not supported by the VM and/or the hypervisor, etc.

OS virtualization is also referred to herein as container virtualization. As used herein, OS virtualization refers to a system in which processes are isolated in an OS. In a typical OS virtualization system, a host OS is installed on the server hardware. Alternatively, the host OS can be installed in a VM of a full virtualization environment or a paravirtualization environment. The host OS of an OS virtualization system is configured (e.g., utilizing a customized kernel, etc.) to provide isolation and resource management for processes that execute within the host OS (e.g., applications that execute on the host OS, etc.). The isolation of the processes is known as a container. Thus, a process executes within a container that isolates the process from other processes executing on the host OS. Thus, OS virtualization provides isolation and resource management capabilities without the resource overhead utilized by a full virtualization environment or a paravirtualization environment. Example OS virtualization environments include Linux Containers LXC and LXD, the DOCKER™ container platform, the OPENVZ™ container platform, etc.

In some examples, a data center (or pool of linked data centers) can include multiple different virtualization environments. For example, a data center can include hardware resources that are managed by a full virtualization environment, a paravirtualization environment, an OS virtualization environment, etc., and/or a combination thereof. In such a data center, a workload can be deployed to any of the virtualization environments. In some examples, techniques to monitor both physical and virtual infrastructure, provide visibility into the virtual infrastructure (e.g., VMs, virtual storage, virtual or virtualized networks and their control/management counterparts, etc.) and the physical infrastructure (e.g., servers, physical storage, network switches, etc.).

Examples described herein can be employed with HCI-based SDDCs deployed using virtual server rack systems such as the virtual server rack 106 of FIG. 1. A virtual server rack system can be managed using a set of tools that is accessible to all modules of the virtual server rack system. Virtual server rack systems can be configured in many different sizes. Some systems are as small as four hosts, and other systems are as big as tens of racks. As described in more detail below in connection with FIGS. 1 and 2, multi-rack deployments can include Top-of-the-Rack (ToR) switches (e.g., leaf switches, etc.) and spine switches connected using a Leaf-Spine architecture. A virtual server rack system also includes software-defined data storage (e.g., storage area network (SAN), VMWARE® VIRTUAL SAN™, etc.) distributed across multiple hosts for redundancy and virtualized networking software (e.g., VMWARE NSX™, etc.).

A drawback of some virtual server rack systems is that different hardware components located therein can be procured from different equipment vendors, and each equipment vendor can have its own independent OS (OS) installed on its hardware. For example, physical hardware resources include white label equipment such as white label servers, white label network switches, white label external storage arrays, and white label disaggregated rack architecture systems (e.g., Intel's Rack Scale Architecture (RSA), etc.). White label equipment is computing equipment that is unbranded and sold by manufacturers to system integrators that install customized software, and possibly other hardware, on the white label equipment to build computing/network systems that meet specifications of end users or customers. The white labeling, or unbranding by original manufacturers, of such equipment enables third-party system integrators to market their end-user integrated systems using the third-party system integrators' branding.

In some examples, virtual server rack systems additionally manage non-white label equipment such as original equipment manufacturer (OEM) equipment. Such OEM equipment includes OEM Servers such as HEWLETT-PACKARD® (HP®) servers and LENOVO® servers, and OEM Switches such as switches from ARISTA NETWORKS™, and/or any other OEM server, switches, or equipment. In any case, each equipment vendor can have its own independent OS installed on its hardware. For example, ToR switches and spine switches can have OSs from vendors like CISCO® and ARISTA NETWORKS, while storage and compute components may be managed by a different OS. Each OS actively manages its hardware at the resource level but there is no entity across all resources of the virtual server rack system that makes system-level runtime decisions based on the state of the virtual server rack system. For example, if a hard disk malfunctions, storage software has to reconfigure existing data into the remaining disks. This reconfiguration can require additional network bandwidth, which may not be released until the reconfiguration is complete.

Examples described herein provide HCI-based SDDCs with system-level governing features that can actively monitor and manage different hardware and software components of a virtual server rack system even when such different hardware and software components execute different OSs. As described in connection with FIG. 2, major components of a virtual server rack system can include a hypervisor, network virtualization software, storage virtualization software (e.g., software-defined data storage, etc.), a physical network OS, and external storage. In some examples, the storage virtualization (e.g., VMWARE VIRTUAL SAN™, etc.) is integrated with the hypervisor. In examples in which the physical network OS is isolated from the network virtualization software, the physical network is not aware of events occurring in the network virtualization environment and the network virtualization environment is not aware of events occurring in the physical network.

Examples disclosed herein improve network fabric migration techniques by enabling a migration from one fabric to another without disruption to existing workloads. A network fabric, also referred to as a switching fabric, represents a network topology in which components pass data to each other through interconnecting switches. The network fabric can include a plurality of layers such as a physical layer (Layer 0), a data link layer (Layer 1), a network layer (Layer 2), a common services layer (Layer 3), and a protocol mapping layer (Layer 4). For example, a network resource such as a switch using Layer 2 makes forwarding decisions based on Layer 2 addresses (e.g., media access control (MAC) addresses, etc.). In another example, a network resource such as a switch makes forwarding decisions based on Layer 3 addresses (e.g., Internet Protocol (IP) addresses, etc.).

During deployment, users can choose between Layer 2 (L2) or Layer 3 (L3) network fabric based on Leaf-Spine inter-switch fabric. As used herein, a user can be a human user, a program or a software application, a hardware device, a hypervisor, a VM controller, etc., and/or a combination thereof. In some disclosed examples, users can choose to migrate between L2 and L3 network fabric post deployment. Fabric migration from L2 network fabric to L3 network fabric and vice versa, is a major network configuration change and can cause significant outages to workload VMs if not performed correctly. In prior examples, switching between fabrics could generate outages for significant periods of time (e.g., hours, days, etc.). In some disclosed examples, an SDDC manager detects a fabric type in a network based on transmitting probe data packets to network resources and analyzing receipt of the probe data packets at the network resources.

In some disclosed examples, the SDDC manager can remove one or more paths between rack servers. In such disclosed examples, the SDDC manager can migrate the one or more removed paths between fabrics while the one or more non-removed paths enable existing workloads to continue functioning without any disruption. In some disclosed examples, the SDDC manager validates the migration between fabrics. For example, the SDDC manager can send probe packets to network resources and analyze the receipt of the probe packets at the network resources to validate success of the migration. In response to successful validation of the migration, the SDDC manager can switch between fabrics by migrating the one or more non-removed paths between fabrics.

FIG. 1 illustrates example physical racks 102, 104 in an example deployment of a virtual server rack 106. The virtual server rack 106 of the illustrated example enables abstracting hardware resources (e.g., physical hardware resources 124, 126, etc.). In some examples, the virtual server rack 106 includes a set of physical units (e.g., one or more racks, etc.) with each unit including hardware such as server nodes (e.g., compute+storage+network links, etc.), network switches, and, optionally, separate storage units. From a user perspective, the example virtual server rack 106 is an aggregated pool of logic resources exposed as one or more VMWARE ESXI™ clusters along with a logical storage pool and network connectivity. As used herein, the term "cluster" refers to a server group in a virtual environment. For example, a VMWARE ESXI™ cluster is a group of physical servers in the physical hardware resources that run VMWARE ESXI™ hypervisors to virtualize processor, memory, storage, and networking resources into logical resources to run multiple VMs that run OSs and applications as if those OSs and applications were running on physical hardware without an intermediate virtualization layer.

In the illustrated example, the first physical rack 102 has an example ToR Switch A 110, an example ToR Switch B 112, an example management switch 107, and an example server host node(0) 109. In the illustrated example, the management switch 107 and the server host node(0) 109 run a hardware management system (HMS) 108 for the first physical rack 102. The second physical rack 104 of the illustrated example is also provided with an example ToR Switch A 116, an example ToR Switch B 118, an example management switch 113, and an example server host node (0) 111. In the illustrated example, the management switch 113 and the server host node (0) 111 run an HMS 114 for the second physical rack 104.

In the illustrated example, the HMS 108, 114 connects to server management ports of the server host node(0) 109, 111 (e.g., using a baseboard management controller (BMC), etc.), connects to ToR switch management ports (e.g., using 1 gigabits per second (Gbps) links, 10 Gbps links, etc.) of the ToR switches 110, 112, 116, 118, and also connects to spine switch management ports of one or more spine switches 122. In some examples, the spine switches 122 can be powered on or off via the SDDC manager 125, 127 and/or the HMS 108, 114 based on a type of network fabric being used. In the illustrated example, the ToR switches 110, 112, 116, 118, implement leaf switches such that the ToR switches 110, 112, 116, 118, and the spine switches 122 are in communication with one another in a leaf-spine switch configuration. These example connections form a non-routable private IP management network for out-of-band (OOB) management. The HMS 108, 114 of the illustrated example uses this OOB management interface to the server management ports of the server host node(0) 109, 111 for server hardware management. In addition, the HMS 108, 114 of the illustrated example uses this OOB management interface to the ToR switch management ports of the ToR switches 110, 112, 116, 118 and to the spine switch management ports of the one or more spine switches 122 for switch management.

In the illustrated example, the ToR switches 110, 112, 116, 118 connect to server NIC ports (e.g., using 10 Gbps links, etc.) of server hosts in the physical racks 102, 104 for downlink communications and to the spine switch(es) 122 (e.g., using 40 Gbps links, etc.) for uplink communications. In the illustrated example, the management switch 107, 113 is also connected to the ToR switches 110, 112, 116, 118 (e.g., using a 10 Gbps link, etc.) for internal communications between the management switch 107, 113 and the ToR switches 110, 112, 116, 118. Also in the illustrated example, the HMS 108, 114 is provided with in-band (IB) connectivity to individual server nodes (e.g., server nodes in example physical hardware resources 124, 126, etc.) of the physical rack 102, 104. In the illustrated example, the IB connection interfaces to physical hardware resources 124, 126 via an OS running on the server nodes using an OS-specific application programming interface (API) such as VMWARE VSPHERE® API, command line interface (CLI), and/or interfaces such as Common Information Model from Distributed Management Task Force (DMTF).

Example OOB operations performed by the HMS 108, 114 include discovery of new hardware, bootstrapping, remote power control, authentication, hard resetting of non-responsive hosts, monitoring catastrophic hardware failures, and firmware upgrades. The example HMS 108, 114 uses IB management to periodically monitor status and health of the physical hardware resources 124, 126 and to keep server objects and switch objects up to date. Example IB operations performed by the HMS 108, 114 include controlling power state, accessing temperature sensors, controlling Basic Input/Output System (BIOS) inventory of hardware (e.g., CPUs, memory, disks, etc.), event monitoring, and logging events.

The HMSs 108, 114 of the corresponding physical racks 102, 104 interface with software-defined data center (SDDC) managers 125, 127 of the corresponding physical racks 102, 104 to instantiate and manage the virtual server rack 106 using physical hardware resources 124, 126 (e.g., processors, NICs, servers, switches, storage devices, peripherals, power supplies, etc.) of the physical racks 102, 104. In the illustrated example, the SDDC manager 125 of the first physical rack 102 runs on a cluster of three server host nodes of the first physical rack 102, one of which is the server host node(0) 109. In some examples, the term "host" refers to a functionally indivisible unit of the physical hardware resources 124, 126, such as a physical server that is configured or allocated, as a whole, to a virtual rack and/or workload; powered on or off in its entirety; or may otherwise be considered a complete functional unit. Also in the illustrated example, the SDDC manager 127 of the second physical rack 104 runs on a cluster of three server host nodes of the second physical rack 104, one of which is the server host node(0) 111.

In the illustrated example, the SDDC managers 125, 127 of the corresponding physical racks 102, 104 communicate with each other through one or more spine switches 122. Also in the illustrated example, communications between physical hardware resources 124, 126 of the physical racks 102, 104 are exchanged between the ToR switches 110, 112, 116, 118 of the physical racks 102, 104 through the one or more spine switches 122. In the illustrated example, each of the ToR switches 110, 112, 116, 118 is connected to each of two spine switches 122. In other examples, fewer or more spine switches may be used. For example, additional spine switches may be added when physical racks are added to the virtual server rack 106.

The SDDC manager 125 of the first physical rack 102 runs on a cluster of three server host nodes of the first physical rack 102 using a high availability (HA) mode configuration. In addition, the SDDC manager 127 of the second physical rack 104 runs on a cluster of three server host nodes of the second physical rack 104 using the HA mode configuration. Using the HA mode in this manner, enables fault tolerant operation of the SDDC manager 125, 127 in the event that one of the three server host nodes in the cluster for the SDDC manager 125, 127 fails. Upon failure of a server host node executing the SDDC manager 125, 127, the SDDC manager 125, 127 can be restarted to execute on another one of the hosts in the cluster. Therefore, the SDDC manager 125, 127 continues to be available even in the event of a failure of one of the server host nodes in the cluster.

In the illustrated example, a CLI and APIs are used to manage the ToR switches 110, 112, 116, 118. For example, the HMS 108, 114 uses CLI/APIs to populate switch objects corresponding to the ToR switches 110, 112, 116, 118. On HMS bootup, the HMS 108, 114 populates initial switch objects with statically available information. In addition, the HMS 108, 114 uses a periodic polling mechanism as part of an HMS switch management application thread to collect statistical and health data from the ToR switches 110, 112, 116, 118 (e.g., Link states, Packet Stats, Availability, etc.). There is also a configuration buffer as part of the switch object which stores the configuration information to be applied on the switch.

The HMS 108, 114 of the illustrated example of FIG. 1 is a stateless software agent responsible for managing individual hardware resources in a physical rack 102, 104. Examples of hardware elements that the HMS 108, 114 manages are servers and network switches in the physical rack 102, 104. In the illustrated example, the HMS 108, 114 is implemented using Java on Linux so that an OOB management portion of the HMS 108, 114 runs as a Java application on a white box management switch (e.g., the management switch 107, 113, etc.) in the physical rack 102, 104. However, any other programming language and any other OS may be used to implement the HMS 108, 114.

Figure 2:
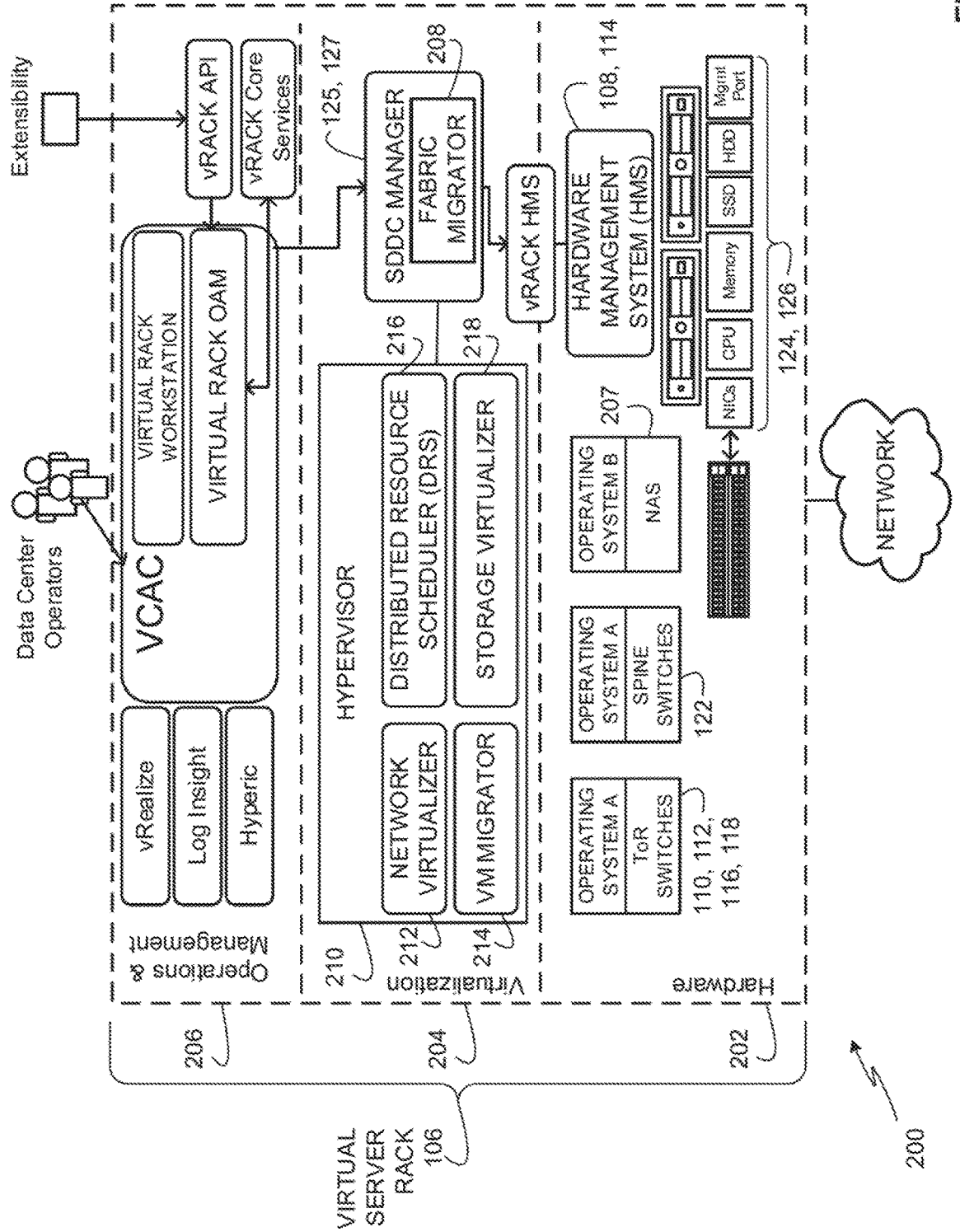
FIG. 2 illustrates an example architecture to configure and deploy the example virtual server rack of FIG. 1.

FIG. 2 depicts an example virtual server rack architecture 200 that may be used to configure and deploy the virtual server rack 106 of FIG. 1. The example architecture 200 of FIG. 2 includes a hardware layer 202, a virtualization layer 204, and an operations and management (OAM) layer 206. In the illustrated example, the hardware layer 202, the virtualization layer 204, and the OAM layer 206 are part of the example virtual server rack 106 of FIG. 1. The virtual server rack 106 of the illustrated example is based on the physical racks 102, 104 of FIG. 1. The example virtual server rack 106 configures the physical hardware resources 124, 126, virtualizes the physical hardware resources 124, 126 into virtual resources, provisions virtual resources for use in providing cloud-based services, and maintains the physical hardware resources 124, 126 and the virtual resources.

The example hardware layer 202 of FIG. 2 includes the HMS 108, 114 of FIG. 1 that interfaces with the physical hardware resources 124, 126 (e.g., processors, NICs, servers, switches, storage devices, peripherals, power supplies, etc.), the ToR switches 110, 112, 116, 118 of FIG. 1, the spine switches 122 of FIG. 1, and network attached storage (NAS) hardware 207. The HMS 108, 114 is configured to manage individual hardware nodes such as different ones of the physical hardware resources 124, 126. For example, managing of the hardware nodes involves discovering nodes, bootstrapping nodes, resetting nodes, processing hardware events (e.g., alarms, sensor data threshold triggers, etc.) and state changes, exposing hardware events and state changes to other resources and a stack of the virtual server rack 106 in a hardware-independent manner. The HMS 108, 114 also supports rack-level boot-up sequencing of the physical hardware resources 124, 126 and provides services such as secure resets, remote resets, and/or hard resets of the physical hardware resources 124, 126.

The HMS 108, 114 of the illustrated example is part of a dedicated management infrastructure in a corresponding physical rack 102, 104 including the dual-redundant management switches 107, 113 and dedicated management ports attached to the server host nodes(0) 109, 111 and the ToR switches 110, 112, 116, 118. In the illustrated example, one instance of the HMS 108, 114 runs per physical rack 102, 104. For example, the HMS 108, 114 can run on the management switch 107, 113 and the server host node(0) 109, 111 installed in the example physical rack 102 of FIG. 1. In the illustrated example of FIG. 1 both of the HMSs 108, 114 are provided in corresponding management switches 107, 113 and the corresponding server host nodes(0) 109, 111 as a redundancy feature in which one of the HMSs 108, 114 is a primary HMS, while the other one of the HMSs 108, 114 is a secondary HMS. In this manner, one of the HMSs 108, 114 can take over as a primary HMS in the event of a failure of a management switch 107, 113 and/or a failure of the server host nodes(0) 109, 111 on which the other HMS 108, 114 executes.

In some examples, to help achieve or facilitate seamless failover, two instances of an HMS 108, 114 run in a single physical rack 102, 104. In such examples, the physical rack 102, 104 is provided with two management switches, and each of the two management switches runs a separate instance of the HMS 108, 114. In such examples, the physical rack 102 of FIG. 1 runs two instances of the HMS 108 on two separate physical hardware management switches and two separate server host nodes(0), and the physical rack 104 of FIG. 1 runs two instances of the HMS 114 on two separate physical hardware management switches and two separate server host nodes(0). For example, one of the instances of the HMS 108 on the physical rack 102 serves as the primary HMS 108 and the other instance of the HMS 108 serves as the secondary HMS 108. The two instances of the HMS 108 on two separate management switches and two separate server host nodes(0) in the physical rack 102 (or the two instances of the HMS 114 on two separate management switches and two separate server host nodes(0) in the physical rack 104) are connected over a point-to-point, dedicated Ethernet link which carries heartbeats and memory state synchronization between the primary and secondary HMS instances.

The example virtualization layer 204 of the illustrated example includes the SDDC manager 125, 127. The example SDDC manager 125, 127 communicates with the HMS 108, 114 to manage the physical hardware resources 124, 126. The example SDDC manager 125, 127 creates the example virtual server rack 106 out of underlying physical hardware resources 124, 126 that may span one or more physical racks (or smaller units such as a hyper-appliance or half rack) and handles physical management of those resources. The example SDDC manager 125, 127 uses the virtual server rack 106 as a basis of aggregation to create and provide operational views, handle fault domains, and scale to accommodate workload profiles. The example SDDC manager 125, 127 keeps track of available capacity in the virtual server rack 106, maintains a view of a logical pool of virtual resources throughout the SDDC life-cycle, and translates logical resource provisioning to allocation of physical hardware resources 124, 126.

In the illustrated example, the SDDC manager 125, 127 includes a fabric migrator 208 to enable switching between network fabrics. For example, the fabric migrator 208 can enable the virtual server rack 106 to switch from L2 network fabric to L3 network fabric and vice versa. In some examples, the fabric migrator 208 detects a network fabric type being used by the virtual server rack 106. For example, the fabric migrator 208 can detect whether the network fabric type is L2 network fabric, L3 network fabric, etc. In such an example, the fabric migrator can determine the network fabric type based on sending one or more probe data packets to a network resource and analyzing a receipt (e.g., the probe data packet was received, the probe data packet was not received, etc.) of the one or more probe data packets at the network resource.

In some examples, in response to detecting the network fabric type, the fabric migrator 208 removes all but one packet flow path between the first and the second physical racks 102, 104 of FIG. 1. In such examples, the remaining packet flow path is a remediation path. As used herein, the term "packet flow path" refers to a communication link, a communication path, a data link, a data path, etc., including one or more physical network switches such as ToR switches, spine switches, etc., between a source and a destination of a transmitted data packet. As used herein, the term "remediation path" refers to one or more packet flow paths that execute a packet flow while other packet flow paths are being migrated between network fabrics. As used herein, the term "packet flow" refers to one or more data packets being transmitted from a source to a destination. In such examples, removing all packet flow paths but the remediation path can decrease the network fabric throughput, but allowing the remediation path to remain active ensures that workloads (e.g., computing tasks executed by workload domains) can continue to function without any disruption. As used herein, the term "workload domain" refers to virtual hardware policies or subsets of virtual resources of a VM mapped to physical hardware resources to execute a user application.

In some examples, the fabric migrator 208 migrates the non-remediation path packet flow paths (e.g., the removed packet flow paths) between network fabrics. For example, the fabric migrator 208 can migrate the non-remediation packet flow paths from L2 network fabric to L3 network fabric. In such examples, the fabric migrator 208 validates the migration of the non-remediation packet flow paths. For example, the fabric migrator 208 can verify whether the non-remediation packet flow paths successfully migrated (e.g., migrated without error, migrating without creating or inducing critical error, migrating without creating or inducing an unrecoverable error, etc.) from L2 network fabric to L3 network fabric. In some examples, in response to the fabric migrator 208 determining that the migration failed, the fabric migrator 208 can restore the original fabric layer configuration. In some examples, in response to the fabric migrator 208 determining that the migration succeeded, the fabric migrator 208 can remove the remediation path and complete the switch of the network fabric.

The example SDDC manager 125, 127 interfaces with an example hypervisor 210 of the virtualization layer 204. The example hypervisor 210 is installed and runs on server hosts in the example physical hardware resources 124, 126 to enable the server hosts to be partitioned into multiple logical servers to create VMs. In some examples, the hypervisor 210 may be implemented using a VMWARE ESXI™ hypervisor available as a component of a VMWARE VSPHERE® virtualization suite developed and provided by VMware, Inc. The VMWARE VSPHERE® virtualization suite is a collection of components to setup and manage a virtual infrastructure of servers, networks, and other resources.

In the illustrated example of FIG. 2, the hypervisor 210 is shown having a number of virtualization components executing thereon including an example network virtualizer 212, an example VM migrator 214, an example distributed resource scheduler (DRS) 216, and an example storage virtualizer 218. In the illustrated example, the SDDC manager 125, 127 communicates with these components to manage and present the logical view of underlying resources such as hosts and clusters. The example SDDC manager 125, 127 also uses the logical view for orchestration and provisioning of workloads.

The example network virtualizer 212 abstracts or virtualizes network resources such as physical hardware switches (e.g., the management switches 107, 113 of FIG. 1, the ToR switches 110, 112, 116, 118, and/or the spine switches 122, etc.) to provide software-based virtual or virtualized networks. The example network virtualizer 212 enables treating physical network resources (e.g., routers, switches, etc.) as a pool of transport capacity. In some examples, the network virtualizer 212 also provides network and security services to VMs with a policy driven approach. The example network virtualizer 212 includes a number of components to deploy and manage virtualized network resources across servers, switches, and clients. For example, the network virtualizer 212 includes a network virtualization manager that functions as a centralized management component of the network virtualizer 212 and runs as a virtual appliance on a server host.

In some examples, the network virtualizer 212 can be implemented using a VMWARE NSX™ network virtualization platform that includes a number of components including a VMWARE NSX™ network virtualization manager. For example, the network virtualizer 212 can include a VMware® NSX Manager™. The NSX Manager can be the centralized network management component of NSX, and is installed as a virtual appliance on any ESX™ host (e.g., the hypervisor 210, etc.) in a vCenter Server environment to provide an aggregated system view for a user. For example, an NSX Manager can map to a single vCenterServer environment and one or more NSX Edge, vShield Endpoint, and NSX Data Security instances. For example, the network virtualizer 212 can generate virtualized network resources such as a logical distributed router (LDR) and/or an edge services gateway (ESG).

The example VM migrator 214 is provided to move or migrate VMs between different hosts without losing state during such migrations. For example, the VM migrator 214 allows moving an entire running VM from one physical server to another with substantially little or no downtime. The migrating VM retains its network identity and connections, which results in a substantially seamless migration process. The example VM migrator 214 enables transferring the VM's active memory and precise execution state over a high-speed network, which allows the VM to switch from running on a source server host to running on a destination server host.

The example DRS 216 is provided to monitor resource utilization across resource pools, to manage resource allocations to different VMs, to deploy additional storage capacity to VM clusters with substantially little or no service disruptions, and to work with the VM migrator 214 to automatically migrate VMs during maintenance with substantially little or no service disruptions.

The example storage virtualizer 218 is software-defined storage for use in connection with virtualized environments. The example storage virtualizer 218 clusters server-attached hard disk drives (HDDs) and solid-state drives (SSDs) to create a shared datastore for use as virtual storage resources in virtual environments. In some examples, the storage virtualizer 218 may be implemented using a VMWARE VIRTUAL SAN™ network data storage virtualization component developed and provided by VMware, Inc.

The virtualization layer 204 of the illustrated example, and its associated components are configured to run VMs. However, in other examples, the virtualization layer 204 may additionally and/or alternatively be configured to run containers. For example, the virtualization layer 204 may be used to deploy a VM as a data computer node with its own guest OS on a host using resources of the host. Additionally and/or alternatively, the virtualization layer 204 may be used to deploy a container as a data computer node that runs on top of a host OS without the need for a hypervisor or separate OS.

In the illustrated example, the OAM layer 206 is an extension of a VMWARE VCLOUD® AUTOMATION CENTER™ (VCAC) that relies on the VCAC functionality and also leverages utilities such as VMWARE VCENTER™ LOG INSIGHT™, and VMWARE VCENTER™ HYPERIC® to deliver a single point of SDDC operations and management. The example OAM layer 206 is configured to provide different services such as health monitoring service, capacity planner service, maintenance planner service, events and operational view service, and virtual rack application workloads manager service.

Example components of FIG. 2 may be implemented using products developed and provided by VMware, Inc. Alternatively, some or all of such components may alternatively be supplied by components with the same and/or similar features developed and/or provided by other virtualization component developers.

Figure 3:
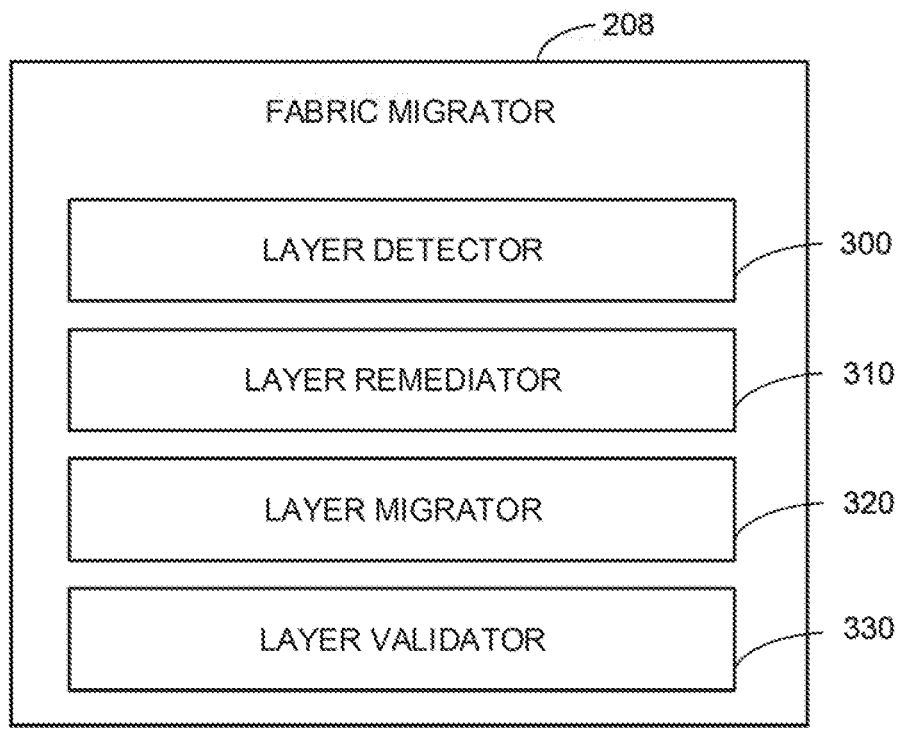
FIG. 3 is a block diagram of an example implementation of the example fabric migrator of FIG. 2.

FIG. 3 is a block diagram of an example implementation of the example fabric migrator 208 of FIG. 2. The example fabric migrator 208 converts an existing network fabric to a different network fabric while enabling workloads to continue to function without any disruption. In the illustrated example, the fabric migrator 208 includes the example layer detector 300, the example layer remediator 310, the example layer migrator 320, and the example layer validator 330.

In the illustrated example of FIG. 3, the fabric migrator 208 includes the example layer detector 300 to determine a network fabric used by the first and the second physical racks 102, 104 of FIG. 1. For example, the layer detector 300 can determine if the first and the second physical racks 102, 104 are using L2 network fabric, L3 network fabric, etc. In some examples, the layer detector 300 determines a network fabric to migrate towards based on the detected network fabric. For example, the layer detector 300 can determine to migrate a communication network from L2 to L3 network fabric based on determining that the current network fabric is L2 network fabric.

In some examples, the layer detector 300 selects one or more resources of interest to process such as hardware resources, network resources, etc. For example, the layer detector 300 can determine whether a hardware resource, a network resource, etc., has not yet been processed, visited, etc. For example, the layer detector 300 can select a leaf switch and a spine switch of interest to process (e.g., a leaf switch and a spine switch pair of interest), a link or a communication path of interest to process, a workload or a workload domain of interest to process, a virtual local area network (VLAN) of interest to process, etc. In some examples, the layer detector 300 determines whether to select another hardware resource, network resource, etc., of interest to process. For example, the layer detector 300 can determine that there are additional resources of interest to process based on obtaining information from the SDDC managers 125, 127, the HMS 108, 114, etc. For example, the layer detector 300 can determine to select another leaf switch and spine switch pair of interest, another link of interest, another workload domain of interest, another VLAN of interest, etc., to process.

In some examples, the layer detector 300 uses address resolution protocol (ARP) requests to detect L2 network fabric. For example, the layer detector 300 can use ARP requests to detect L2 network fabric because the highest layer addresses carried within ARP request packets (e.g., the ARP request packet headers) are MAC addresses. In such an example, a switch using L2 network fabric is forwarding packets based on MAC addresses and generates ARP reply packets in response to receiving ARP request packets based on successfully interpreting a MAC address in the ARP request packet header. For example, if a network fabric is L2, an ARP reply packet is sent in response to an ARP request packet. If a network fabric is L3, an ARP reply packet is not sent in response to an ARP request packet because the L3 network fabric is expecting an IP address and not a MAC address in the ARP request packet header.

In some examples, the layer detector 300 uses Internet Control Message Protocol (ICMP) echo requests to detect L3 network fabric. For example, the layer detector 300 can use ICMP echo requests to detect L3 network fabric because the highest layer address carried within ICMP request packets (e.g., the ICMP request packet headers) are IP addresses. In such an example, a switching using L3 network fabric is forwarding packets based on IP addresses and generates ICMP echo replies in response to receiving ICMP echo requests based on successfully interpreting an IP address in the ICMP echo request packet header. For example, if a network fabric is L3, an ICMP echo reply is sent in response to an ICMP echo request packet. If a network if L2, an ICMP echo reply is not sent in response to an ICMP echo request packet because the L2 network fabric is expecting a MAC address and not an IP address in the ICMP request packet header.

In some examples, the layer detector 300 determines that the network fabric being used is L2 network fabric based on analyzing a packet flow path between a leaf switch of interest and a spine switch of interest. In such examples, the layer detector 300 sends ARP request packets on a VLAN of interest from a leaf switch of interest to a spine switch of interest. The example layer detector 300 can determine that the VLAN of interest is using L2 network fabric based on determining that the ARP request packet arrived at the spine switch of interest. For example, the layer detector 300 can determine that a VLAN generated by the SDDC manager (1) 125 of FIGS. 1-2 is using L2 network fabric based on the layer detector 300 sending an ARP request packet from the ToR Switch A 110 of the first physical rack 102 of FIG. 1 to a first one of the spine switches 122 of FIG. 1 and (2) determining that the first one of the spine switches 122 received the ARP request packet.

In other examples or the same examples, the layer detector 300 determines that the network fabric being used is L2 network fabric based on analyzing a packet flow path between spine switches of interest. In such examples, the layer detector 300 sends ARP requests on a VLAN of interest from a first switch of interest to a second spine switch of interest. The example layer detector 300 can determine that the VLAN of interest is using L2 network fabric based on determining that the ARP request packet arrived at the second spine switch of interest. For example, the layer detector 300 can determine that a VLAN generated by the SDDC manager (1) 125 is using L2 network fabric based on the layer detector 300 sending an ARP request packet from the first one of the spine switches 122 to a second one of the spine switches 122 and (2) determining that the second one of the spine switches 122 received the ARP request packet.

In some examples, the layer detector 300 determines that the network fabric being used is L3 network fabric. In such examples, the layer detector 300 sends ICMP echo request packets on a VLAN of interest from a leaf switch of interest to a spine switch of interest. The example layer detector 300 can determine that the VLAN of interest is using L3 network fabric based on determining that the ICMP echo reply arrived at the leaf switch of interest. For example, the layer detector 300 can determine that a VLAN generated by the SDDC manager (1) 125 is using L3 network fabric based on the layer detector 300 sending an ICMP echo request packet from the ToR Switch A 110 of the first physical rack 102 to a first one of the spine switches 122 and (2) determining that the ToR Switch A 110 received an ICMP echo reply.

In some examples, the layer detector 300 determines that the network fabric being used is not L3 network fabric based on an existence of a communication path between spine switches. In a communication network using L3 network fabric, there are no communication paths between spine switches because every leaf switch is connected to every spine switch in the network fabric. For example, the spine switches can handle L3 network fabric with high port density, which allows for scalability. As a result, the communication network would be using L2 network fabric if there is a link between a pair of spine switches. For example, the layer detector 300 can determine that a data link between two spine switches exists based on data transfer between the two spine switches. In such an example, the layer detector 300 determines that the network fabric being used is not L3 network fabric because a communication network would not have such spine switch communication paths when using L3 network fabric.

In some examples, the layer detector 300 can determine that the network fabric being used is not L3 network fabric based on determining whether a VXLAN tunnel configuration or a multicast configuration is valid. For example, the layer detector 300 can send a probe packet (e.g., an ARP broadcast packet) from a first end of a VXLAN tunnel to a second end of the VXLAN tunnel. If the layer detector 300 sends an ARP broadcast packet from the first end and receives an ARP reply packet from a device at the second end, then the VXLAN tunnel configuration and the multicast configuration is valid. For example, the layer detector 300 can send an ARP broadcast packet in a communication network and determine whether a VXLAN Tunnel Endpoint (VTEP) device replies. In response to the example layer detector 300 obtaining an ARP reply packet from the VTEP device, then the layer detector 300 can determine that the network fabric being used is L3 network fabric. Alternatively, the example layer detector 300 can determine that the network fabric being used is not L3 network fabric based on not receiving an ARP reply packet from the VTEP device. For example, the layer detector 300 may not receive the ARP reply packet from the VTEP device based on an invalid (e.g., a partially invalid, a completely invalid, etc.) multicast configuration.

In the illustrated example, the fabric migrator 208 includes the layer remediator 310 to configure a remediation path during a packet flow migration operation. For example, the layer remediator 310 can remove all packet flow paths except for a remediation path during a packet flow path migration operation. For example, the layer remediator 310 can remove all packet flow paths between the first and the second physical racks 102, 104 of FIG. 1 except for a remediation path between the ToR Switch A 110 of the first physical rack 102 and the ToR Switch B 118 of the second physical rack 104 via a first one of the spine switches 122 of FIG. 1. In some examples, the layer remediator 310 removes the remediation path when a migration of all other packet flow paths has been validated.

In the illustrated example, the fabric migrator 208 includes the layer migrator 320 to migrate a packet flow path between network fabrics. In some examples, the layer migrator 320 migrates a packet flow path from an L2 network fabric to an L3 network fabric. In some examples, the layer migrator 320 selects hardware resources, network resources, etc., of interest to process. For example, the layer migrator 320 can determine whether a hardware resource, a network resource, etc., has not yet been processed, visited, etc. For example, the layer migrator 320 can select a leaf switch and a spine switch of interest to process (e.g., a leaf switch and a spine switch pair of interest), a link or a communication path of interest to process, a workload or a workload domain of interest to process, a VLAN of interest to process, etc. In some examples, the layer migrator 320 determines whether to select another hardware resource, network resource, etc., of interest to process. For example, the layer migrator 320 can determine that there are additional resources of interest to process based on obtaining information from the SDDC managers 125, 127, the HMS 108, 114, etc. For example, the layer migrator 320 can determine to select another leaf switch and spine switch pair of interest, another link of interest, another workload domain of interest, another VLAN of interest, etc., to process.

In some examples, the layer migrator 320 determines whether an L2 data link between a leaf switch of interest and a spine switch of interest has been processed. In such examples, the layer migrator 320 determines whether the L2 data link is part of a remediation path. For example, the layer migrator 320 can process an L2 data link between the ToR Switch A 110 of the first physical rack 102 and a first one of the spine switches 122 that is not in a remediation path. In such an example, the layer migrator 320 can process the L2 data link by performing one or more of the following: (1) disabling the L2 data link, (2) removing a virtual portchannel (VPC) configuration of the L2 data link, (3) selecting an available private subnet of the L2 data link for future use, (4) configuring the available private subnet on both the ToR Switch A 110 and the first one of the spine switches 122, (5) configuring Border Gateway Protocol (BGP) on both of the switches 110, 122, and/or (6) enabling Protocol Independent Multicast (PIM) on both of the switches 110, 122.

In some examples, the layer migrator 320 determines whether a VLAN of interest corresponding to an L2 data link has been processed. In such examples, the layer migrator 320 can process the VLAN of interest by performing one or more of the following: (1) removing a virtual extensible local area network (VXLAN) configuration from the VLAN, (2) freeing a multicast group address corresponding to the VLAN for future use, (3) removing the PIM configuration from the VLAN, (4) adding the VLAN to a VPC configuration, and/or (5) enabling a spanning tree for the VLAN.

In some examples, the layer migrator 320 migrates a packet flow path from an L3 network fabric to an L2 network fabric. In some examples, to migrate the packet flow path, the layer migrator 320 determines whether an L3 data link between a leaf switch of interest and a spine switch of interest has been processed. In such examples, the layer migrator 320 determines whether the L3 data link is part of a remediation path. For example, the layer migrator 320 can process an L2 data link between the ToR Switch A 110 of the first physical rack 102 and a first one of the spine switches 122 that is not in a remediation path. In such an example, the layer migrator 320 can process the L2 data link by performing one or more of the following: (1) disabling the L2 data link, (2) removing a virtual portchannel (VPC) configuration of the L2 data link, (3) selecting an available private subnet of the L2 data link for future use, (4) configuring the available private subnet on both the ToR Switch A 110 and the first one of the spine switches 122, (5) configuring Border Gateway Protocol (BGP) on both of the switches 110, 122, and/or (6) enabling Protocol Independent Multicast (PIM) on both of the switches 110, 122.

In some examples, the layer migrator 320 determines whether a VLAN of interest corresponding to an L3 data link has been processed. In such examples, the layer migrator 320 can process the VLAN of interest by performing one or more of the following: (1) removing a VXLAN configuration from the VLAN, (2) freeing a multicast group address corresponding to the VLAN for future use, (3) removing the PIM configuration from the VLAN, (4) adding the VLAN to a VPC configuration, and/or (5) enabling a spanning tree for the VLAN.

In the illustrated example of FIG. 3, the fabric migrator 208 includes the layer validator 330 to determine if a migration between network fabrics is successful. In some examples, the layer validator 330 determines if a migration from an L2 network fabric to an L3 network fabric is successful. In such examples, the layer validator 330 determines whether a converted L3 data link (e.g., an L2 link migrated to an L3 link) between a leaf switch of interest and a spine switch of interest has been processed. In such examples, the layer validator 330 determines whether the converted L3 data link has been processed by determining whether the converted L3 data link is part of a remediation path. For example, the layer validator 330 can process a converted L3 data link between the ToR Switch A 110 and the first one of the spine switches 122 that is not in a remediation path. In such an example, the layer validator 330 can process the converted L3 data link by (1) enabling the converted L3 link and (2) sending an ICMP echo request packet from the ToR Switch A 110 to the first one of the spine switches 122. If the ToR Switch A 110 did not receive an ICMP echo reply packet, then the example layer validator 330 determines that the converted L3 data link did not successfully migrate from L2 network fabric to L3 network fabric (e.g., the validation operation fails). If the (1) ToR Switch A 110 received an ICMP echo reply packet and (2) VPC is enabled for the converted L3 data link, then the example layer validator 330 determines that the converted L3 data link did not successfully migrate from L2 network fabric to L3 network fabric.

In some examples, the layer validator 330 determines if a migration from an L3 network fabric to an L2 network fabric is successful. In such examples, the layer validator 330 determines whether a converted L2 data link between a leaf switch of interest and a spine switch of interest has been processed. In such examples, the layer validator 330 determines whether the converted L2 data link has been processed by determining whether the converted L2 data link is part of a remediation path. For example, the layer validator 330 can process a converted L2 data link between the ToR Switch A 110 and the first one of the spine switches 122 that is not in a remediation path. In such an example, the layer validator 330 can process the converted L2 data link by (1) enabling the converted L2 link and (2) sending an ICMP echo request packet from the ToR Switch A 110 to the first one of the spine switches 122. If the ToR Switch A 110 did not receive an ICMP echo reply packet, then the example layer validator 330 determines that the converted L2 data link did not successfully migrate from L3 network fabric to L2 network fabric (e.g., the validation operation fails). If the (1) ToR Switch A 110 received an ICMP echo reply packet and (2) VPC is enabled for the converted L2 data link, then the example layer validator 330 determines that the converted L2 data link did not successfully migrate from L3 network fabric to L2 network fabric.

In some examples, the layer validator 330 restores a network fabric layer configuration to a previously known working configuration. For example, in response to determining that the validation operation fails, the layer validator 330 can revert or unmigrate all migrated configurations, links, settings, etc., to a previously known working configuration. For example, the layer validator 330 can determine that a migration from an L2 network fabric to an L3 network fabric was not successful. In such an example, the layer validator 330 can revert all migrated components back to the L2 network fabric. In some examples, the layer validator 330 can direct the layer detector 300, the layer remediator 310, the layer migrator 320, etc., and/or a combination thereof to restart the process when all migrated components have been reverted back to the previously known working configuration.

Figure 4:
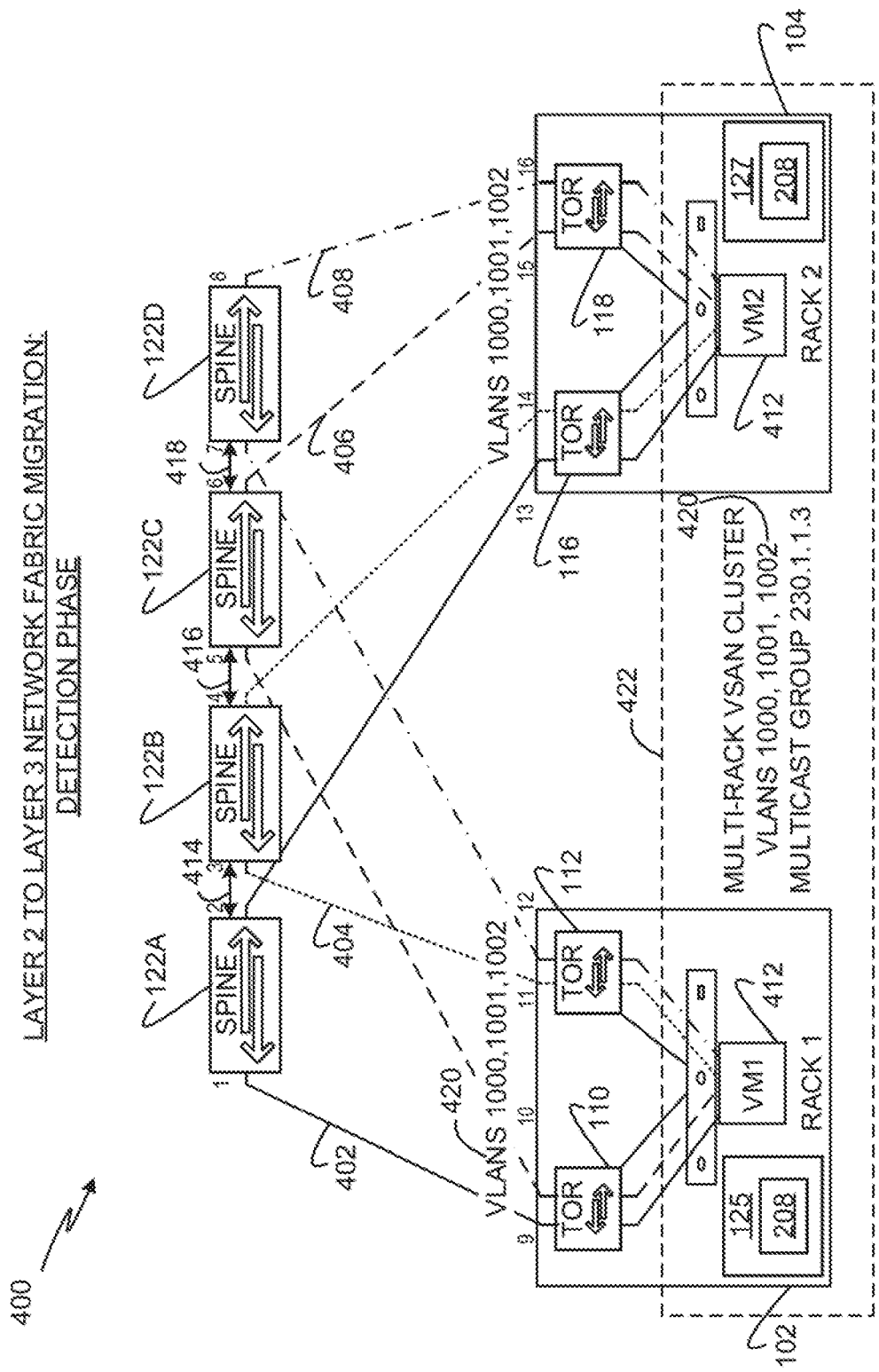
FIG. 4 illustrates an example communication network in a detection phase of a Layer 2 to a Layer 3 network fabric migration.

FIG. 4 depicts an example communication network 400 implemented using the example architecture of FIG. 3 during an L2 network fabric detection phase. FIG. 4 depicts example first, second, third, and fourth communication paths 402, 404, 406 and 408 between an example first VM 410 of the example first physical rack 102 and an example second VM 412 of the example second physical rack 104. In the illustrated example of FIG. 4, the first VM 410 is coupled to a set of first, second, third and fourth spine switches 122A-122D via the ToR Switch A 110 and the ToR Switch B 112 of the first physical rack 102 of FIG. 1. In the illustrated example, the set of spine switches 122A-122D correspond to individual instances of the spine switches 122 of FIG. 1. The second VM 412 of the illustrated example is coupled to the first, second, third and fourth spine switches 122A-122D via the ToR Switch A 116 and the ToR Switch B 112 of the second physical rack 104 of FIG. 1.

The first example communication path 402 travels from the first VM 410 through the ToR Switch A 110 of the first physical rack 102 to the first spine switch 122A, to the ToR Switch A 116 of the second physical rack 104, and finally, to the second VM 412. The second example communication path 404 travels from the first VM 410 through the ToR Switch B 112 of the first physical rack 102, to the second spine switch 122B, to the ToR Switch A 116 of the second physical rack 104, and finally, to the second VM 412. The third example communication path 406 travels from the first VM 410 through the ToR Switch A 110 of the first physical rack 102 to the third spine switch 122C, to the ToR Switch B 118 of the second physical rack 104, and finally, to the second VM 412. The fourth example communication path 408 travels from the first VM 410 through the ToR Switch B 112 of the first physical rack 102, to the fourth spine switch 122D, to the ToR Switch B 118 of the second physical rack 104, and finally, to the second VM 412. In the illustrated example, the set of spine switches 122A-D communicate with each other via first, second, and third spine switch communication paths 414, 416, 418. For example, the first and the second spine switch 122A-B can communicate with each other via the first spine switch communication path 414.

The communication network 400 of the illustrated example includes a set of VLANs 1000, 1001, 1002 420 and a multi-cast group 422. The example set of VLANs 420 is a broadcast domain that includes the first and the second VMs 410, 412 and the corresponding ToR switches 110, 112, 116, 118. The example multi-cast group 422 has a group address of 230.1.1.3, for example. For example, the first and the second VMs 410, 412 can contact a local network resource such as a distributed logical router generated by the network virtualizer 212 of FIG. 2 to subscribe to the group address.

In the illustrated example of FIG. 4, the network fabric layer of the communication network 400 is L2. The fabric migrator 208 of the illustrated example of FIG. 4 can determine that the network fabric layer is L2 by sending one or more probe packets such as ARP request packets to one or more network resources. For example, the fabric migrator 208 can transmit an ARP request packet from the ToR Switch A 110 to the first spine switch 122A via the first communication path 402. In such an example, the fabric migrator 208 can determine that the first communication path 402 is L2 network fabric when the first spine switch 122A obtains or receives the ARP request packet or the ToR Switch A 110 receives an ARP reply packet from the first spine switch 122A. In another example, the fabric migrator 208 can transmit an ARP request packet from the first spine switch 122A to the second spine switch 122B via the first spine switch communication path 414. In such an example, the fabric migrator 208 can determine that the first spine switch communication path 414 is L2 network fabric when the second spine switch 122B receives the ARP request packet or the first spine switch 122A receives an ARP reply packet from the second spine switch 122B.

Figure 5:
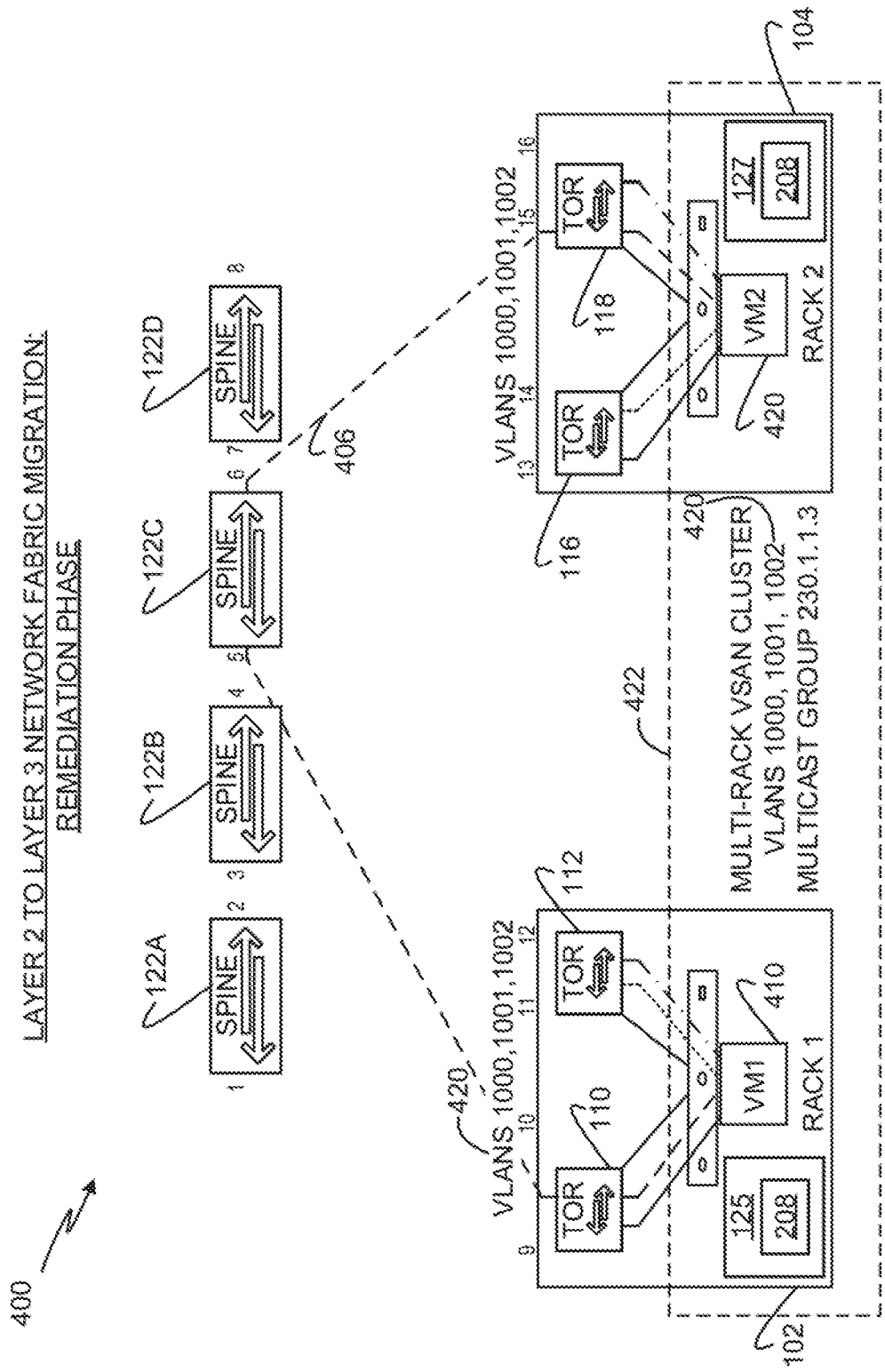
FIG. 5 illustrates the example communication network of FIG. 4 in a remediation phase of a Layer 2 to a Layer 3 network fabric migration.

FIG. 5 depicts the example communication network 400 of FIG. 4 implemented using the example architecture of FIG. 3 during an L2 network fabric remediation phase. In the illustrated example, the fabric migrator 208 removes all communication paths except for the third communication path 406. For example, the fabric migrator 208 removed the first, second, and fourth communication paths 402, 404, 408 and the first through the third spine switch communication paths 414, 416, 418 of FIG. 4. In the illustrated example of FIG. 5, the third communication path 406 is a remediation path. For example, data transfer between the first and the second VMs 410, 412 can continue without disruption via the third communication path 406 designated as the remediation path. For example, the third communication path 406 enables continuous operation of the communication network 400 without disruption.

Figure 6:
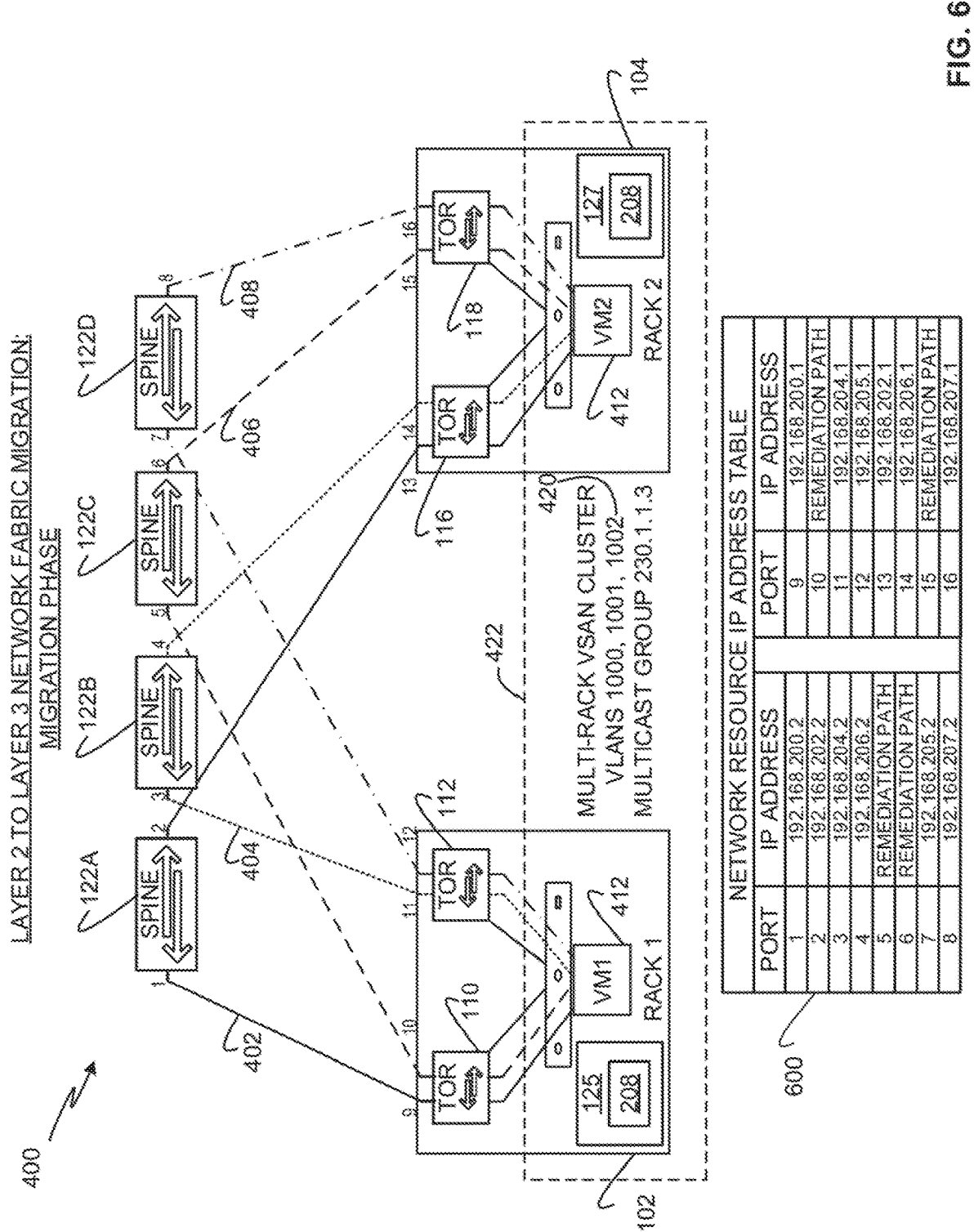
FIG. 6 illustrates the example communication network of FIGS. 4-5 in a migration phase of a Layer 2 to a Layer 3 network fabric migration.

FIG. 6 depicts the example communication network 400 of FIG. 4 implemented using the example architecture of FIG. 3 during an L2 network fabric migration phase. In the illustrated example of FIG. 6, the fabric migrator 208 migrates the first, second, and fourth communication paths 402, 404, 408 and the first through the third spine switch communication paths 414, 416, 418 from L2 network fabric to L3 network fabric. The third communication path 406 of the illustrated example of FIG. 6 has not been migrated from L2 to L3 network fabric to allow data transfer between the first and the second VMs 410, 412 to continue without disruption while the migrated links are validated.

In the illustrated example, a network resource IP address table 600 depicts an example IP address and example port for each communication path 402, 404, 408 and for each spine switch communication path 414, 416, 418. For example, port 1 represents an IP port on the first spine switch 122A used for communication between the first spine switch 122A and the ToR Switch A 110 of the first physical rack 102. Port 1 in the network resource IP address table 600 corresponds to an IP address of 192.168.200.2. Similarly, port 9 represents an IP port on the ToR Switch A 110 used for communication between the ToR Switch A 110 and the first spine switch 122A. Port 9 in the network resource IP address table 600 corresponds to an IP address of 192.168.200.1, where the IP address corresponding to Port 9 is in a same subnet of the IP address corresponding to Port 1. In the network resource IP address table 600, the IP addresses corresponding to ports 5, 6, 10, and 15 are denoted as REMEDIATION PATH since ports 5, 6, 10, and 15 are the ports used to execute data transfer between the physical racks 102, 104 while the network fabric migration process occurs. The example fabric migrator 208 can migrate the third example communication path 406 from L2 to L3 network fabric when the fabric migrator 208 validates the migration of the first, second, and fourth communication paths 402, 404, 408 and the first through the third spine switch communication paths 414, 416, 418.

Figure 7:
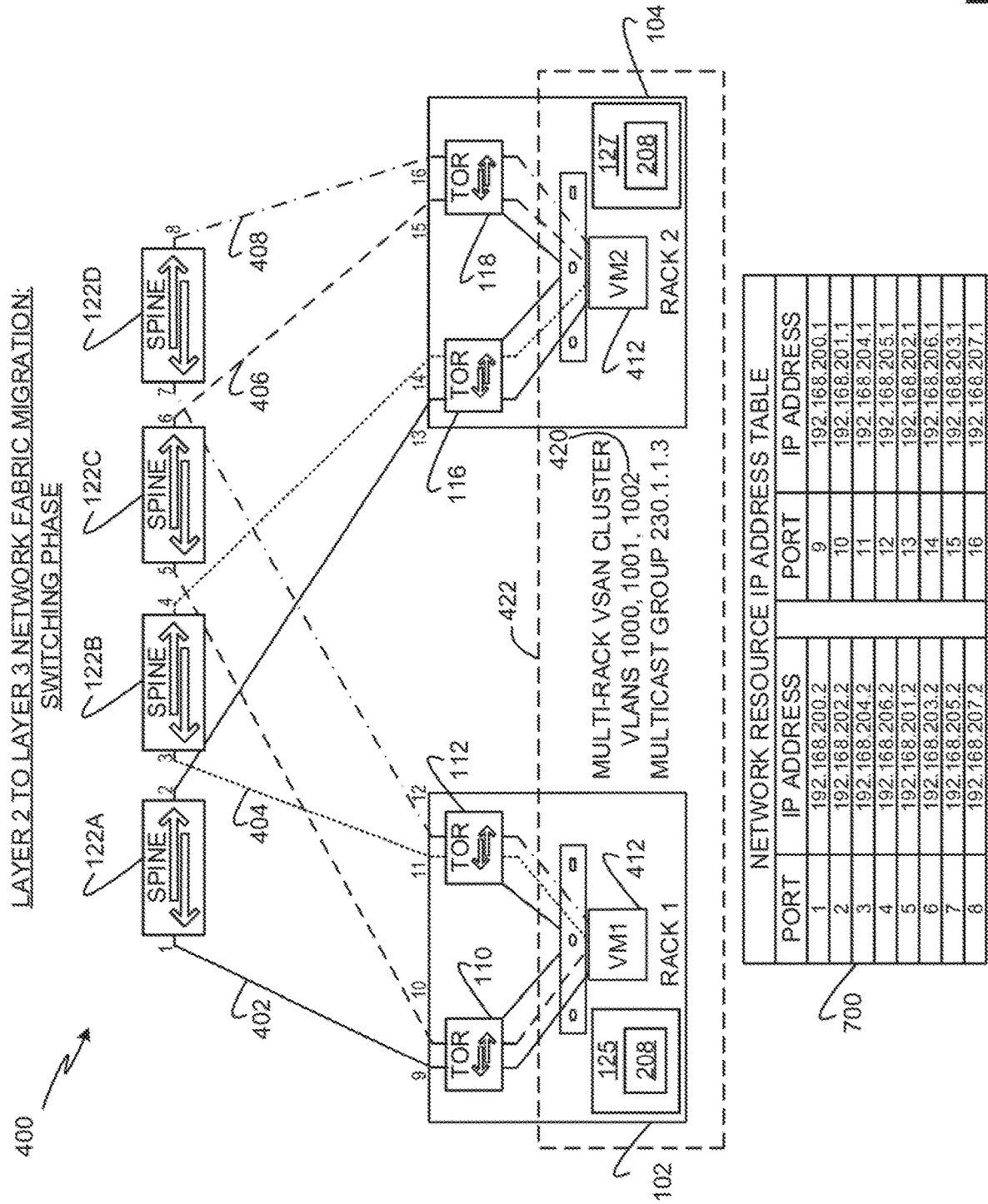
FIG. 7 illustrates the example communication network of FIGS. 4-6 in a switching phase of a Layer 2 to a Layer 3 network fabric migration.

FIG. 7 depicts the example communication network 400 of FIG. 4 implemented using the example architecture of FIG. 3 after an L2 network fabric switching phase. In the illustrated example of FIG. 7, the fabric migrator 208 removed the remediation path and migrated the remediation path from L2 network fabric to L3 network fabric to complete the L2 to L3 network fabric migration of the communication network 400 of FIG. 4. As depicted in a network resource IP address table 700, an IP address has been assigned to the previous remediation path ports of 5, 6, 10, and 15 to illustrate that the third communication path 406 has been migrated from L2 to L3 network fabric.

In the illustrated example of FIG. 7, in response to migrating from L2 to L3 network fabric, a data packet exchanged between a pair of network resources includes an IP address and/or port in a high-level address of the data packet. For example, a data packet sent from the ToR Switch A 110 of the first physical rack 102 to the first spine switch 122A can include an IP address and a port of the ToR Switch A 110 as the source IP address and source port and can include an IP address and port of the first spine switch 122A as the destination IP address and destination port.

Figure 8:
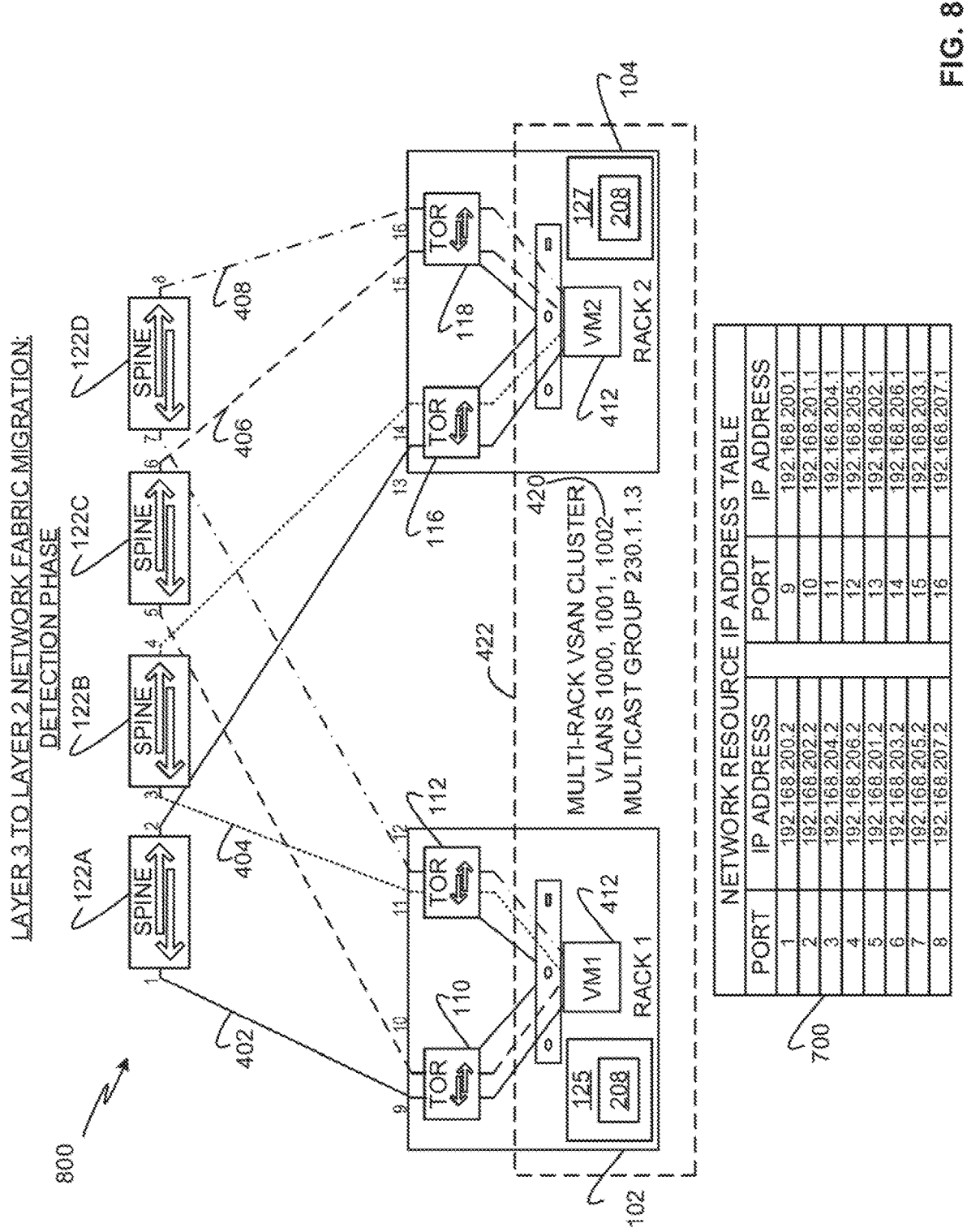
FIG. 8 illustrates another example communication network in a detection phase of a Layer 3 to a Layer 2 network fabric migration.

FIG. 8 depicts another example communication network 800 implemented using the example architecture of FIG. 3 during an L3 network fabric detection phase. FIG. 8 depicts the example first, second, third, and fourth communication paths 402, 404, 406 and 408 and the multicast group 422 of FIGS. 4-7. In the illustrated example of FIG. 8, the network resource IP address table 700 of FIG. 7 depicts port numbers and corresponding IP addresses of the spine switches 122A-122D and the ToR switches 110, 112, 116, 118 of FIGS. 1-2 and 4-7.

In the illustrated example of FIG. 8, the network fabric layer of the communication network 800 is L3. The fabric migrator 208 of the illustrated example can determine that the network fabric layer is L3 by sending one or more probe packets such as ICMP echo request packets to one or more network resources. For example, the fabric migrator 208 can transmit an ICMP echo request packet from the ToR Switch A 110 to the first spine switch 122A via the first communication path 402. In such an example, the fabric migrator 208 can determine that the first communication path 402 is L3 network fabric when the first spine switch 122A receives the ICMP echo request packet or the ToR Switch A 110 obtains or receives an ICMP echo reply packet from the first spine switch 122A.

In some examples, the fabric migrator 208 can determine that the network fabric layer of the communication network 800 is not L3 based on the fabric migrator 208 determining that there is a link between a pair of the spine switches 122A-122D. In some examples, the fabric migrator 208 can determine that the network fabric layer of the communication network 800 is not L3 based on an invalid VXLAN tunnel configuration or a multicast configuration for one or more VLANs in the set of VLANs 420.

Figure 9:
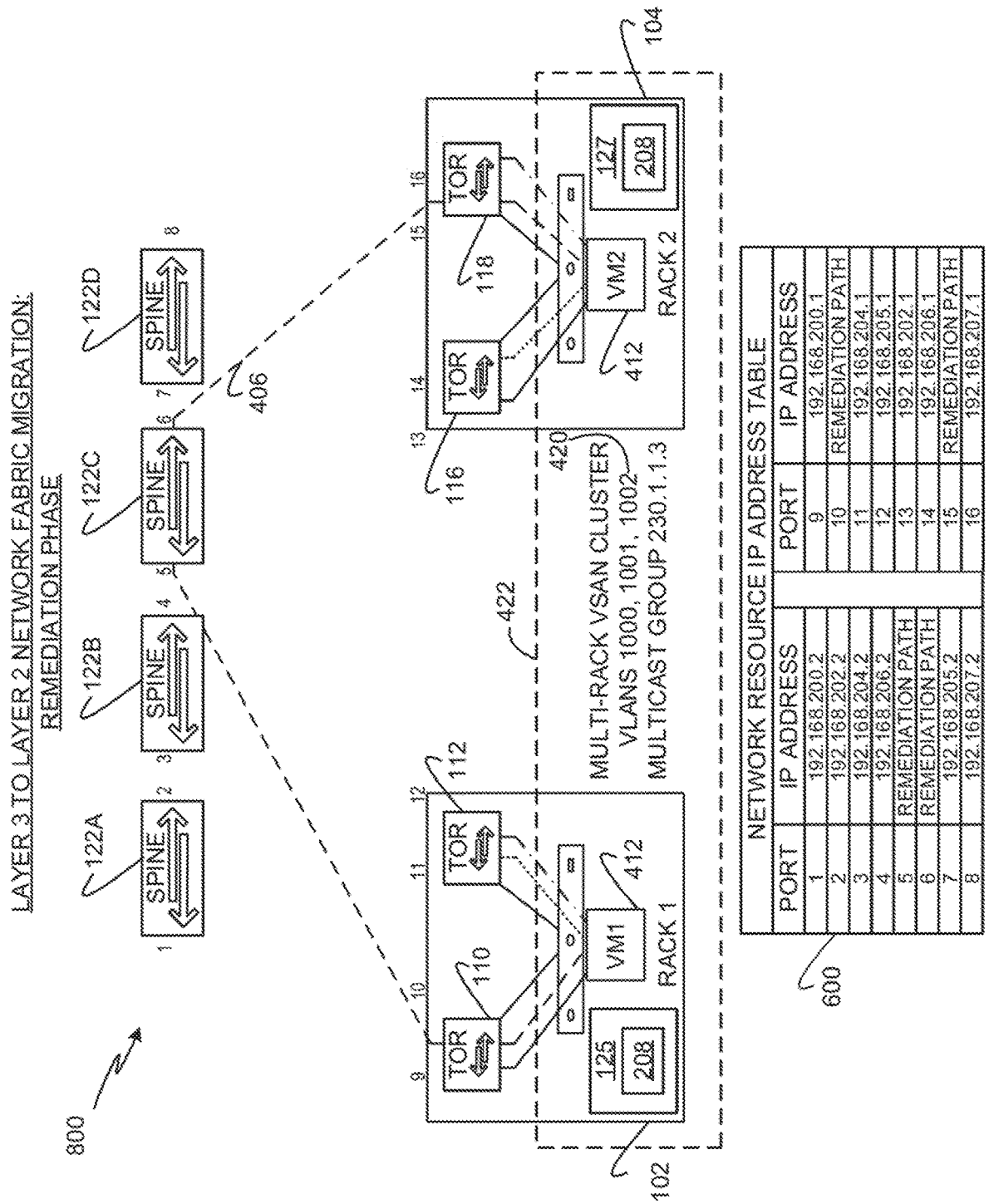
FIG. 9 illustrates the example communication network of FIG. 8 in a remediation phase of a Layer 3 to a Layer 2 network fabric migration.

FIG. 9 depicts the example communication network 800 of FIG. 8 implemented using the example architecture of FIG. 3 during an L3 network fabric remediation phase. In the illustrated example of FIG. 9, the fabric migrator 208 removes all communication paths except for the third communication path 406. For example, the fabric migrator 208 removed the first, second, and fourth communication paths 402, 404, 408 of FIG. 8. In the illustrated example, the third communication path 406 is a remediation path. For example, data transfer between the first and the second VMs 410, 412 can continue without disruption via the third communication path 406 designated as the remediation path. For example, the third communication path 406 enables continuous operation of the communication network 800 without disruption.

In the network resource IP address table 600 of the illustrated example of FIG. 9, the IP addresses corresponding to ports 5, 6, 10, and 15 are denoted as REMEDIATION PATH since ports 5, 6, 10, and 15 are the ports used to execute data transfer between the physical racks 102, 104 while the network fabric migration process occurs. The example fabric migrator 208 can migrate the third example communication path 406 from L3 to L2 network fabric when the fabric migrator 208 validates the migration of the first, second, and fourth communication paths 402, 404, 408.

Figure 10:
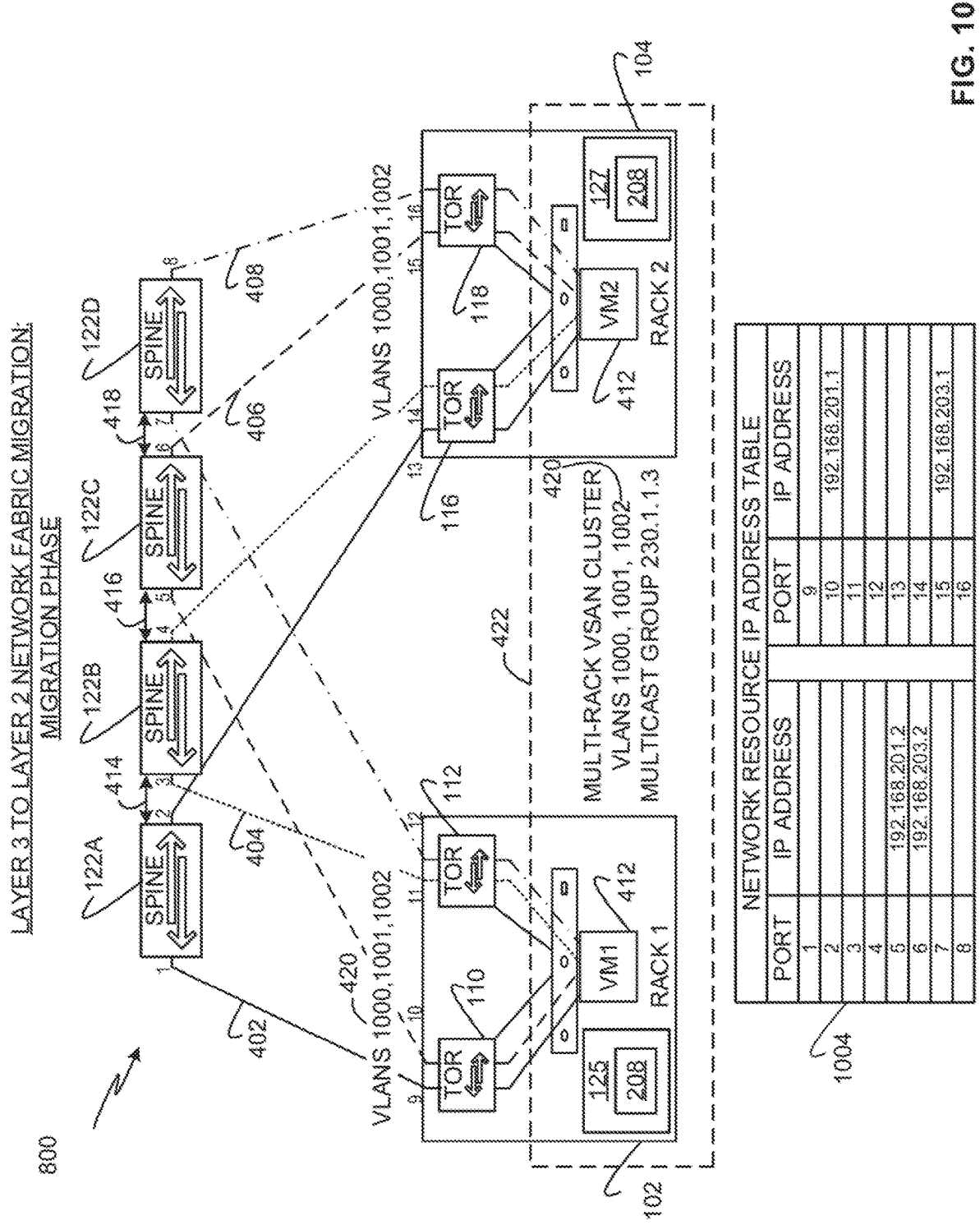
FIG. 10 illustrates the example communication network of FIGS. 8-9 in a migration phase of a Layer 3 to a Layer 2 network fabric migration.

FIG. 10 depicts the example communication network 800 of FIGS. 8-9 implemented using the example architecture of FIG. 3 during an L3 network fabric migration phase. In the illustrated example of FIG. 10, the fabric migrator 208 migrated the first, second, and fourth communication paths 402, 404, 408 from L3 network fabric to L2 network fabric. In addition, the fabric migrator 208 added the first through the third spine switch communication paths 414, 416, 418 of FIG. 4. The third communication path 406 of the illustrated example of FIG. 10 has not been migrated from L3 to L2 network fabric to allow data transfer between the first and the second VMs 410, 412 to continue without disruption while the migrated links are validated.

In the illustrated example of FIG. 10, a network resource IP address table 1004 depicts an example port for each communication path 402, 404, 408 and for each spine switch communication path 414, 416, 418. In the illustrated example, the network resource IP address table 1004 depicts example IP addresses for ports 5, 6, 10, and 15 as they are the remediation path during the L3 network fabric migration phase. For example, port 5 represents an IP port on the third spine switch 122C used for communication between the third spine switch 122C and the ToR Switch A 110 of the first physical rack 102. Port 5 in the network resource IP address table 1004 of the illustrated example corresponds to an IP address of 192.168.201.2.

Figure 11:
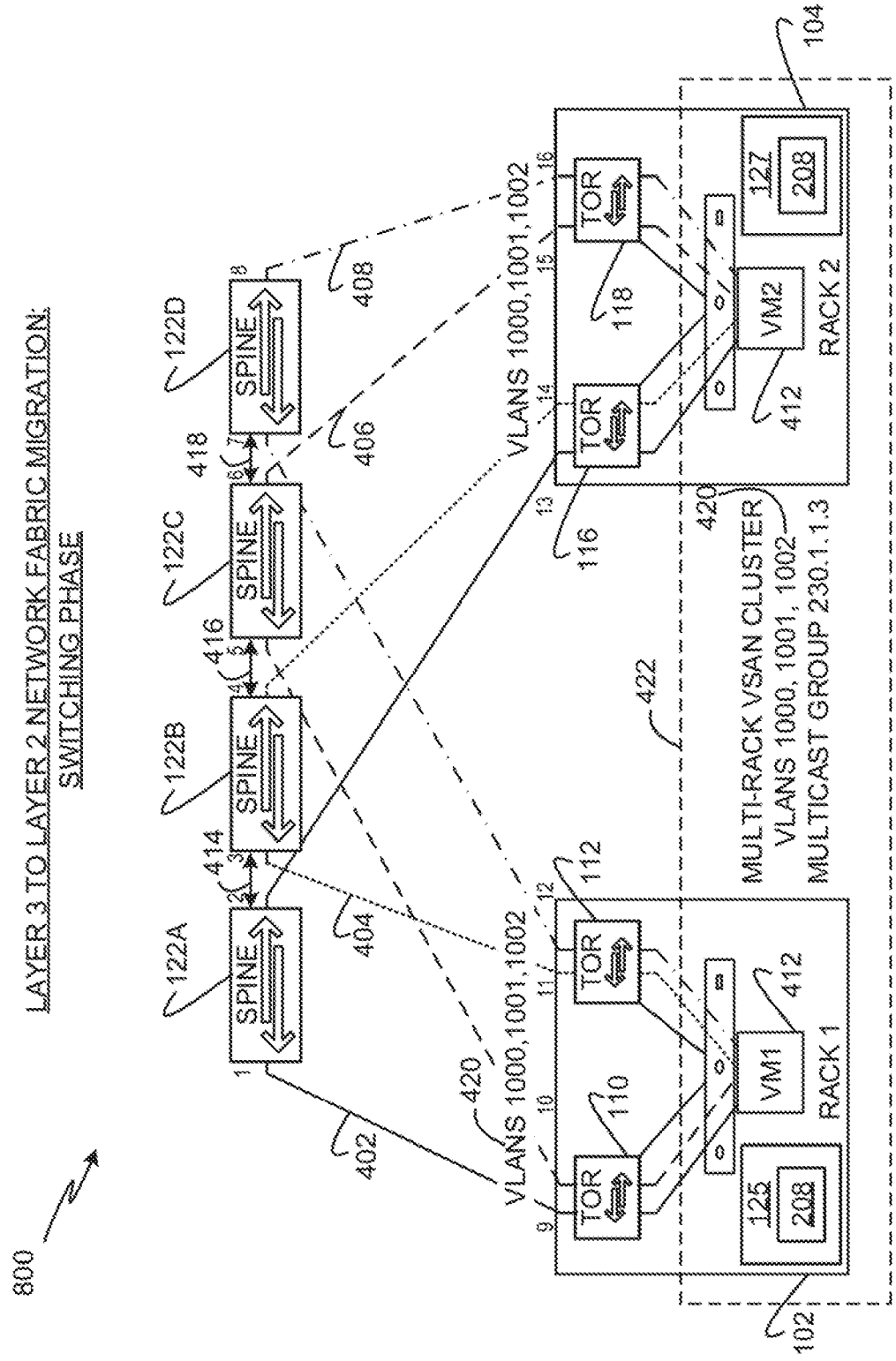
FIG. 11 illustrates the example communication network of FIGS. 8-10 in a switching phase of a Layer 3 to a Layer 2 network fabric migration.

FIG. 11 depicts the example communication network 800 of FIGS. 8-10 implemented using the example architecture of FIG. 3 after an L3 network fabric switching phase. In the illustrated example of FIG. 11, the fabric migrator 208 removed the remediation path and migrated the remediation path from L3 network fabric to L2 network fabric to complete the L3 to L2 network fabric migration of the communication network 800 of FIGS. 8-11. In the illustrated example of FIG. 11, in response to migrating from L3 to L2 network fabric, a data packet exchanged between a pair of network resources includes a MAC address in a high-level address of the data packet. For example, a data packet sent from the ToR Switch A 110 of the first physical rack 102 to the first spine switch 122A can include a MAC address of the ToR Switch A 110 as the source MAC address and can include a MAC address of the first spine switch 122A as the destination MAC address.

While an example manner of implementing the example fabric migrator 208 of FIGS. 2-11 is illustrated in FIG. 3, one or more of the elements, processes and/or devices illustrated in FIG. 3 may be combined, divided, re-arranged, omitted, eliminated, and/or implemented in any other way. Further, the example layer detector 300, the example layer remediator 310, the example layer migrator 320, the example layer validator 330, and/or, more generally, the example fabric migrator 208 of FIGS. 2-11 may be implemented by hardware, software, firmware, and/or any combination of hardware, software and/or firmware. Thus, for example, any of the example layer detector 300, the example layer remediator 310, the example layer migrator 320, the example layer validator 330, and/or, more generally, the example fabric migrator 208 of FIGS. 2-11 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example layer detector 300, the example layer remediator 310, the example layer migrator 320, the example layer validator 330 is/are hereby expressly defined to include a non-transitory computer readable storage device or storage disk such as a memory, a digital versatile disk (DVD), a compact disk (CD), a Blu-ray disk, etc. including the software and/or firmware. Further still, the example fabric migrator 208 of FIGS. 2-11 may include one or more elements, processes and/or devices in addition to, or instead of, those illustrated in FIG. 3, and/or may include more than one of any or all of the illustrated elements, processes and devices.

Flowcharts representative of example machine readable instructions for implementing the example fabric migrator 208 of FIGS. 2-11 are shown in FIGS. 12-21B. In these examples, the machine readable instructions include a program for execution by a processor such as a processor 2212 shown in the example processor platform 2200 discussed below in connection with FIG. 22. The program may be embodied in software stored on a non-transitory computer readable storage medium such as a CD-ROM, a floppy disk, a hard drive, a DVD, a Blu-ray disk, or a memory associated with the processor 2212, but the entire program and/or parts thereof can alternatively be executed by a device other than the processor 2212 and/or embodied in firmware or dedicated hardware. Further, although the example program is described with reference to the flowchart illustrated in FIGS. 12-21B, many other methods of implementing the example fabric migrator 208 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, a Field Programmable Gate Array (FPGA), an Application Specific Integrated circuit (ASIC), a comparator, an operational-amplifier (op-amp), a logic circuit, etc.) structured to perform the corresponding operation without executing software or firmware.

As mentioned above, the example processes of FIGS. 12-21B may be implemented using coded instructions (e.g., computer and/or machine readable instructions) stored on a non-transitory computer and/or machine readable medium such as a hard disk drive, a flash memory, a read-only memory, a CD, a DVD, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. "Including" and "comprising" (and all forms and tenses thereof) are used herein to be open ended terms. Thus, whenever a claim lists anything following any form of "include" or "comprise" (e.g., comprises, includes, comprising, including, etc.), it is to be understood that additional elements, terms, etc. may be present without falling outside the scope of the corresponding claim. As used herein, when the phrase "at least" is used as the transition term in a preamble of a claim, it is open ended in the same manner as the term "comprising" and "including" are open ended.

Figure 12:
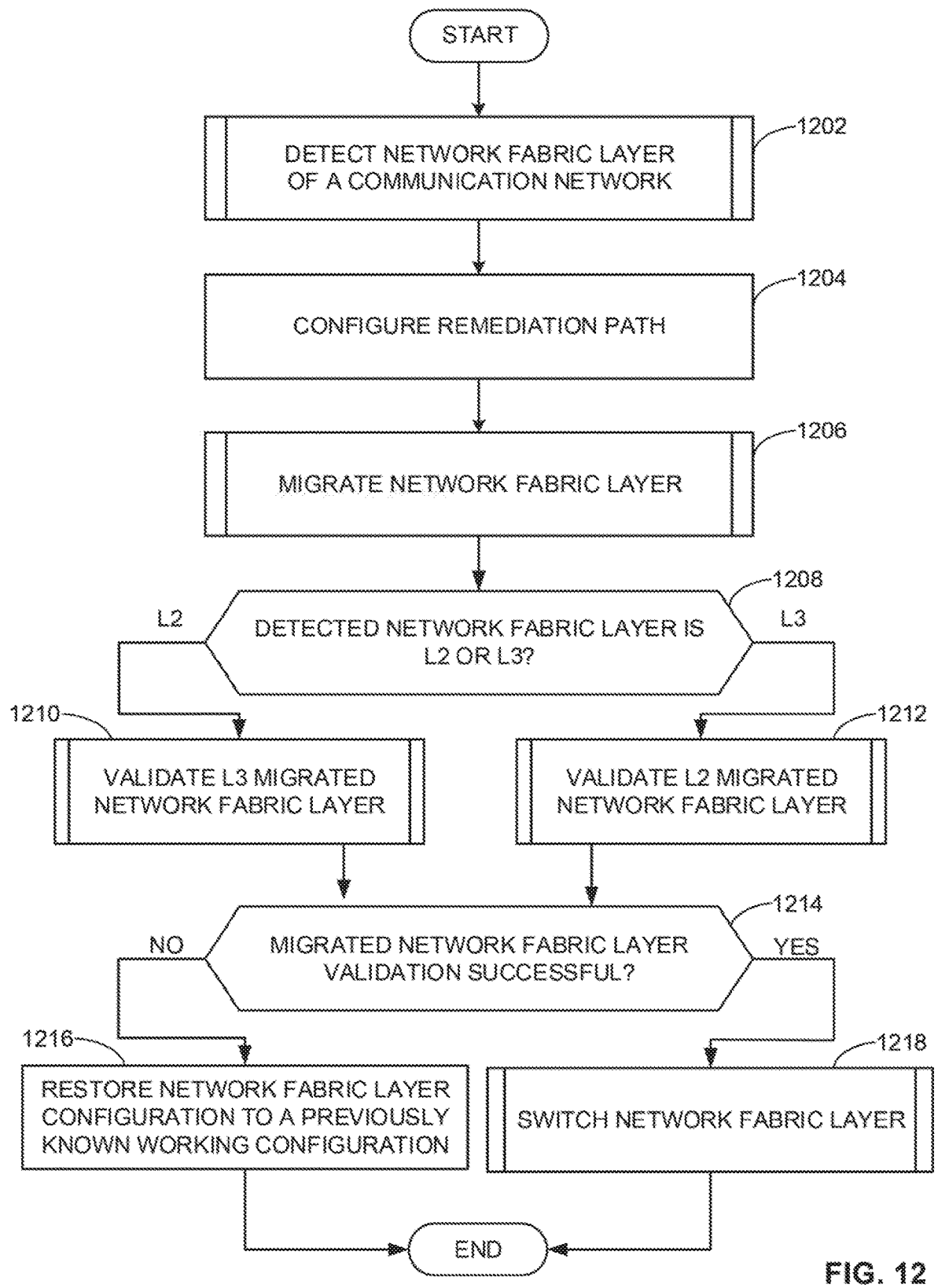
FIGS. 12-20 are flowcharts representative of example methods that can be executed by the example fabric migrator of FIGS. 2-11 to perform network fabric migration in virtualized server systems.

FIG. 12 is a flowchart representative of an example method that can be performed by the example fabric migrator 208 of FIGS. 2-11 to migrate a network fabric from a first network fabric layer to a second network fabric layer. The example method begins at block 1202, at which the example fabric migrator 208 detects a first network fabric layer (e.g., a current network fabric layer, an initial network fabric layer, etc.) of a communication network. For example, the layer detector 300 of FIG. 3 can determine whether a network fabric layer of the communication network 400 of FIG. 4 is L2, L3, etc. Some example processes that can be used to implement block 1202 are described below in connection with FIGS. 13A, 13B, 14A, and/or 14B.

At block 1204, the example fabric migrator 208 configures the remediation path. For example, in response to determining the network fabric layer of the communication network 400 of FIG. 4, the layer remediator 310 can configure the third communication path 406 of FIG. 4 to be a remediation path during a network fabric migration from L2 to L3 network fabric.

At block 1206, the example fabric migrator 208 migrates the network fabric layer. For example, in response to the third communication path 406 of FIG. 4 being configured as the remediation path, the layer migrator 320 can migrate the first, second, and fourth communication paths 402, 404, 408 and the first through the third spine switch communication paths 414, 416, 418 from L2 to L3 network fabric. Some example processes that can be used to implement block 1206 are described below in connection with FIGS. 15, 16 and/or 17.

At block 1208, the example fabric migrator 208 determines whether the detected first network fabric layer is L2 or L3. For example, the layer detector 300 can determine that the network fabric layer of the communication network 400 of FIG. 4 is L2. If, at block 1208, the example fabric migrator 208 determines that the detected network fabric layer is L2, then, at block 1210, the fabric migrator 208 validates the L3 migrated network fabric layer. For example, the layer validator 330 can validate the migration from L2 network fabric to L3 network fabric. An example process that can be used to implement block 1210 is described below in connection with FIG. 18.

If, at block 1208, the example fabric migrator 208 determines that the detected network fabric layer is L3, then, at block 1212, the fabric migrator 208 validates the L2 migrated network fabric layer. For example, the layer validator 330 can validate the migration from L3 network fabric to L2 network fabric. An example process that can be used to implement block 1212 is described below in connection with FIG. 19.

At block 1214, the example fabric migrator 208 determines whether the network fabric layer validation was successful. For example, the layer validator 330 can determine that one or more migrated communication paths of the communication network 400 of FIG. 4 did not successfully migrate from L2 to L3 network fabric.

If, at block 1214, the example fabric migrator 208 determines that the migrated network fabric layer validation was not successful, then, at block 1216, the fabric migrator 208 restores the network fabric layer configuration to a previously known working configuration. For example, the layer validator 330 can restore the migrated first, second, and fourth communication paths 402, 404, 408 and the first through the third spine switch communication paths 414, 416, 418 from L3 back to L2 network fabric. In response to restoring the network fabric layer configuration to a previously known working configuration, the example method concludes.

If, at block 1214, the example fabric migrator 208 determines that the migrated network fabric layer validation was successful, control proceeds to block 1218 to switch the network fabric layer. An example process that can be used to implement block 1218 is described below in connection with FIG. 20. In response to switching the network fabric layer, the example method concludes.

Figure 13A:
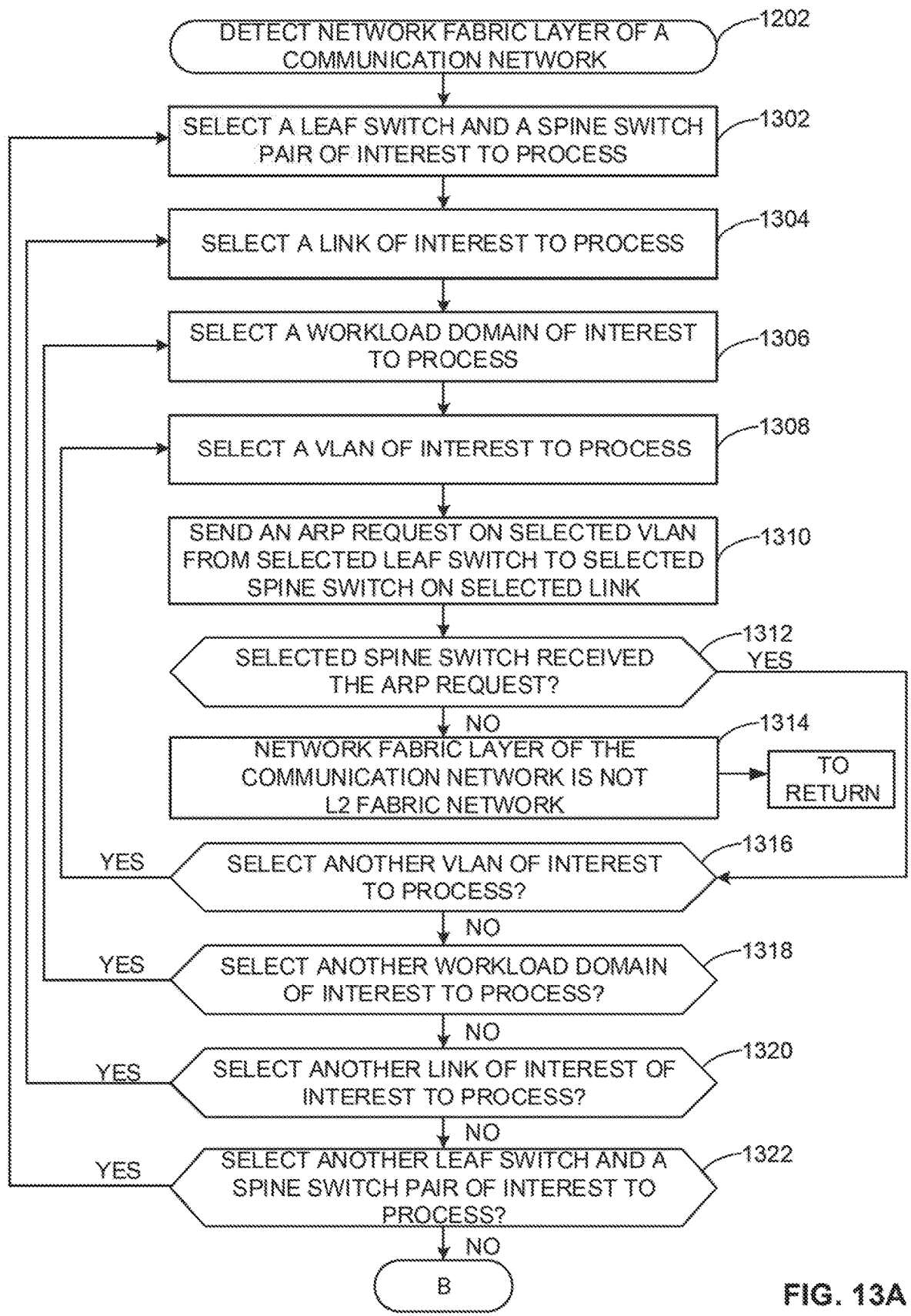
Figure 13B:
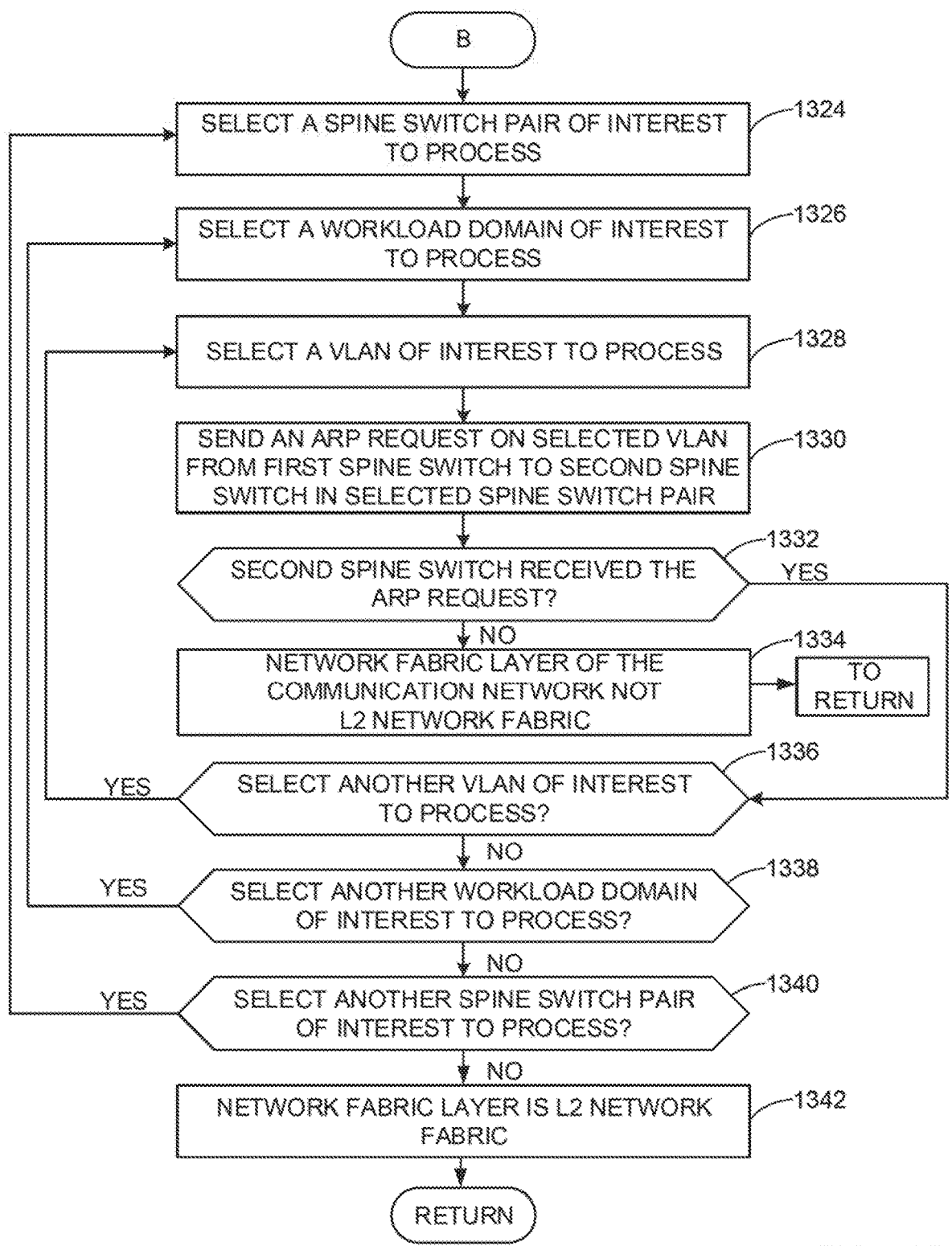

FIGS. 13A and 13B illustrate a flowchart representative of an example method that can be performed by the example fabric migrator 208 of FIGS. 2-11 to detect a network fabric layer of a communication network. The example process of FIGS. 13A and 13B can be used to implement the operation of block 1202 of FIG. 12. The example method begins at block 1302 when the example fabric migrator 208 selects a leaf switch and spine switch pair of interest to process. For example, the fabric migrator 208 can process each leaf switch and spine switch pair in the communication network 400 of FIG. 4. For example, the layer detector 300 can select the ToR Switch A 110 of the first physical rack 102 and the first spine switch 122A of FIG. 4 to process.

At block 1304, the example fabric migrator 208 selects a link of interest to process. For example, the layer detector 300 can select the first communication path 404 of FIG. 4 to process. At block 1306, the example fabric migrator 208 selects a workload domain of interest to process. For example, the layer detector 300 can select a workload domain corresponding to the first VM 410 of FIG. 4 to process. At block 1308, the example fabric migrator 208 selects a VLAN of interest to process. For example, the layer detector 300 can select VLAN 1000 in the set of VLANS 420 of FIG. 4 to process.

At block 1310, the example fabric migrator 208 sends an ARP request on the selected VLAN from the selected leaf switch to the selected spine switch on the selected link. For example, the layer detector 300 can direct the ToR Switch A 110 of the first physical rack 102 of FIG. 4 (e.g., direct the ToR Switch A 110 via the HMS 108, 114 of FIGS. 1-2 and 4-11) to transmit an ARP request packet on VLAN 1000 to the first spine switch 122A via the communication path 402 of FIG. 4.

At block 1312, the example fabric migrator 208 determines whether the selected spine switch received the ARP request. For example, the layer detector 300 can determine that the first spine switch 122A received the ARP request packet based on the ToR Switch A 110 of the first physical rack 102 receiving an ARP reply packet from the first spine switch 122A.

If, at block 1312, the example fabric migrator 208 determines that the selected spine switch received the ARP request, then control proceeds to block 1316 to determine whether to select another VLAN of interest to process. If, at block 1312, the example fabric migrator 208 determines that the selected spine switch did not receive the ARP request, then, at block 1314, the fabric migrator 208 determines that the network fabric layer of the communication network is not L2 network fabric. For example, the layer detector 300 can determine that the communication network 400 of FIG. 4 is not L2 network fabric based on the ToR Switch A 110 not receiving an ARP reply packet. In such an example, the ToR Switch A 110 may not receive the ARP reply packet because the first spine switch 122A is operating based on L3 network fabric and ignored the ARP request packet because the highest address of the ARP request packet included a MAC address instead of an IP address and a port. In response to determining that the network fabric layer of the communication network is not L2 network fabric, the example method returns to block 1204 of the example of FIG. 12 to configure the remediation path.

At block 1316, the example fabric migrator 208 determines whether to select another VLAN of interest to process. For example, the layer detector 300 can determine that there is an unvisited or unprocessed VLAN in the communication network 400 of FIG. 4. In such an example, the layer detector 300 can determine to select the unvisited VLAN to process. If, at block 1316, the example fabric migrator 208 determines to select another VLAN of interest to process, then control returns to block 1308 to select another VLAN of interest to process. Otherwise, control proceeds to block 1318 to determine whether to select another workload domain of interest to process.

At block 1318, the example fabric migrator 208 determines whether to select another workload domain of interest to process. For example, the layer detector 300 can select an unvisited workload domain of interest to process. If, at block 1318, the example fabric migrator 208 determines to select another workload domain of interest, then control returns to block 1306 to select another workload domain of interest to process. Otherwise control proceeds to block 1320 to determine whether to select another link of interest to process.

At block 1320, the example fabric migrator 208 determines whether to select another link of interest to process. For example, the layer detector 300 can select an unvisited link between the ToR Switch A 110 and the first spine switch 122A to process. If, at block 1320, the example fabric migrator 208 determines to select another link of interest, then control returns to block 1304 to select another link of interest to process. Otherwise control proceeds to block 1322 to determine whether to select another leaf and spine switch pair of interest to process.

At block 1322, the example fabric migrator 208 determines whether to select another leaf and spine switch pair of interest to process. For example, the layer detector 300 can select an unvisited leaf and spine switch pair of interest to process. For example, the layer detector 300 can select the ToR Switch A 110 and the third spine switch 122C to process. If, at block 1322, the example fabric migrator 208 determines to select another leaf and spine switch pair of interest, then control returns to block 1302 to select another leaf and spine switch pair of interest to process. Otherwise control proceeds to block 1324 to select a spine switch pair of interest to process.

At block 1324, the example fabric migrator 208 selects a spine switch pair of interest to process. For example, the fabric migrator 208 can process each spine switch pair in the communication network 400 of FIG. 4 as compared to processing each leaf switch and spine switch pair in blocks 1302-1322. For example, the layer detector 300 can select the first and the second spine switches 122A and 122B of FIG. 4 to process. At block 1326, the example fabric migrator 208 selects a workload domain of interest to process. For example, the layer detector 300 can select a workload domain corresponding to the first VM 410 of FIG. 4 to process. At block 1308, the example fabric migrator 208 selects a VLAN of interest to process. For example, the layer detector 300 can select VLAN 1000 in the set of VLANS 420 of FIG. 4 to process.

At block 1330, the example fabric migrator 208 sends an ARP request on the selected VLAN from the first spine switch to the second spine switch in the selected spine switch pair. For example, the layer detector 300 can direct the first spine switch 122A (e.g., direct the first spine switch 122A via the HMS 108, 114 of FIGS. 1-2) to transmit an ARP request packet on VLAN 1000 to the second spine switch 122B via the first spine switch communication path 414 of FIG. 4.

At block 1332, the example fabric migrator 208 determines whether the second spine switch received the ARP request. For example, the layer detector 300 can determine that the second spine switch 122B received the ARP request packet based on the first spine switch 122A receiving an ARP reply packet from the second spine switch 122B.

If, at block 1332, the example fabric migrator 208 determines that the second spine switch received the ARP request, then control proceeds to block 1336 to determine whether to select another VLAN of interest to process. If, at block 1332, the example fabric migrator 208 determines that the second spine switch did not receive the ARP request, then, at block 1334, the fabric migrator 208 determines that the network fabric layer of the communication network is not L2 network fabric. For example, the layer detector 300 can determine that the communication network 400 of FIG. 4 is not L2 network fabric based on the first spine switch 122A not receiving an ARP reply packet. In such an example, the first spine switch 122A may not receive the ARP reply packet because the second spine switch 122B is operating based on L3 network fabric and ignored the ARP request packet because the highest address of the ARP request packet included a MAC address instead of an IP address and a port. In response to determining that the network fabric layer of the communication network is not an L2 network fabric, the example method returns to block 1204 of the example of FIG. 12 to configure the remediation path.

At block 1336, the example fabric migrator 208 determines whether to select another VLAN of interest to process. For example, the layer detector 300 can determine that there is an unvisited or unprocessed VLAN in the communication network 400 of FIG. 4. In such an example, the layer detector 300 can determine to select the unvisited VLAN to process. If, at block 1336, the example fabric migrator 208 determines to select another VLAN of interest to process, then control returns to block 1328 to select another VLAN of interest to process. Otherwise control proceeds to block 1338 to determine whether to select another workload domain of interest to process.

At block 1338, the example fabric migrator 208 determines whether to select another workload domain of interest to process. For example, the layer detector 300 can select an unvisited workload domain of interest to process. If, at block 1338, the example fabric migrator 208 determines to select another workload domain of interest, then control returns to block 1326 to select another workload domain of interest to process. Otherwise control proceeds to block 1340 to determine whether to select another spine switch pair to process.

At block 1340, the example fabric migrator 208 determines whether to select another spine switch pair of interest to process. For example, the layer detector 300 can select the second and the third spine switches 122B, 122C to process. If, at block 1340, the example fabric migrator 208 determines to select another spine switch pair of interest, then control returns to block 1324 to select another spine switch pair of interest to process.

If, at block 1340, the example fabric migrator 208 determines not to select another spine switch pair of interest to process, then, at block 1342, the fabric migrator 208 determines that the network fabric layer of the communication network is L2 network fabric. For example, the layer detector 300 can determine that the communication network 400 of FIG. 4 is using L2 network fabric. In response to determining that the network fabric layer is L2 network fabric, the example method returns to block 1204 of the example of FIG. 12 to configure the remediation path.

Figure 14A:
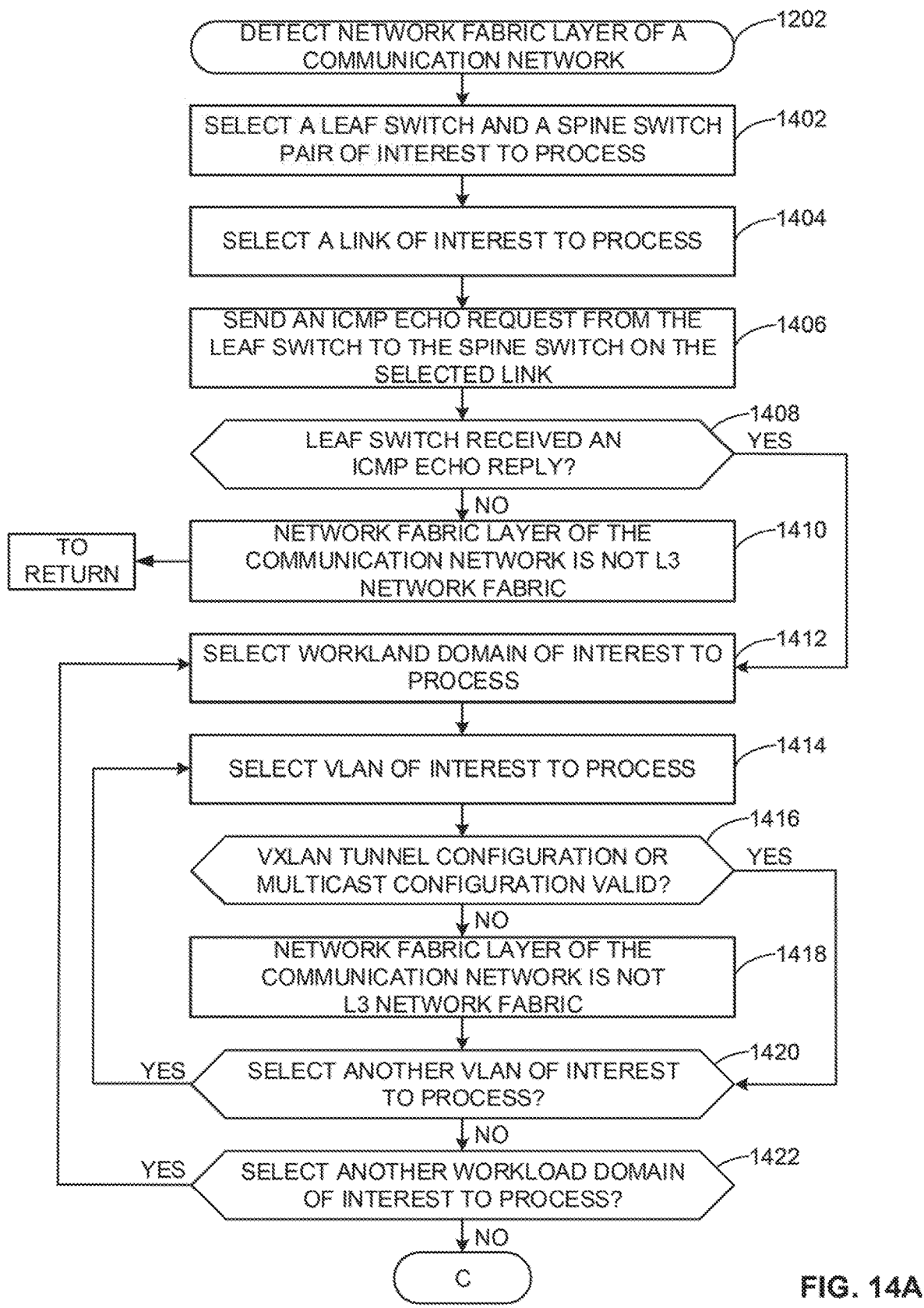
Figure 14B:
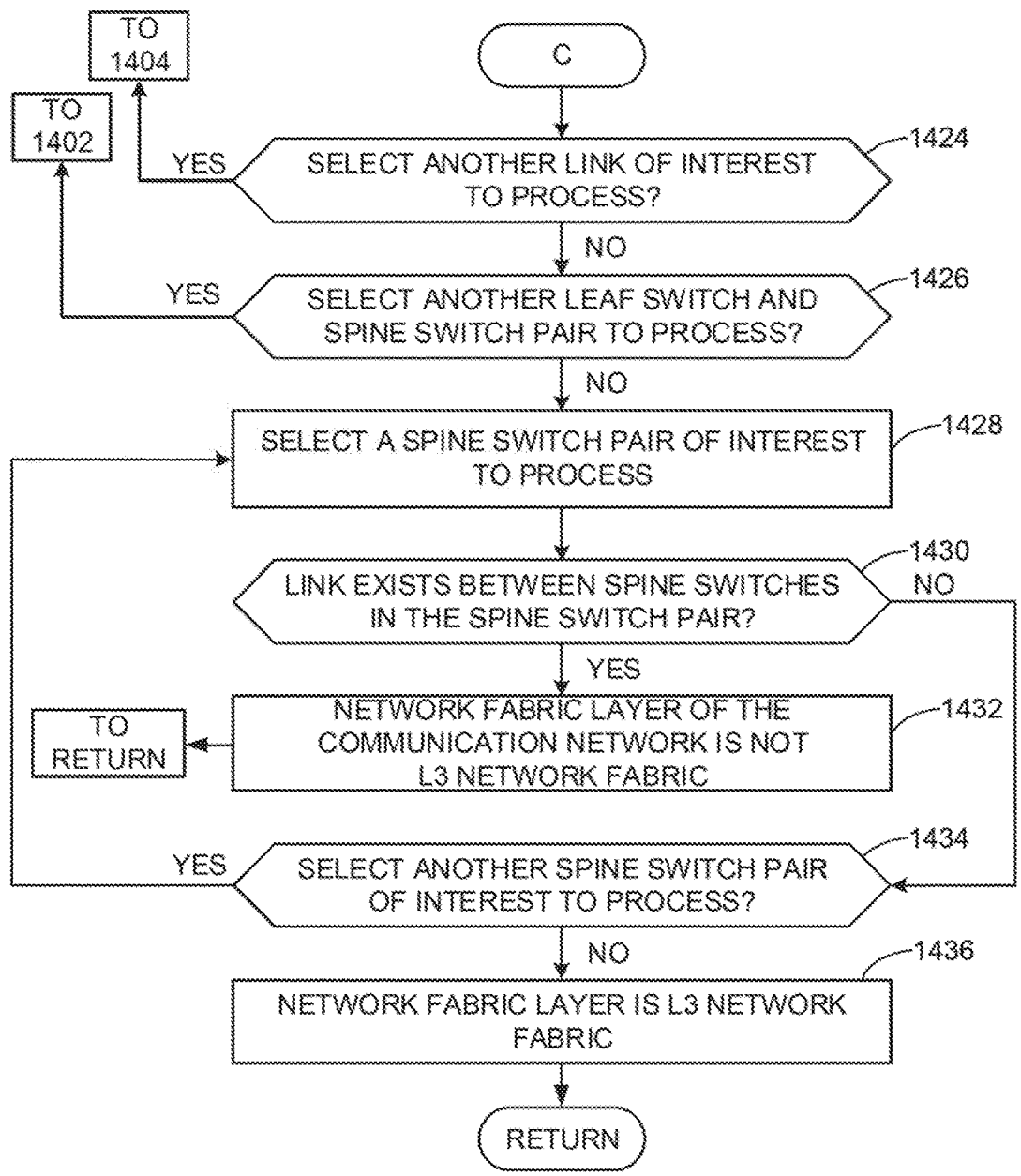

FIGS. 14A and 14B illustrate a flowchart representative of another example method that can be performed by the example fabric migrator 208 of FIGS. 2-11 to detect a network fabric layer of a communication network. The example process of FIGS. 14A and 14B can be used to implement the operation of block 1202 of FIG. 12. The example method begins at block 1402 when the example fabric migrator 208 selects a leaf switch and spine switch pair of interest to process. For example, the layer detector 300 can select the ToR Switch A 110 of the first physical rack 102 and the first spine switch 122A of FIG. 4 to process.

At block 1404, the example fabric migrator 208 selects a link of interest to process. For example, the layer detector 300 can select the first communication path 404 of FIG. 4 to process.

At block 1404, the example fabric migrator 208 sends an ICMP echo request from the leaf switch to the spine switch on the selected link. For example, the layer detector 300 can direct the ToR Switch A 110 of the first physical rack 102 of FIG. 4 (e.g., direct the ToR Switch A 110 via the HMS 108, 114 of FIGS. 1-2 and 4-11) to transmit an ICMP echo request packet on VLAN 1000 to the first spine switch 122A via the communication path 402 of FIG. 4.

At block 1408, the example fabric migrator 208 determines whether the selected leaf switch received an ICMP echo reply. For example, the layer detector 300 can determine that the first spine switch 122A received the ICMP echo request packet based on the ToR Switch A 110 of the first physical rack 102 receiving an ICMP echo reply packet from the first spine switch 122A.

If, at block 1408, the example fabric migrator 208 determines that the selected leaf switch received the ICMP echo reply, then control proceeds to block 1412 to determine whether to select a workload domain of interest to process. If, at block 1408, the example fabric migrator 208 determines that the selected leaf switch did not receive the ICMP echo reply, then, at block 1410, the fabric migrator 208 determines that the network fabric layer of the communication network is not L3 network fabric. For example, the layer detector 300 can determine that the communication network 400 of FIG. 4 is not L3 network fabric based on the ToR Switch A 110 not receiving an ICMP echo reply packet. In such an example, the ToR Switch A 110 may not receive the ICMP echo reply packet because the first spine switch 122A is operating based on L2 network fabric and ignored the ICMP echo request packet because the highest address of the ICMP echo request packet included an IP address and a port instead of a MAC address. In response to determining that the network fabric layer of the communication network is not L3 network fabric, the example method returns to block 1204 of the example of FIG. 12 to configure the remediation path.

At block 1412, the example fabric migrator 208 selects a workload domain of interest to process. For example, the layer detector 300 can select a workload domain corresponding to the first VM 410 of FIG. 4 to process. At block 1414, the example fabric migrator 208 selects a VLAN of interest to process. For example, the layer detector 300 can select VLAN 1000 in the set of VLANS 420 of FIG. 4 to process.

At block 1416, the example fabric migrator 208 determines whether a VXLAN tunnel configuration or a multicast configuration is valid. For example, the layer detector 300 can determine whether a VXLAN tunnel configuration or a multicast configuration is valid. If, at block 1416, the example fabric migrator 208 determines that neither the VXLAN tunnel configuration or the multicast configuration is valid, then, at block 1418, the fabric migrator 208 determines that the network fabric layer of the communication path is not L3 network fabric. For example, the layer detector 300 can determine that the network fabric layer of the communication network 400 of FIG. 4 is not L3 network fabric based on neither the VXLAN tunnel configuration or the multicast configuration of the multi-cast group 422 of FIG. 4 is valid.

If, at block 1416, the example fabric migrator 208 determines that the VXLAN tunnel or multicast configuration is valid, then control proceeds to block 1420 to select another workload domain of interest to process. In the example method, the example fabric migrator 208 determines whether to select another VLAN of interest to process (block 1420), whether to select another workload domain of interest to process (block 1422), whether to select another link of interest to process (1424), and whether to select another leaf switch and spine switch pair to process (1426).

At block 1428, the example fabric migrator 208 selects a spine switch pair of interest to process. For example, the layer detector 300 can select the first and the second spine switches 122A, 122B of FIG. 4 to process.

At block 1430, the example fabric migrator 208 determines whether a link exists between the spine switches in the spine switch pair. For example, the layer detector 300 can determine that a link exists between the first and the second spine switches 122A, 122B of FIG. 4 based on one or more data packets being transmitted on the first spine switch communication path 414.

If, at block 1430, the example fabric migrator 208 determines that a link exists between the spine switches in the spine switch pair, then, at block 1432, the fabric migrator 208 determines that the network fabric layer of the communication network is not L3 network fabric. For example, the layer detector 300 can determine that the communication network 400 of FIG. 4 does not use L3 network fabric based on a transfer of one or more data packets on the first, second, and/or third spine switch communication paths 414, 416, 418 of FIG. 4. In response to determining that the network fabric layer of the communication network is not L3 network fabric, the example method returns to block 1204 of the example of FIG. 12 to configure the remediation path.

If, at block 1430, the example fabric migrator 208 determines that a link does not exist between the spine switches in the spine switch pair, then control proceeds to block 1434 to determine whether to select another spine switch pair of interest to process. For example, the layer detector 300 can determine that a pair including the second and third spine switches 122B, 122C of FIG. 4 have not been processed. If, at block 1434, the example fabric migrator 208 determines to select another spine switch pair of interest to process, then control returns to block 1428 to select another spine switch pair of interest to process. If, at block 1434, the example fabric migrator 208 determines not to select another spine switch pair of interest to process, then, at block 1436, the fabric migrator 208 determines that the network fabric layer is L3 network fabric. For example, the layer detector 300 can determine that the communication network 800 of FIG. 8 is using L3 network fabric. In response to determining that the network fabric layer is L3 network fabric, the example method returns to block 1204 of the example of FIG. 12 to configure the remediation path.

Figure 15:
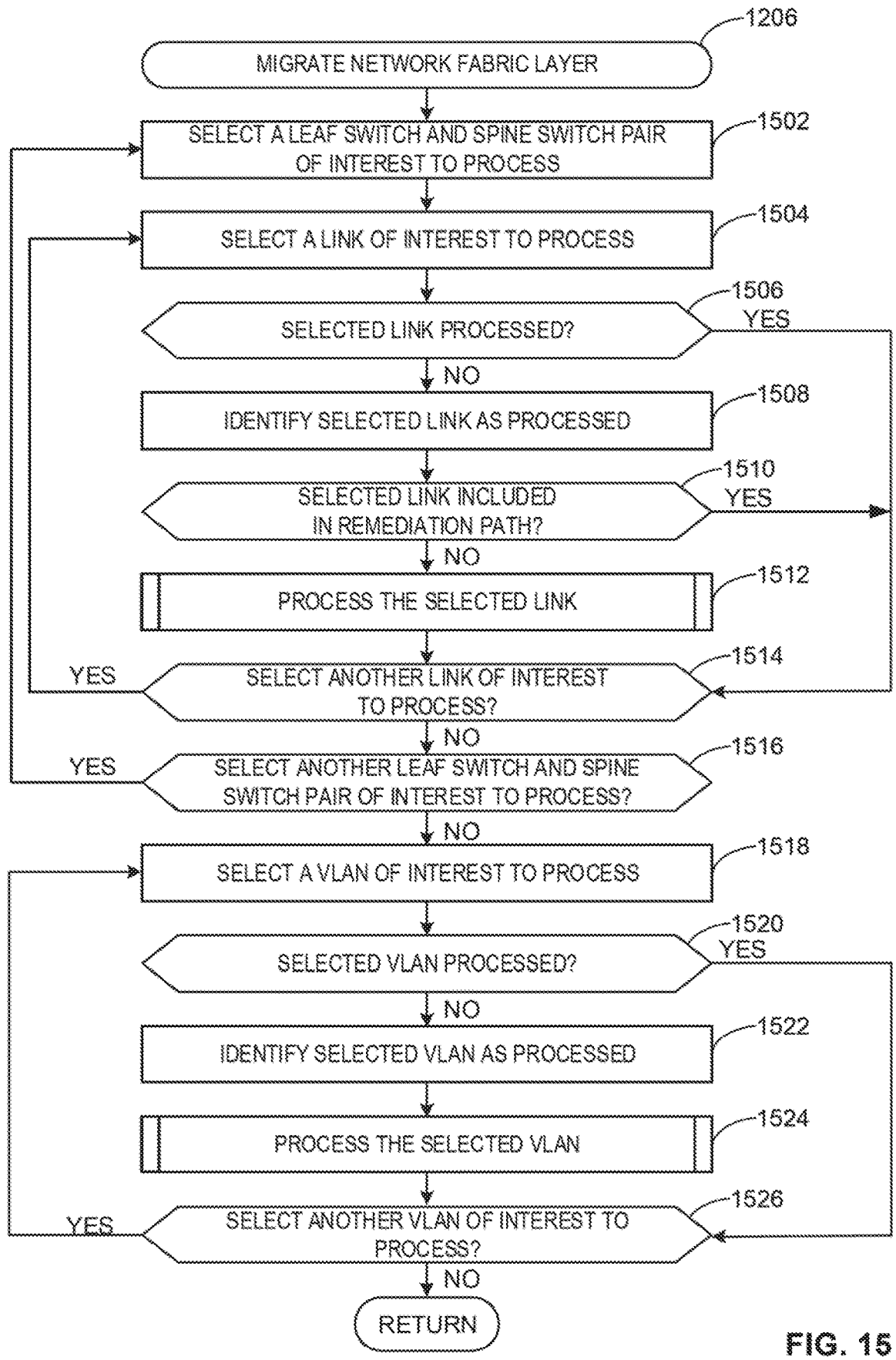

FIG. 15 is a flowchart representative of an example method that can be performed by the example fabric migrator 208 of FIGS. 2-11 to migrate a network fabric layer of a communication network. The example process of FIG. 15 can be used to implement the operation of block 1206 of FIG. 12. The example method begins at block 1502 when the example fabric migrator 208 selects a leaf switch and spine switch pair of interest to process. For example, the layer migrator 320 can select the ToR Switch A 110 of the first physical rack 102 and the first spine switch 122A of FIG. 4 to process.

At block 1504, the example fabric migrator 208 selects a link of interest to process. For example, the layer migrator 320 can select the first communication path 404 of FIG. 4 to process. At block 1506, the example fabric migrator 208 determines whether the selected link has been processed. For example, the layer migrator 320 can determine that the communication path 402 of FIG. 4 has not been migrated. If, at block 1506, the example fabric migrator 208 determines that the selected link has been processed, then control proceeds to block 1514 to determine whether to select another link of interest to process. If, at block 1506, the example fabric migrator 208 determines that the selected link has not been processed, then, at block 1508, the fabric migrator 208 identifies the selected link as processed. For example, the layer migrator 320 can flag, mark, and/or otherwise associate the selected link with having been migrated, processed, etc.

At block 1510, the example fabric migrator 208 determines whether the selected link is included in a remediation path. For example, the layer migrator 320 can determine that the first communication path 402 of FIG. 4 is not in the remediation path. If, at block 1510, the example fabric migrator 208 determines that the selected link is included in the remediation path, then control proceeds to block 1514 to determine whether to select another link of interest to process. If, at block 1510, the example fabric migrator 208 determines that the selected link is not included in the remediation path, then, at block 1512, the fabric migrator 208 processes the selected link. For example, the layer migrator 320 can implement the process of FIG. 16 to process the first communication path 402.

At block 1514, the example fabric migrator 208 determines whether to select another link of interest to process. For example, the layer migrator 320 can determine to select the second communication path 404 of FIG. 4 to process. If, at block 1514, the example fabric migrator 208 determines to select another link to process, then control returns to block 1504 to select another link of interest to process. Otherwise control proceeds to block 1516 at which the fabric migrator 208 determines to select another leaf switch and spine switch pair of interest to process. For example, the layer migrator 320 can determine to select the ToR Switch A 110 of the first physical rack 102 and the second spine switch 122B of FIG. 4 to process.

If, at block 1516, the example fabric migrator 208 determines to select another leaf switch and spine switch pair of interest to process, then control returns to block 1502 to select another leaf switch and spine switch pair of interest to process. Otherwise control proceeds to block 1518 at which the fabric migrator 208 selects a VLAN of interest to process. For example, the layer migrator 320 can select VLAN 1000 in the set of VLANS 420 of FIG. 4 to process.

At block 1520, the example fabric migrator 208 determines whether the selected VLAN has been processed. For example, the layer migrator 320 can determine that VLAN 1000 in the set of VLANS 420 has not been processed. If, at block 1520, the example fabric migrator 208 determines that the selected VLAN has been processed, then control proceeds to block 1526 to determine whether to select another VLAN of interest to process. If, at block 1520, the example fabric migrator 208 determines that the selected VLAN has not been processed, then, at block 1522, the fabric migrator 208 identifies the selected VLAN as processed. For example, the layer migrator 320 can flag, mark, and/or otherwise associate the selected VLAN with having been migrated, processed, etc.

At block 1524, the example fabric migrator 208 processes the selected VLAN. For example, the layer migrator 320 can implement the process of FIG. 17 to process VLAN 1000. At block 1526, the example fabric migrator 208 determines whether to select another VLAN of interest to process. For example, the layer migrator 320 can select VLAN 1001 in the set of VLANS 420 of FIG. 4 to process. If, at block 1526, the example fabric migrator 208 determines to select another VLAN of interest to process, the control returns to block 1518 to select another VLAN of interest to process, otherwise the example method returns to block 1208 of the example of FIG. 12 to detect whether the network fabric layer is L2 or L3.

Figure 16:
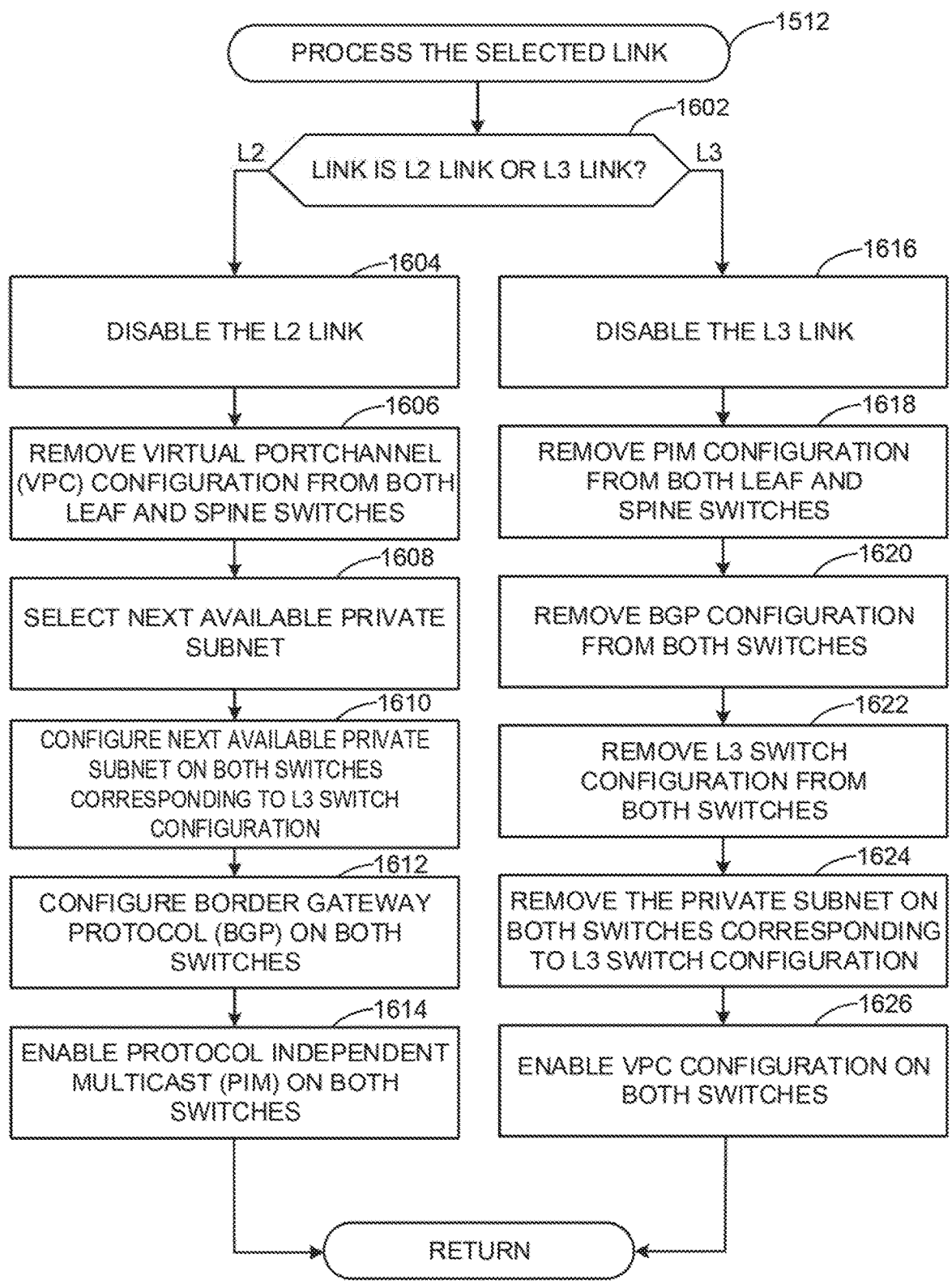

FIG. 16 is a flowchart representative of an example method that can be performed by the example fabric migrator 208 of FIGS. 2-11 to process a link in a communication network. The example process of FIG. 16 can be used to implement the operation of block 1512 of FIG. 15. The example method begins at block 1602 when the example fabric migrator 208 determines whether the link is an L2 link or an L3 link. For example, the layer detector 300 can determine that the first communication path 402 of FIG. 4 is an L2 link by executing the process of FIGS. 13A-13B and/or FIGS. 14A-14B.

If, at block 1602, the example fabric migrator 208 determines that the link is an L2 link, then, at block 1604, the fabric migrator 208 disables the L2 link. For example, the layer migrator 320 can disable the first communication path 402. At block 1606, the example fabric migrator 208 removes a VPC configuration from both leaf and spine switches. For example, the layer migrator 320 can remove a VPC configuration from the ToR Switch A 110 of the first physical rack and the first spine switch 122A corresponding to the first communication path 402 of FIG. 4. At block 1608, the example fabric migrator 208 selects a next available private subnet. For example, the layer migrator 320 can select a next available private subnet for communication between the ToR Switch A 110 and the first spine switch 122A.

At block 1610, the example fabric migrator 208 configures the next available private subnet on both switches corresponding to an L3 switch configuration. For example, the layer migrator 320 can configure the selected next available private subnet on both the ToR Switch A 110 and the first spine switch 122A corresponding to an L3 switch configuration.

At block 1612, the example fabric migrator 208 configures border gateway protocol (BGP) on both switches. For example, the layer migrator 320 can configure BGP on the ToR Switch A 110 and the first spine switch 122A. At block 1614, the example fabric migrator 208 enables protocol independent multicast (PIM) on both switches. For example, the layer migrator 320 can configure PIM on the ToR Switch A 110 and the first spine switch 122A. In response to enabling PIM on both switches, the example method returns to block 1514 of the example of FIG. 15 to determine whether to select another link of interest to process.

If, at block 1602, the example fabric migrator 208 determines that the link is an L3 link, then, at block 1616, the fabric migrator 208 disables the L3 link. For example, the layer migrator 320 can disable the first communication path 402 of FIG. 4. At block 1618, the example fabric migrator 208 removes a PIM configuration from both leaf and spine switches. For example, the layer migrator 320 can remove a PIM configuration from both the ToR Switch A and the first spine switch 122A of FIG. 4.

At block 1620, the example fabric migrator 208 removes a BGP configuration from both switches. For example, the layer migrator 320 can remove a BGP configuration from both the ToR Switch A and the first spine switch 122A. At block 1622, the example fabric migrator 208 removes an L3 switch configuration from both switches. For example, the layer migrator 320 can remove an L3 switch configuration from both the ToR Switch A 110 and the first spine switch 122A.

At block 1624, the example fabric migrator 208 removes the private subnet on both switches. For example, the layer migrator 320 can remove the private subnet corresponding to an L3 switch configuration. In such an example, the layer migrator 320 can enable the removed private subnet to be used for future use. At block 1626, the example fabric migrator 208 enables VPC configuration on both switches. For example, the layer migrator 320 can enable a VPC configuration on the ToR Switch A and the first spine switch 122A of FIG. 4. In response to enabling the VPC configuration on both switches, the example method returns to block 1514 of the example of FIG. 15 to determine whether to select another link of interest to process.

Figure 17:
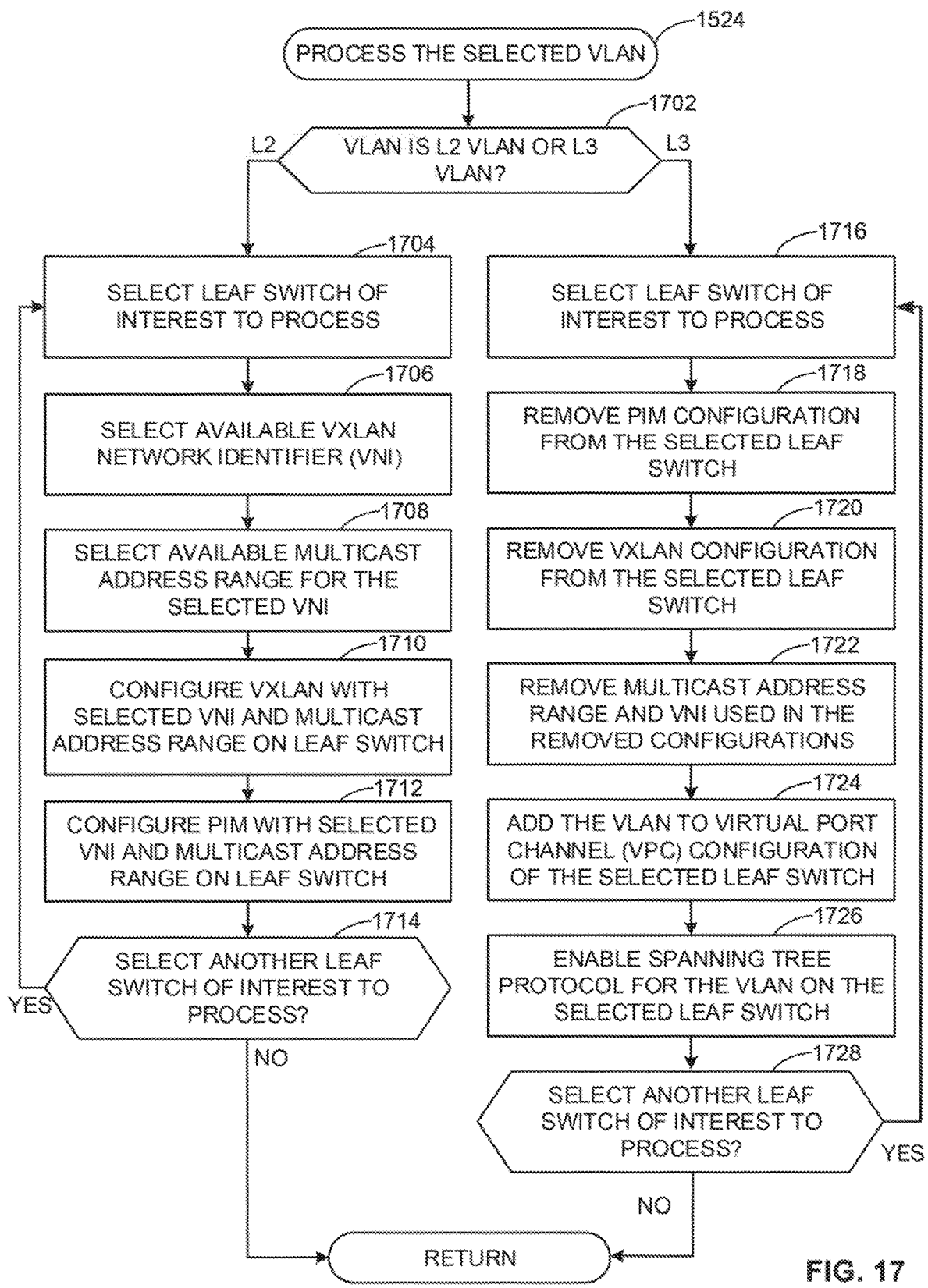

FIG. 17 is a flowchart representative of an example method that can be performed by the example fabric migrator 208 of FIGS. 2-11 to process a VLAN in a communication network. The example process of FIG. 17 can be used to implement the operation of block 1524 of FIG. 15. The example method begins at block 1702 when the example fabric migrator 208 determines whether the VLAN is an L2 VLAN or an L3 VLAN. For example, the layer detector 300 can determine that VLAN 1000 of the set of VLANs 420 of FIG. 4 is an L2 VLAN based on the communication network 400 of FIG. 4 using L2 network fabric.

If, at block 1702, the example fabric migrator 208 determines that the VLAN is an L2 VLAN, then, at block 1704, the fabric migrator 208 selects a leaf switch of interest to process. For example, the layer migrator can select the ToR Switch A 110 of the first physical rack 102 of FIG. 4 to process.

At block 1706, the example fabric migrator 208 selects an available VXLAN network identifier (VNI). For example, the layer migrator 320 can select a 24-bit identifier that is not currently in use as the VNI. At block 1708, the example fabric migrator 208 can select an available multicast address range for the selected VNI. For example, the fabric migrator 208 can select an address range in a range of 224.0.0.0 to 239.255.255.255. At block 1710, the example fabric migrator 208 configures a VXLAN with the selected VNI and multicast address range on the leaf switch. For example, the layer migrator 320 can configure a VXLAN with the selected VNI and the selected multicast address range on the ToR Switch A 110.

At block 1712, the example fabric migrator 208 configures PIM with the selected VNI and the multicast address range on the leaf switch. For example, the layer migrator 320 can configure PIM with the selected VNI and the selected multicast address range on the ToR Switch A 110. At block 1714, the example fabric migrator 208 selects another leaf switch of interest to process. For example, the layer migrator 320 can select the ToR Switch B 112 of the first physical rack 102 to process. If, at block 1714, the example fabric migrator 208 selects another leaf switch of interest to process, control returns to block 1704 to select another leaf switch of interest to process, otherwise the example method returns to block 1526 of the example of FIG. 15 to determine whether to select another VLAN of interest to process.

If, at block 1702, the example fabric migrator 208 determines that the VLAN is an L3 VLAN, then, at block 1716, the fabric migrator selects a leaf switch of interest to process. For example, the layer migrator 320 can select the ToR Switch A 110 of the first physical rack 102 of FIG. 8 to process. At block 1718, the example fabric migrator 208 removes a PIM configuration from the selected leaf switch. For example, the layer migrator 320 can remove a PIM configuration from the ToR Switch A 110.

At block 1720, the example fabric migrator 208 removes a VXLAN configuration from the selected leaf switch. For example, the layer migrator 320 can remove a VXLAN configuration from the ToR Switch A 110. At block 1722, the example fabric migrator 208 removes a multicast address range and a VNI used in the removed PIM and VXLAN configuration. For example, the layer migrator 320 can remove a multicast address range and a VNI corresponding to the removed PIM and VXLAN configuration.

At block 1724, the example fabric migrator 208 adds the VLAN to the VPC configuration of the selected leaf switch. For example, the layer migrator 320 can add the VLAN 1000 in the set of VLANs 420 of FIG. 8 to the VPC configuration of the ToR Switch A 110. At block 1726, the example fabric migrator 208 enables spanning tree protocol for the VLAN on the selected leaf switch. For example, the layer migrator 320 can enable spanning tree protocol for the VLAN 1000 on the ToR Switch A 110.

At block 1728, the example fabric migrator 208 determines to select another leaf switch of interest to process. For example, the layer migrator 320 can select the ToR Switch B 112 of the first physical rack 102 to process. If, at block 1728, the example fabric migrator 208 determines to select another leaf switch of interest to process, control returns to block 1716 to select another leaf switch of interest to process, otherwise the example method returns to block 1526 of the example of FIG. 15 to determine whether to select another VLAN of interest to process.

Figure 18:
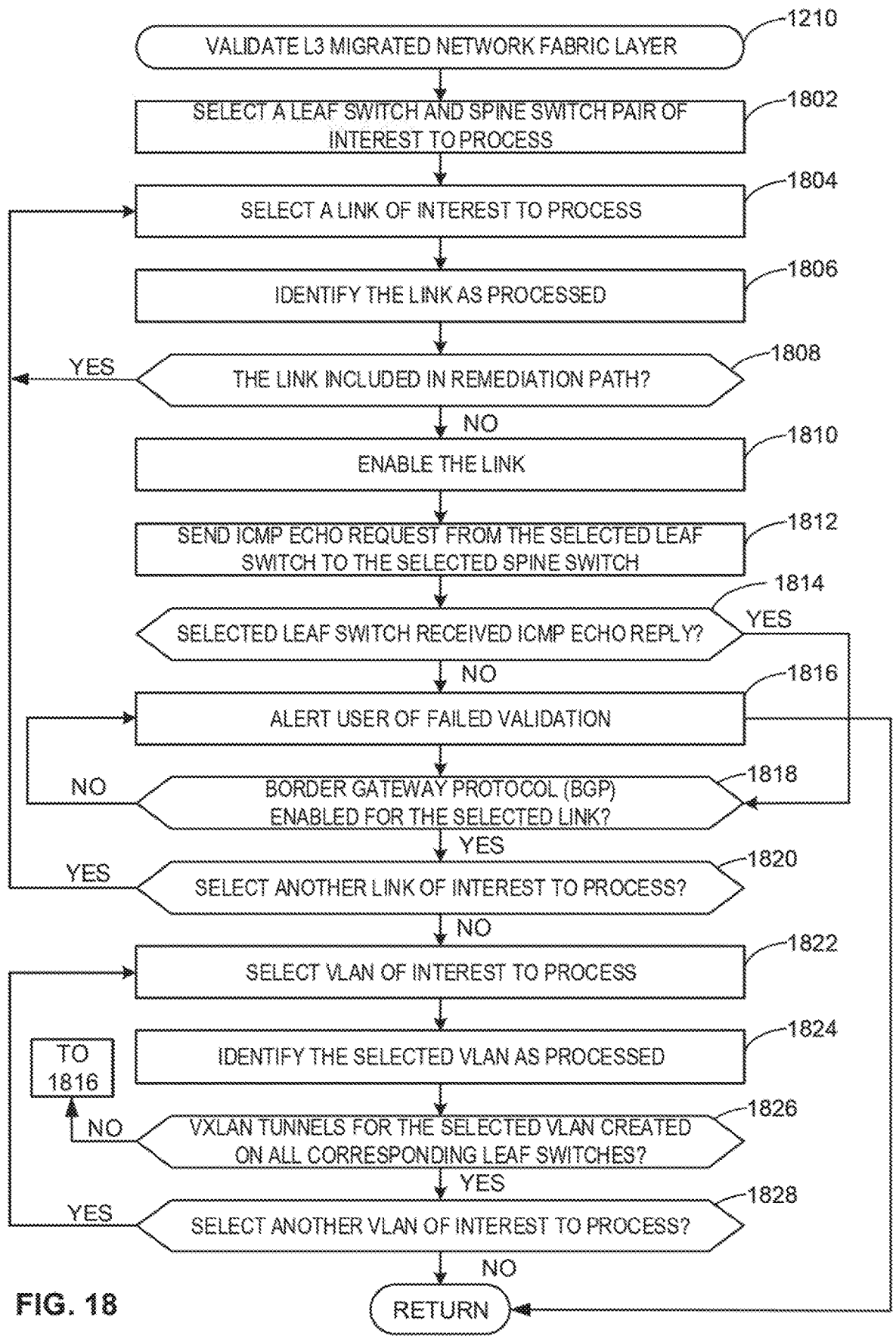

FIG. 18 is a flowchart representative of an example method that can be performed by the example fabric migrator 208 of FIGS. 2-11 to process validate an L3 migrated network fabric layer. The example process of FIG. 18 can be used to implement the operation of block 1210 of FIG. 12. The example method begins at block 1802 when the example fabric migrator 208 selects a leaf switch and a spine switch pair of interest to process. For example, the layer validator 330 can select the ToR Switch A 110 of the first physical rack 102 and the first spine switch 122A of FIG. 6 to process.

At block 1804, the example fabric migrator 208 selects a link of interest to process. For example, the layer validator 330 can select the first the communication path 402 of FIG. 6 to process. At block 1806, the example fabric migrator 208 identifies the link as processed. For example, the layer validator 330 can identify the first communication path 402 as processed, visited, etc., to help ensure that the layer validator 330 does not process the first communication path 402 again.

At block 1808, the example fabric migrator 208 determines whether the link is included in a remediation path. For example, the layer validator 330 can determine that the first communication path 402 is not in a remediation path. If, at block 1808, the example fabric migrator 208 determines that the link is included in the remediation path, then control returns to block 1804 to select another link of interest to process. If, at block 1808, the example fabric migrator 208 determines that the link is included in the remediation path, then, at block 1810, the fabric migrator 208 enables the link. For example, the layer validator 330 can enable the first communication path 402 to execute packet flows in the communication network 400.

At block 1812, the example fabric migrator 208 sends an ICMP echo request from the selected leaf switch to the selected spine switch. For example, the layer validator 330 can send an ICMP echo packet from the ToR Switch A 110 to the first spine switch 122A. At block 1814, the example fabric migrator 208 determines whether the selected leaf switch received an ICMP echo reply. For example, the layer validator 330 can determine whether the ToR Switch A 110 received an ICMP echo reply packet from the first spine switch 122A.

If, at block 1814, the example fabric migrator 208 determines that the selected leaf switch received an ICMP echo reply, the control proceeds to block 1818 to determine whether border gateway protocol (BGP) is enabled for the selected link. If, at block 1814, the example fabric migrator 208 determines that the leaf switch did not receive an ICMP echo reply, then, at block 1816, the fabric migrator 208 alerts the user of a failed validation. For example, the layer validator 330 can generate an alert, and display and/or transmit an alert to a customer, a user, etc., via a graphical user interface (GUI) or any other display or alert reception mechanism. In response to alerting the user of a failed validation, the example method returns to block 1214 of the example of FIG. 12 to determine whether validation of the migrated network fabric layer was successful.

At block 1818, the example fabric migrator 208 determines whether BGP is enabled for the selected link. For example, the layer validator 330 can determine that BGP is enabled for the first communication path 402. If, at block 1818, the example fabric migrator 208 determines that BGP is not enabled for the selected link, then control returns to block 1816 to alert the user of a failed validation. If, at block 1818, the example fabric migrator 208 determines that BGP is enabled for the selected link, then, at block 1820, the fabric migrator 208 determines whether to select another link of interest to process. For example, the layer validator 330 can select the second communication path 404 of FIG. 6 to process.

If, at block 1820, the example fabric migrator 208 determines to select another link of interest to process, then control returns to block 1804 to select another link of interest to process. Otherwise control proceeds to block 1822 to select a VLAN of interest to process. For example, the layer validator 330 can select VLAN 1000 in the set of VLANs 420 to process.

At block 1824, the example fabric migrator 208 identifies the selected VLAN as processed. For example, the layer validator 330 can identify VLAN 1000 as processed, visited, etc., to help ensure that the layer validator 330 does not process VLAN 1000 again. At block 1826, the example fabric migrator 208 determines whether VXLAN tunnels for the selected VLAN are created on all corresponding leaf switches. For example, the layer validator 330 can determine whether VLAN 1000 includes VXLAN tunnels for the ToR Switches 110, 112, 116, 118 of FIG. 6.

If, at block 1826, the example fabric migrator 208 determines that VXLAN tunnels for the selected VLAN are not created on all corresponding leaf switches, then control returns to block 1816 to alert the user of a failed validation. Otherwise control proceeds to block 1828 to select another VLAN of interest to process. For example, the layer validator 330 can select VLAN 1001 to process. If, at block 1828, the example fabric migrator 208 determines to select another VLAN of interest, then control returns to block 1822 to select another VLAN of interest to process. Otherwise the example method returns to block 1214 of the example of FIG. 12 to determine whether validation of the migrated network fabric layer was successful.

Figure 19:
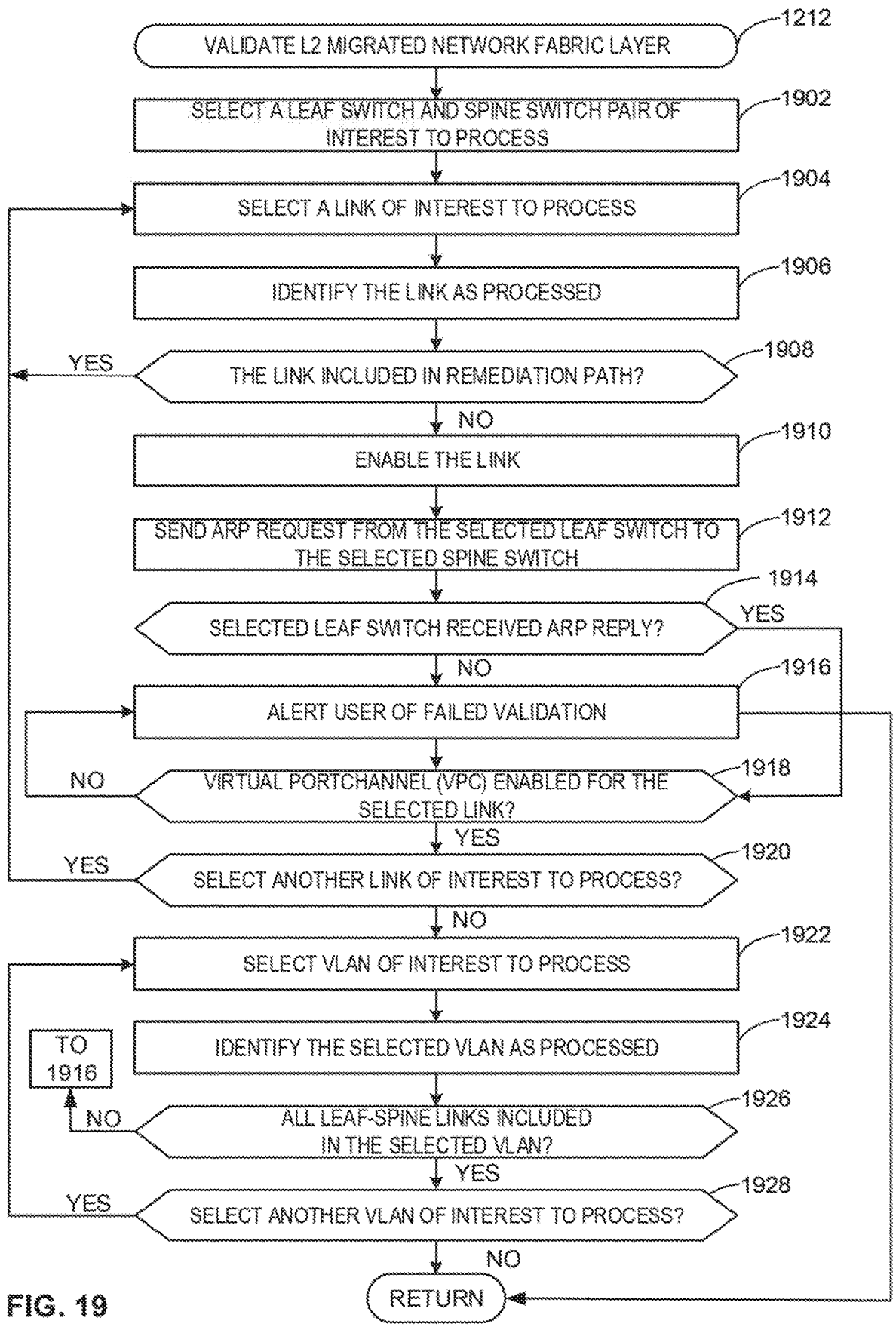

FIG. 19 is a flowchart representative of an example method that can be performed by the example fabric migrator 208 of FIGS. 2-11 to process validate an L2 migrated network fabric layer. The example process of FIG. 19 can be used to implement the operation of block 1212 of FIG. 12. The example method begins at block 1902 when the example fabric migrator 208 selects a leaf switch and a spine switch pair of interest to process. For example, the layer validator 330 can select the ToR Switch A 110 of the first physical rack 102 and the first spine switch 122A of FIG. 10 to process.

At block 1904, the example fabric migrator 208 selects a link of interest to process. For example, the layer validator 330 can select the first the communication path 402 of FIG. 10 to process. At block 1906, the example fabric migrator 208 identifies the link as processed. For example, the layer validator 330 can identify the first communication path 402 as processed, visited, etc., to help ensure that the layer validator 330 does not process the first communication path 402 again.

At block 1908, the example fabric migrator 208 determines whether the link is included in a remediation path. For example, the layer validator 330 can determine that the first communication path 402 is not in a remediation path. If, at block 1908, the example fabric migrator 208 determines that the link is included in the remediation path, then control returns to block 1904 to select another link of interest to process. If, at block 1908, the example fabric migrator 208 determines that the link is included in the remediation path, then, at block 1910, the fabric migrator 208 enables the link.

For example, the layer validator 330 can enable the first communication path 402 to execute packet flows in the communication network 400.

At block 1912, the example fabric migrator 208 sends an ARP request from the selected leaf switch to the selected spine switch. For example, the layer validator 330 can send an ARP request packet from the ToR Switch A 110 to the first spine switch 122A. At block 1914, the example fabric migrator 208 determines whether the selected leaf switch received an ARP reply. For example, the layer validator 330 can determine whether the ToR Switch A 110 received an ARP reply packet from the first spine switch 122A.

If, at block 1914, the example fabric migrator 208 determines that the selected leaf switch received an ARP reply, then control proceeds to block 1918 to determine whether border gateway protocol (BGP) is enabled for the selected link. If, at block 1914, the example fabric migrator 208 determines that the leaf switch did not receive an ARP reply, then, at block 1916, the fabric migrator 208 alerts user of a failed validation. For example, the layer validator 330 can generate an alert, and display and/or transmit an alert to a customer, a user, etc., via a GUI or any other display or alert reception mechanism. In response to alerting the user of a failed validation, the example method returns to block 1214 of the example of FIG. 12 to determine whether validation of the migrated network fabric layer was successful.

At block 1918, the example fabric migrator 208 determines whether virtual portchannel (VPC) is enabled for the selected link. For example, the layer validator 330 can determine that VPC is enabled for the first communication path 402. If, at block 1918, the example fabric migrator 208 determines that VPC is not enabled for the selected link, then control returns to block 1916 to alert the user of a failed validation. If, at block 1918, the example fabric migrator 208 determines that VPC is enabled for the selected link, then, at block 1920, the fabric migrator 208 determines whether to select another link of interest to process. For example, the layer validator 330 can select the second communication path 404 of FIG. 10 to process.

If, at block 1920, the example fabric migrator 208 determines to select another link of interest to process, then control returns to block 1904 to select another link of interest to process. Otherwise control proceeds to block 1922 to select a VLAN of interest to process. For example, the layer validator 330 can select VLAN 1000 in the set of VLANs 420 to process.

At block 1924, the example fabric migrator 208 identifies the selected VLAN as processed. For example, the layer validator 330 can identify VLAN 1000 as processed, visited, etc., to help ensure that the layer validator 330 does not process VLAN 1000 again. At block 1926, the example fabric migrator 208 determines whether all leaf-spline links are included in the selected VLAN. For example, the layer validator 330 can determine whether the communication paths 402, 404, 406, 408 of FIG. 10 are included in VLAN.

If, at block 1926, the example fabric migrator 208 determines that not all leaf-spine links are included in the selected VLAN, then control returns to block 1916 to alert the user of a failed validation. Otherwise control proceeds to block 1928 to select another VLAN of interest to process. For example, the layer validator 330 can select VLAN 1001 to process. If, at block 1928, the example fabric migrator 208 determines to select another VLAN of interest, then control returns to block 1922 to select another VLAN of interest to process. Otherwise the example method returns to block 1214 of the example of FIG. 12 to determine whether validation of the migrated network fabric layer was successful.

Figure 20:
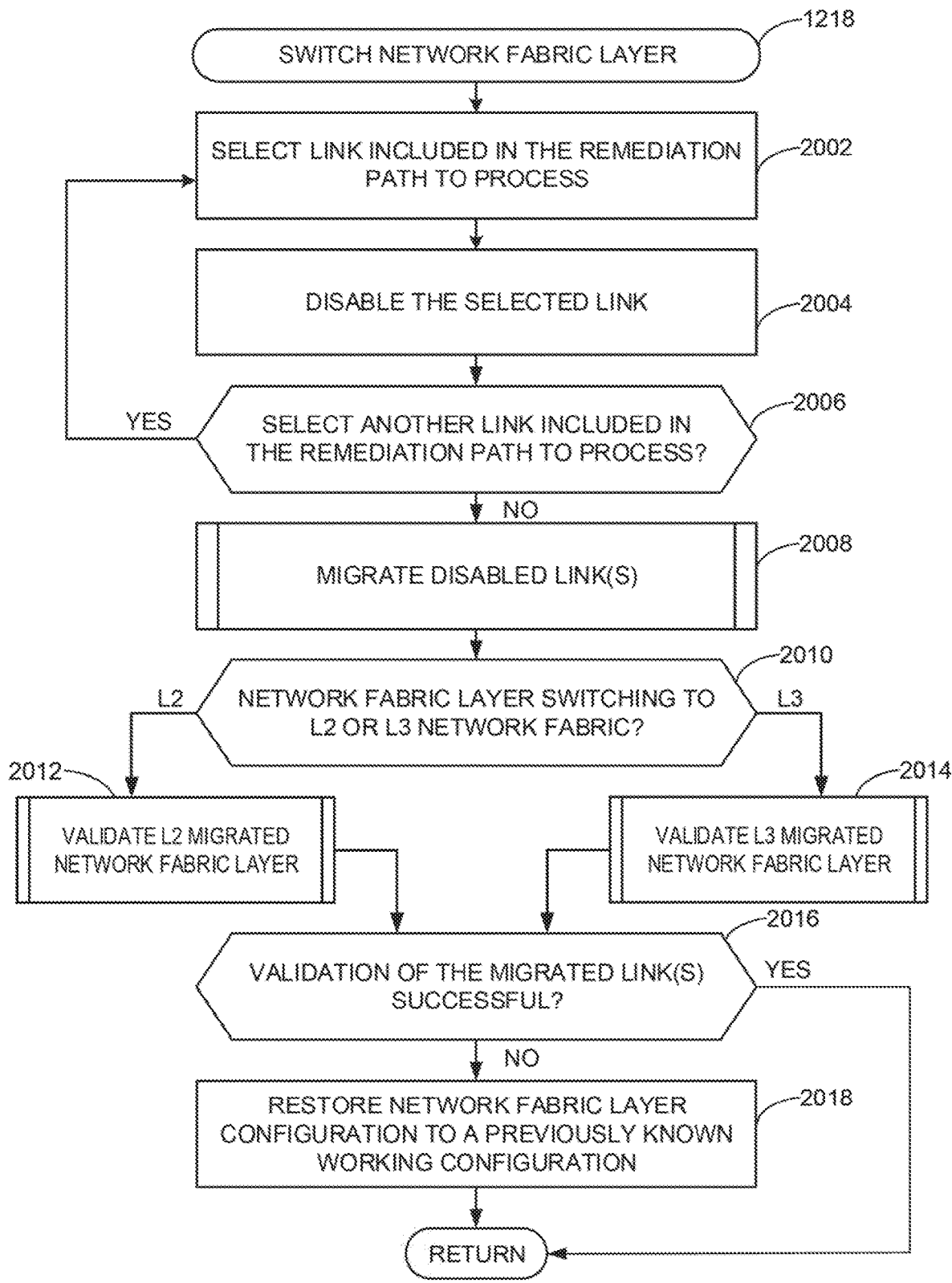

FIG. 20 is a flowchart representative of an example method that can be performed by the example fabric migrator 208 of FIGS. 2-11 to switch a network fabric layer. The example process of FIG. 20 can be used to implement the operation of block 1218 of FIG. 12. The example method begins at block 2002 when the example fabric migrator 208 selects a link included in the remediation path to process. For example, the layer migrator 320 can select the third communication path 406 of FIG. 4.

At block 2004, the example fabric migrator 208 disables the selected link. For example, the layer migrator 320 can disable the third communication path 406 to prevent the third communication path 406 from executing a packet flow.

At block 2006, the example fabric migrator 208 determines whether to select another link included in the remediation path to process. For example, the layer migrator 320 can determine that there are no remaining links in the communication network 400 of FIGS. 4-7 to process. If, at block 2006, the example fabric migrator 208 determines to select another link included in the remediation path to process, then control returns to block 2002 to select another link included in the remediation path to process. Otherwise control proceeds to block 2008 to migrate the disabled link(s). For example, the layer migrator 320 can implement the example process of FIGS. 15, 16, and/or 17 to migrate the third communication path 406.

At block 2010, the example fabric migrator 208 determines whether the network fabric layer is switching to L2 or L3 network fabric. For example, the layer validator 330 can determine that the communication network 400 of FIG. 4 is switching from L2 to L3 network fabric. If, at block 2010, the example fabric migrator 208 determines that the network fabric layer is switching to L2 network fabric, then, at block 2012, the fabric migrator 208 validates the L2 migrated network fabric layer. For example, the layer validator 330 can implement the example process of FIG. 19 to validate the communication network 400. If, at block 2010, the example fabric migrator 208 determines that the network fabric layer is switching to L3 network fabric, then, at block 2014, the fabric migrator 208 validates the L3 migrated network fabric layer. For example, the layer validator 330 can implement the example process of FIG. 18 to validate the communication network 400.

At block 2016, the example fabric migrator 208 determines whether validation of the migrated link(s) was successful. For example, the layer validator 330 can determine that the migration of the third communication path 406 of FIG. 4 from L2 to L3 network fabric was unsuccessful. If, at block 2016, the example fabric migrator 208 determines that the validation of the migrated link(s) was not successful, then, at block 2018, the fabric migrator 208 restores the network fabric layer configuration to a previously known working configuration, otherwise the example method concludes.

FIG. 21A depicts example source code 2100 representative of example computer readable instructions that may be executed to implement the example fabric migrator 208 of FIGS. 2-11 that may be used to implement the examples disclosed herein. For example, the source code 2100 can be used to implement the method of FIGS. 13A and 13B. In the illustrated example of FIG. 21A, the fabric migrator 208 determines whether a communication network implements L2 network fabric. In the illustrated example of FIG. 21A, the fabric migrator 208 sends an ARP request on a link between a leaf switch and a spine switch in a workload (e.g., a workload domain, etc.) on a VLAN. For example, the layer detector 300 can send an ARP request packet on the first communication path 402 between the ToR Switch A 110 of the first physical rack 102 and the first spine switch 122A in a workload domain on VLAN 1000 in the set of VLANS 420 of FIG. 4.

In the illustrated example of FIG. 21A, the fabric migrator 208 sends (e.g., iteratively sends, etc.) an ARP request on each link between each leaf switch and spine switch pair for each workload and for each VLAN in each workload. If the ARP request does not arrive on the spine switch in the leaf switch and spine switch pair, the example fabric migrator 208 determines that the network fabric is not an L2 network fabric. For example, the layer detector 300 can determine that the communication network 800 of FIG. 8 does not implement L2 network fabric based on the first spine switch 122A not receiving an ARP request packet from the ToR Switch A 110 on the first communication path 402.

In the illustrated example of FIG. 21A, the fabric migrator 208 sends an ARP request on a link between spine switches in a workload on a VLAN. For example, the layer detector 300 can send an ARP request packet on the first spine switch communication path 414 between the first and the second spine switches 122A, 122B in a workload domain on VLAN 1000 in the set of VLANS 420 of FIG. 4. the illustrated example of FIG. 21A, the fabric migrator 208 sends (e.g., iteratively sends, etc.) an ARP request on each link between a pair of spine switches for each workload and for each VLAN in each workload. If the ARP request does not arrive on a destination spine switch in the spine switch pair, the example fabric migrator 208 determines that the network fabric is not an L2 network fabric. For example, the layer detector 300 can determine that the communication network 400 of FIG. 4 does not implement L2 network fabric based on the second spine switch 122B not receiving an ARP request packet from the first spine switch 122A on the first spine switch communication path 414. In the illustrated example of FIG. 21A, the layer detector 300 returns that the network fabric is L2 network fabric based on no failed receipts of an ARP request packet by a spine switch of interest from either a leaf switch of interest and/or another spine switch of interest for one or more VLANs in one or more workloads.

FIG. 21B depicts example source code 2110 representative of example computer readable instructions that may be executed to implement the example fabric migrator 208 of FIGS. 2-11 that may be used to implement the examples disclosed herein. For example, the source code 2110 can be used to implement the method of FIGS. 14A and 14B. In the illustrated example of FIG. 21B, the fabric migrator 208 determines whether a communication network implements L3 network fabric.

In the illustrated example of FIG. 21B, the fabric migrator 208 selects (e.g., iteratively selects, etc.) each link between a leaf switch and a spine switch. In the illustrated example of FIG. 21B, the fabric migrator 208 sends an ICMP echo request on a selected link. For example, the layer detector 300 can send an ICMP echo request packet on the first communication path 402 between the ToR Switch A 110 of the first physical rack 102 and the first spine switch 122A of FIG. 8. If the ICMP echo reply does not arrive on the leaf switch in the leaf switch and spine switch pair, the example fabric migrator 208 determines that the network fabric is not an L3 network fabric. For example, the layer detector 300 can determine that the communication network 400 of FIG. 4 does not implement L3 network fabric based on the ToR Switch A 110 not receiving an ICMP echo reply packet from the first spine switch 122A on the first communication path 402.

In the illustrated example of FIG. 21B, the fabric migrator 208 selects (e.g., iteratively selects, etc.) a VLAN in a workload for each selected link between the selected leaf switch and the selected spine switch. For each VLAN, the example fabric migrator 208 determines whether a VXLAN tunnel or multicast configuration is invalid. For example, the layer detector 300 can determine that the communication network 400 of FIG. 4 is not L3 network fabric based on at least one of the VXLAN tunnel or multicast configuration being invalid. In the illustrated example of FIG. 21B, the fabric migrator 208 determines that a communication network does not use L3 network fabric based on an existence of a link between a pair of spine switches. For example, the layer detector 300 can determine that the communication network 400 of FIG. 4 does not use L3 network fabric based on an exchange of data between the first and the second spine switches 122A, 122B via the first spine switch communication path 414.

In the illustrated example of FIG. 21B, the layer detector 300 returns that the network fabric is L3 network fabric based on (1) no failed receipts of an ICMP echo reply packet by a leaf switch of interest from a spine switch of interest for one or more links between the leaf switch of interest and the spine switch of interest and (2) the lack of links between one or more pairs of spine switches in a communication network.

Figure 22:
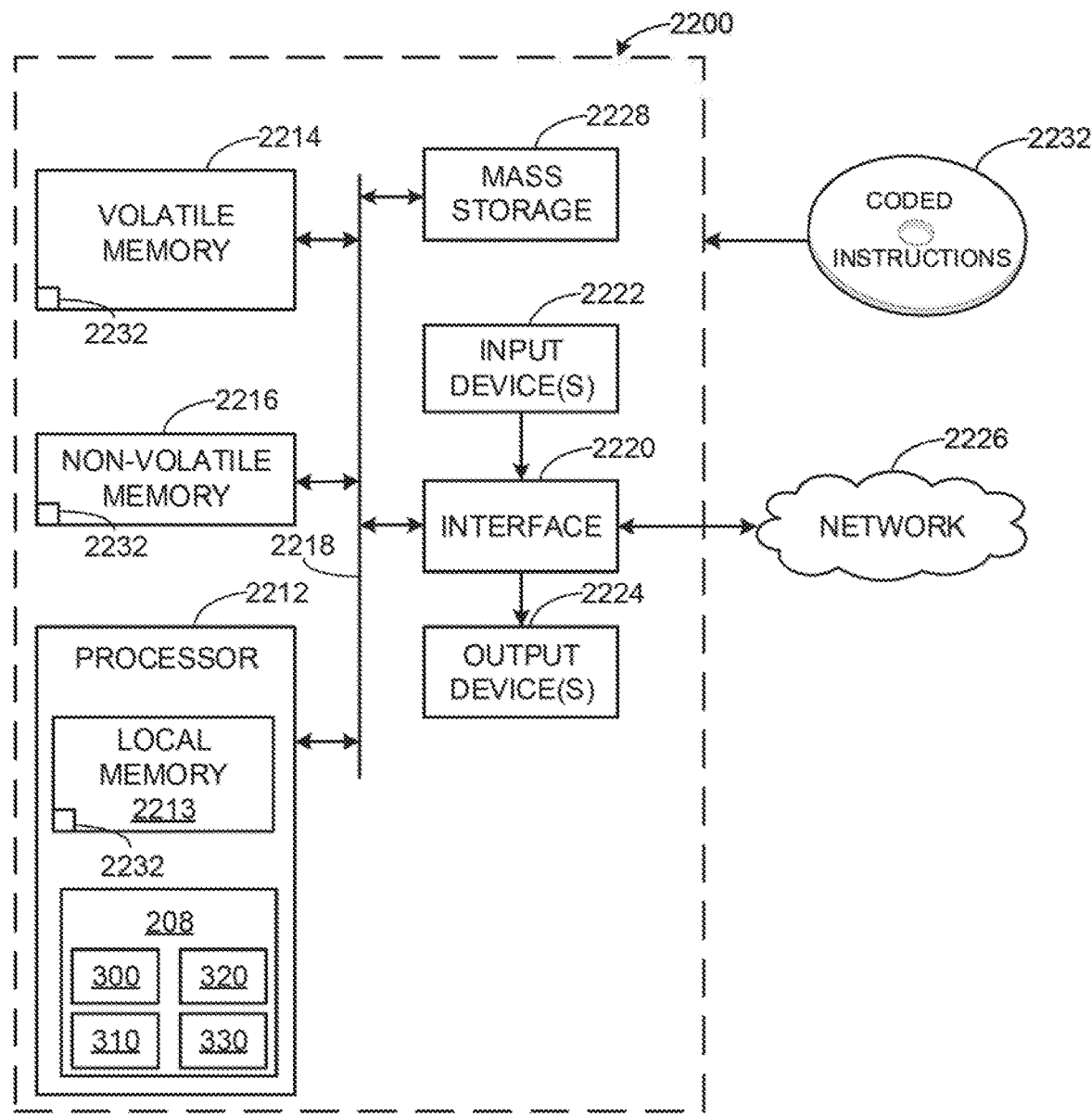
FIG. 22 is a block diagram of an example processing platform structured to execute machine-readable instructions to implement the methods of FIGS. 12-21B and/or the example fabric migrator of FIGS. 2-11.

FIG. 22 is a block diagram of an example processor platform 2200 capable of executing the instructions of FIGS. 13A-21 to implement the example fabric migrator 208 of FIGS. 2-11. The processor platform 2200 can be, for example, a rack-mount server or any other type of computing device.

The processor platform 2200 of the illustrated example includes a processor 2212. The processor 2212 of the illustrated example is hardware. For example, the processor 2212 can be implemented by one or more integrated circuits, logic circuits, microprocessors or controllers from any desired family or manufacturer. The hardware processor may be a semiconductor based (e.g., silicon based) device. In this example, the processor 2212 implements the example layer detector 300, the example layer remediator 310, the example layer migrator 320, the example layer validator 330, and/or, more generally, the example fabric migrator 208.

The processor 2212 of the illustrated example includes a local memory 2213 (e.g., a cache). The processor 2212 of the illustrated example is in communication with a main memory including a volatile memory 2214 and a non-volatile memory 2216 via a bus 2218. The volatile memory 2214 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 2216 may be implemented by flash memory and/or any other desired type of memory device. Access to the main memory 2214, 2216 is controlled by a memory controller.

The processor platform 2200 of the illustrated example also includes an interface circuit 2220. The interface circuit 2220 may be implemented by any type of interface standard, such as an Ethernet interface, a universal serial bus (USB), and/or a peripheral component interconnect (PCI) express interface.

In the illustrated example, one or more input devices 2222 are connected to the interface circuit 2220. The input device(s) 2222 permit(s) a user to enter data and/or commands into the processor 2212. The input device(s) can be implemented by, for example, a keyboard, a button, a mouse, a touchscreen, a track-pad, a trackball, an isopoint device, and/or a voice recognition system.

One or more output devices 2224 are also connected to the interface circuit 2220 of the illustrated example. The output devices 2224 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 2220 of the illustrated example, thus, typically includes a graphics driver card, a graphics driver chip and/or a graphics driver processor.

The interface circuit 2220 of the illustrated example also includes a communication device such as a transmitter, a receiver, a transceiver, a modem and/or network interface card to facilitate exchange of data with external machines (e.g., computing devices of any kind) via a network 2226 (e.g., an Ethernet connection, a digital subscriber line (DSL), a telephone line, coaxial cable, a cellular telephone system, etc.).

The processor platform 2200 of the illustrated example also includes one or more mass storage devices 2228 for storing software and/or data. Examples of such mass storage devices 2228 include floppy disk drives, hard drive disks, compact disk drives, Blu-ray disk drives, redundant array of independent disks (RAID) systems, and DVD drives.

The coded instructions 2232 of FIGS. 13A-21 may be stored in the mass storage device 2228, in the volatile memory 2214, in the non-volatile memory 2216, and/or on a removable non-transitory computer readable storage medium such as a CD or DVD.

From the foregoing, it will be appreciated that example methods, apparatus, systems and articles of manufacture have been disclosed that perform network fabric migration in virtualized servers. Examples disclosed herein detect a network fabric layer of a communication network based on sending probe packets on communication links between network resources. Examples disclosed herein remove all communication links except for communication links associated with a remediation path to ensure continuous execution of packet flows without disruption. Examples disclosed herein migrate communication links not associated with the communication path from a first network fabric layer to a second network fabric layer. In response to a successful network fabric layer migration, the remediation path is migrated in a similar fashion to the second network fabric layer. As a result, examples disclosed herein improve routing hardware used to execute the packet flow in the network by improving an ability of the routing hardware to migrate between network fabric layers without disruption to existing packet flows or initializing new packet flows. Examples disclosed herein provide improvements over existing network fabric migration techniques by completing a network fabric migration within a time period spanning several seconds (e.g., 10 seconds, 30 seconds, etc.) or one or more minutes (e.g., 1 minute, 5 minutes, etc.) compared to prior examples where network fabric migration can span one or more hours (e.g., 3 hours, 12 hours, etc.), one or more days, etc.

Examples disclosed herein can improve rack-mount server systems by enabling an ability to migrate between network fabric layers without additional specialized hardware. Examples disclosed herein can improve computing technology to improve routing of communication data, stability of inter-resource communication (e.g., inter-network resource communication, inter-physical hardware resource communication, etc.), network flexibility (e.g., ability to migrate between network fabric layers to improve a network, etc.), network configuration, network management, etc.

Examples disclosed herein perform network fabric migration in virtualized server systems. An example apparatus includes a layer detector to determine a first network fabric layer of a communication network by sending a first probe packet from a first network resource to a second network resource via a communication link and determine to migrate the first network fabric layer to a second network fabric layer based on whether the first network resource receives a reply probe packet from the second network resource in response to the first probe packet. The example apparatus further includes a layer migrator to when the first network resource receives the reply probe packet from the second network resource in response to the first probe packet, migrate the first network fabric layer to a second network fabric layer based on configuring a remediation path and migrate the remediation path from the first network fabric layer to the second network fabric layer when the first network fabric layer migrates to the second network fabric layer.

In the example apparatus, the layer detector determining that the first network fabric layer is Layer 2 network fabric can be based on the first network resource not receiving an address resolution protocol reply packet. In the example apparatus, the layer detector determining the first network fabric layer is Layer 3 network fabric can be based on the first network resource not receiving an Internet Control Message Protocol echo reply packet or by determining whether a virtual extensible local area network tunnel configuration or a multicast configuration is not valid for a virtual local area network corresponding to the first and the second network resources. In the example apparatus, the layer migrator migrating the first network fabric layer to the second network fabric layer can include disabling the communication link, removing a virtual portchannel configuration from the first and the second network resources, configuring a private subnet corresponding to the second network fabric layer on the first and the second network resources, configuring border gateway protocol on the first and the second network resources, and enabling protocol independent multicast on the first and the second network resources.

In the example apparatus, the layer migrator migrating the first network fabric layer to the second network fabric layer can include disabling the communication link, removing a protocol independent multicast configuration from the first and the second network resources, removing a border gateway protocol configuration from the first and the second network resources, removing a private subnet corresponding to the second network fabric layer on the first and the second network resources, and enabling virtual portchannel configuration on the first and the second network resources. The example apparatus can further include a layer remediator to identify the remediation path and to remove a communication path not associated with the remediation path. The example apparatus can further include a layer validator to determine whether the first network fabric layer migrated to the second network fabric layer based on at least one of a) sending a second probe packet to the second network resource, b) determining whether border gateway protocol is enabled for the first and the second network resources, or c) determining whether virtual portchannel is enabled for the first and the second network resources.

In disclosed examples herein, an example processor-implemented method includes determining, by executing an instruction with a processor, a first network fabric layer of a communication network by sending a first probe packet from a first network resource to a second network resource via a communication link and, determining, by executing an instruction with the processor, to migrate the first network fabric layer to a second network fabric layer based on whether the first network resource receives a reply probe packet from the second network resource in response to the first probe packet. The example processor-implemented method further includes when the first network resource receives the reply probe packet from the second network resource in response to the first probe packet, migrating, by executing an instruction with the processor, the first network fabric layer to a second network fabric layer based on configuring a remediation path and, migrating, by executing an instruction with the processor, the remediation path from the first network fabric layer to the second network fabric layer when the first network fabric layer migrates to the second network fabric layer.

In the example processor-implemented method, determining the first network fabric layer can include determining that the first network fabric layer is Layer 2 network fabric based on the first network resource not receiving an address resolution protocol reply packet. In the example processor-implemented method, determining the first network fabric layer can include determining that the first network fabric layer is Layer 3 network fabric based on the first network resource not receiving an Internet Control Message Protocol echo reply packet or by determining whether a virtual extensible local area network tunnel configuration or a multicast configuration is not valid for a virtual local area network corresponding to the first and the second network resources. In the example processor-implemented method, migrating the first network fabric layer to the second network fabric layer can include disabling the communication link, removing a virtual portchannel configuration from the first and the second network resources, configuring a private subnet corresponding to the second network fabric layer on the first and the second network resources, configuring border gateway protocol on the first and the second network resources, and enabling protocol independent multicast on the first and the second network resources.

In the example processor-implemented method, migrating the first network fabric layer to the second network fabric layer can include disabling the communication link, removing a protocol independent multicast configuration from the first and the second network resources, removing a border gateway protocol configuration from the first and the second network resources, removing a private subnet corresponding to the second network fabric layer on the first and the second network resources, and enabling virtual portchannel configuration on the first and the second network resources. on the first and the second network resources. The example processor-implemented method can further include identifying the remediation path and removing a communication path not associated with the remediation path.

In the example processor-implemented method, determining whether the first network fabric layer migrated to the second network fabric layer can be based on at least one of a) sending a second probe packet to the second network resource, b) determining whether border gateway protocol is enabled for the first and the second network resources, or c) determining whether virtual portchannel is enabled for the first and the second network resources.

In examples disclosed herein, a non-transitory computer readable storage medium including instructions which, when executed, cause a machine to at least determine a first network fabric layer of a communication network by sending a first probe packet from a first network resource to a second network resource via a communication link, determine to migrate the first network fabric layer to a second network fabric layer based on whether the first network resource receives a reply probe packet from the second network resource in response to the first probe packet, when the first network resource receives the reply probe packet from the second network resource in response to the first probe packet, migrate the first network fabric layer to a second network fabric layer based on configuring a remediation path, and migrate the remediation path from the first network fabric layer to the second network fabric layer when the first network fabric layer migrates to the second network fabric layer.

In the example non-transitory computer readable storage medium, determining the first network fabric layer can include determining that the first network fabric layer is Layer 2 network fabric based on the first network resource not receiving an address resolution protocol reply packet. In the non-transitory computer readable storage medium, determining the first network fabric layer can include determining that the first network fabric layer is Layer 3 network fabric based on the first network resource not receiving an Internet Control Message Protocol echo reply packet or by determining whether a virtual extensible local area network tunnel configuration or a multicast configuration is not valid for a virtual local area network corresponding to the first and the second network resources.

In the non-transitory computer readable storage medium migrating the first network fabric layer to the second network fabric layer can include disabling the communication link, removing a virtual portchannel configuration from the first and the second network resources, configuring a private subnet corresponding to the second network fabric layer on the first and the second network resources, configuring border gateway protocol on the first and the second network resources, and enabling protocol independent multicast on the first and the second network resources.

In the non-transitory computer readable storage medium, migrating the first network fabric layer to the second network fabric layer can include disabling the communication link, removing a protocol independent multicast configuration from the first and the second network resources, removing a border gateway protocol configuration from the first and the second network resources, removing a private subnet corresponding to the second network fabric layer on the first and the second network resources, and enabling virtual portchannel configuration on the first and the second network resources. on the first and the second network resources.

The non-transitory computer readable storage medium can further include instructions which, when executed, cause the machine to at least identify the remediation path and remove a communication path not associated with the remediation path. In the non-transitory computer readable storage medium, determining whether the first network fabric layer migrated to the second network fabric layer can be based on at least one of a) sending a second probe packet to the second network resource, b) determining whether border gateway protocol is enabled for the first and the second network resources, or c) determining whether virtual portchannel is enabled for the first and the second network resources.

Although certain example methods, apparatus, systems, and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
 a layer detector to, in response to a first network resource of a communication network transmitting a first probe packet to a second network resource via a communication link, determine a type of a first network fabric layer of the communication network, and whether to migrate the first network fabric layer to a second network fabric layer based on whether the first network resource receives a reply probe packet from the second network resource; and
 a layer migrator to, in response to the first network resource obtaining the reply probe packet from the second network resource and in response to a remediation path being configured, migrate the first network fabric layer to the second network fabric layer, the layer migrator to migrate the remediation path from the first network fabric layer to the second network fabric layer.

2. The apparatus of claim 1, wherein the layer detector is to determine that the type of the first network fabric layer is a Layer 2 network fabric based on the first network resource not receiving an address resolution protocol reply packet.

3. The apparatus of claim 1, wherein the layer detector is to determine that the type of the first network fabric layer is a Layer 3 network fabric based on the first network resource not receiving an Internet Control Message Protocol echo reply packet or by determining whether a virtual extensible local area network tunnel configuration or a multicast configuration is not valid for a virtual local area network corresponding to the first and the second network resources.

4. The apparatus of claim 1, wherein the layer migrator is to migrate the first network fabric layer to the second network fabric layer by disabling the communication link, removing a virtual portchannel configuration from the first and the second network resources, configuring a private subnet corresponding to the second network fabric layer on the first and the second network resources, configuring border gateway protocol on the first and the second network resources, and enabling protocol independent multicast on the first and the second network resources.

5. The apparatus of claim 1, wherein the layer migrator is to migrate the first network fabric layer to the second network fabric layer by disabling the communication link, removing a protocol independent multicast configuration from the first and the second network resources, removing a border gateway protocol configuration from the first and the second network resources, removing a private subnet corresponding to the second network fabric layer on the first and the second network resources, and enabling virtual portchannel configuration on the first and the second network resources, on the first and the second network resources.

6. The apparatus of claim 1, further including a layer remediator to identify the remediation path and to remove a communication path not associated with the remediation path.

7. The apparatus of claim 1, further including a layer validator to determine whether the first network fabric layer migrated to the second network fabric layer in response to at least one of a) sending a second probe packet to the second network resource, b) determining whether border gateway protocol is enabled for the first and the second network resources, or c) determining whether virtual portchannel is enabled for the first and the second network resources.

8. A method comprising:
in response to a first network resource transmitting a first probe packet to a second network resource via a communication link, determining, by executing an instruction with a processor, a type of a first network fabric layer of a communication network and whether to migrate the first network fabric layer to a second network fabric layer based on whether the first network resource receives a reply probe packet from the second network resource;
in response to a remediation path being configured, migrating, by executing an instruction with the processor, the first network fabric layer to the second network fabric layer; and
subsequent to migrating the first network fabric layer to the second network fabric layer, migrating, by executing an instruction with the processor, the remediation path from the first network fabric layer to the second network fabric layer.

9. The method of claim 8, further including determining that the type of the first network fabric layer is a Layer 2 network fabric based on the first network resource not receiving an address resolution protocol reply packet.

10. The method of claim 8, further including determining that the type of the first network fabric layer is a Layer 3 network fabric based on the first network resource not receiving an Internet Control Message Protocol echo reply packet or by determining whether a virtual extensible local area network tunnel configuration or a multicast configuration is not valid for a virtual local area network corresponding to the first and the second network resources.

11. The method of claim 8, wherein the migrating of the first network fabric layer to the second network fabric layer includes:
disabling the communication link;
removing a virtual portchannel configuration from the first and the second network resources;
configuring a private subnet corresponding to the second network fabric layer on the first and the second network resources;
configuring a border gateway protocol on the first and the second network resources; and
enabling protocol independent multicast on the first and the second network resources.

12. The method of claim 8, wherein the migrating of the first network fabric layer to the second network fabric layer includes:
disabling the communication link;
removing a protocol independent multicast configuration from the first and the second network resources;
removing a border gateway protocol configuration from the first and the second network resources;
removing a private subnet corresponding to the second network fabric layer on the first and the second network resources; and
enabling virtual portchannel configuration on the first and the second network resources, on the first and the second network resources.

13. The method of claim 8, further including identifying the remediation path and removing a communication path not associated with the remediation path.

14. The method of claim 8, further including determining whether the first network fabric layer migrated to the second network fabric layer in response to at least one of a) sending a second probe packet to the second network resource, b) determining whether border gateway protocol is enabled for the first and the second network resources, or c) determining whether virtual portchannel is enabled for the first and the second network resources.

15. A non-transitory computer readable storage medium comprising instructions which, when executed, cause a machine to at least:
determine a first network fabric layer of a communication network based on a response to a first probe packet sent from a first network resource to a second network resource via a communication link;
determine to migrate the first network fabric layer to a second network fabric layer based on whether the first network resource receives a reply probe packet from the second network resource in response to the first probe packet;
when the first network resource receives the reply probe packet from the second network resource in response to the first probe packet, migrate the first network fabric layer to a second network fabric layer in response to configuration of a remediation path; and
migrate the remediation path from the first network fabric layer to the second network fabric layer when the first network fabric layer migrates to the second network fabric layer.

16. The non-transitory computer readable storage medium of claim 15, wherein the instructions, when executed, cause the machine to determine the first network fabric layer is a Layer 2 network fabric based on the first network resource not receiving an address resolution protocol reply packet.

17. The non-transitory computer readable storage medium of claim 15, wherein the instructions, when executed, cause the machine to determine the first network fabric layer is a Layer 3 network fabric based on the first network resource not receiving an Internet Control Message Protocol echo reply packet or by determining whether a virtual extensible local area network tunnel configuration or a multicast configuration is not valid for a virtual local area network corresponding to the first and the second network resources.

18. The non-transitory computer readable storage medium of claim 15, wherein the instructions, when executed, cause the machine to migrate the first network fabric layer to the second network fabric layer by:
disabling the communication link;
removing a virtual portchannel configuration from the first and the second network resources;
configuring a private subnet corresponding to the second network fabric layer on the first and the second network resources;
configuring border gateway protocol on the first and the second network resources; and
enabling protocol independent multicast on the first and the second network resources.

19. The non-transitory computer readable storage medium of claim 15, wherein the instructions, when executed, cause the machine to migrate the first network fabric layer to the second network fabric layer by:
disabling the communication link;
removing a protocol independent multicast configuration from the first and the second network resources;
removing a border gateway protocol configuration from the first and the second network resources;
removing a private subnet corresponding to the second network fabric layer on the first and the second network resources; and enabling virtual portchannel configuration on the first and the second network resources, on the first and the second network resources.

20. The non-transitory computer readable storage medium of claim 15, wherein the instructions, when executed, cause the machine to identify the remediation path and remove a communication path not associated with the remediation path.

21. The non-transitory computer readable storage medium of claim 15, wherein the instructions, when executed, cause the machine to determine whether the first network fabric layer migrated to the second network fabric layer in response to at least one of a) sending a second probe packet to the second network resource, b) determining whether border gateway protocol is enabled for the first and the second network resources, or c) determining whether virtual portchannel is enabled for the first and the second network resources.

* * * * *